US012404152B1

(12) United States Patent
Horton

(10) Patent No.: US 12,404,152 B1
(45) Date of Patent: *Sep. 2, 2025

(54) LIFT ATTACHMENT APPARATUS

(71) Applicant: Jared D. Horton, Glenwood, IA (US)

(72) Inventor: Jared D. Horton, Glenwood, IA (US)

( * ) Notice: Subject to any disclaimer, the term of this patent is extended or adjusted under 35 U.S.C. 154(b) by 388 days.

This patent is subject to a terminal disclaimer.

(21) Appl. No.: 17/972,314

(22) Filed: Oct. 24, 2022

Related U.S. Application Data

(63) Continuation-in-part of application No. 16/841,404, filed on Apr. 6, 2020, now Pat. No. 11,479,453, which is a continuation of application No. 16/290,525, filed on Mar. 1, 2019, now Pat. No. 10,822,209, which is a continuation-in-part of application No. 15/143,279, filed on Apr. 29, 2016, now Pat. No. 10,221,049.

(60) Provisional application No. 62/829,239, filed on Apr. 4, 2019, provisional application No. 62/154,541, filed on Apr. 29, 2015.

(51) Int. Cl.
*B66C 23/44* (2006.01)
*B66F 9/06* (2006.01)
*E02F 5/30* (2006.01)

(52) U.S. Cl.
CPC ................ *B66C 23/44* (2013.01); *B66F 9/06* (2013.01); *E02F 5/30* (2013.01)

(58) Field of Classification Search
CPC ............... B66C 23/44; B66F 9/06; E02F 5/30
See application file for complete search history.

(56) References Cited

U.S. PATENT DOCUMENTS

| | | | |
|---|---|---|---|
| 1,368,619 | A | 2/1921 | Roy |
| 2,301,808 | A | 11/1942 | Mosher |
| 2,493,150 | A | 1/1950 | Kroger |
| 2,719,730 | A | 10/1955 | Beck |
| 2,788,906 | A | 4/1957 | Davis et al. |
| 2,899,093 | A | 8/1959 | Morrell |
| 3,042,236 | A | 7/1962 | Pilch |
| 3,123,222 | A | 3/1964 | Livingston et al. |
| 3,204,793 | A | 9/1965 | Lane |
| 3,812,979 | A | 5/1974 | Leihgeber |
| 4,200,423 | A | 4/1980 | Somnsin |
| 4,436,477 | A | 3/1984 | Lenertz et al. |
| 4,960,359 | A | 10/1990 | Lovitt, Jr. |
| 5,054,989 | A | 10/1991 | Fell |
| 5,120,186 | A | 6/1992 | Jorgenson |
| 5,169,278 | A | 12/1992 | Hoechst et al. |
| 5,171,124 | A | 12/1992 | Foster |
| 5,217,342 | A | 6/1993 | Grether |
| D374,752 | S | 10/1996 | Lee et al. |
| 5,611,657 | A | 3/1997 | Peterson |
| 5,921,743 | A | 7/1999 | Slagter |

(Continued)

*Primary Examiner* — Ronald P Jarrett
(74) *Attorney, Agent, or Firm* — Suiter Swantz IP

(57) ABSTRACT

The present disclosure is a lift attachment apparatus for construction and farm equipment, including a loader. In an embodiment of the disclosure, lift apparatus may include a frame including an attachment device configured to attach to a tilting plane of a loader having a forward facing loader arm, a pair of wheels connected to the frame, a first wheel of the pair of wheels located on a first side of the frame and a second wheel of the pair of wheels located on a second side of the frame. The lift attachment apparatus may further include a boom or forks connected directly or indirectly to the frame.

10 Claims, 78 Drawing Sheets

(56) References Cited

U.S. PATENT DOCUMENTS

| | | | | |
|---|---|---|---|---|
| 5,975,826 | A | 11/1999 | Scholder | |
| 6,033,177 | A * | 3/2000 | Kooima | B61D 15/00 414/664 |
| 6,551,050 | B1 | 4/2003 | Kallevig et al. | |
| 6,840,334 | B2 | 1/2005 | Marquardt | |
| 6,851,486 | B2 | 2/2005 | Marshall | |
| 7,273,342 | B2 | 9/2007 | DeSilvio | |
| 7,314,342 | B2 | 1/2008 | Kerwin | |
| 7,454,850 | B2 | 11/2008 | Smith | |
| 7,926,583 | B2 | 4/2011 | Newnam | |
| 8,167,053 | B2 | 5/2012 | Hendron et al. | |

* cited by examiner

LIFT ATTACHMENT APPARATUS

CROSS REFERENCE TO RELATED APPLICATIONS

The present application claims the benefit under 35 U.S.C. § 120 of U.S. patent application Ser. No. 16/841,404 filed Apr. 6, 2020. U.S. patent application Ser. No. 16/841,404 filed Apr. 6, 2020 claims the benefit under 35 U.S.C. § 120 of U.S. patent application Ser. No. 16/290,525 filed Mar. 1, 2019. The U.S. patent application Ser. No. 16/290,525 filed Mar. 1, 2019 claims the benefit under 35 U.S.C. § 120 of U.S. patent application Ser. No. 15/143,279 filed Apr. 29, 2016. The U.S. patent application Ser. No. 15/143,279 filed Apr. 29, 2016 claims the benefit under 35 U.S.C. § 119 (e) of U.S. Provisional Application Ser. No. 62/154,541 filed Apr. 29, 2015.

The present application claims the benefit under 35 U.S.C. § 120 of U.S. patent application Ser. No. 16/841,404 filed Apr. 6, 2020. U.S. patent application Ser. No. 16/841,404 filed Apr. 6, 2020 claims the benefit under 35 U.S.C. § 119 (e) of U.S. Provisional Application Ser. No. 62/829,239 filed Apr. 4, 2019.

The U.S. patent application Ser. No. 16/841,404 filed Apr. 6, 2020, the U.S. patent application Ser. No. 16/290,525 filed Mar. 1, 2019, the U.S. patent application Ser. No. 15/143,279 filed Apr. 29, 2016, the U.S. Provisional Application Ser. No. 62/829,239 filed Apr. 4, 2019, and the U.S. Provisional Application Ser. No. 62/154,541 filed Apr. 29, 2015 are hereby incorporated by reference in their entirety.

TECHNICAL FIELD

The present disclosure generally relates to the field of construction; and more specifically to a lift attachment apparatus for farm and construction equipment.

BACKGROUND

Farm and construction equipment are regularly employed in a variety of applications to move material. Construction and farm equipment may include loader equipment with wheels, tracks or other system that makes them mobile for the use of moving or processing material with quick attachment capabilities. Loaders may include a track skid loader, skid steer loader, all wheel steer loader, wheel loader, teleskid, boom loader, crawler loader or a front end loader.

It is common for a loader to include a bucket to contain material. Advantageously, material may be retrieved, stored, transported and deposited in another location. Material retrieved within the bucket may include snow, dirt, cement, rock and the like. It is also contemplated that other types of attachments may be attached to the loader in order to improve the functionality of the loader. These attachments may include blades, forks, brooms, and auger bits.

SUMMARY

The present disclosure is directed to a lift attachment apparatus for construction and farm equipment, including a loader. In an embodiment of the disclosure, lift apparatus may include a frame including an attachment device configured to attach to a tilting plane of a loader having a forward facing loader arm, a pair of wheels connected to the frame, a first wheel of the pair of wheels located on a first side of the frame and a second wheel of the pair of wheels located on a second side of the frame, the first wheel configured to be maintained parallel to the second wheel. The lift attachment apparatus may further include a boom connected to the frame or forks on the end of the frame.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
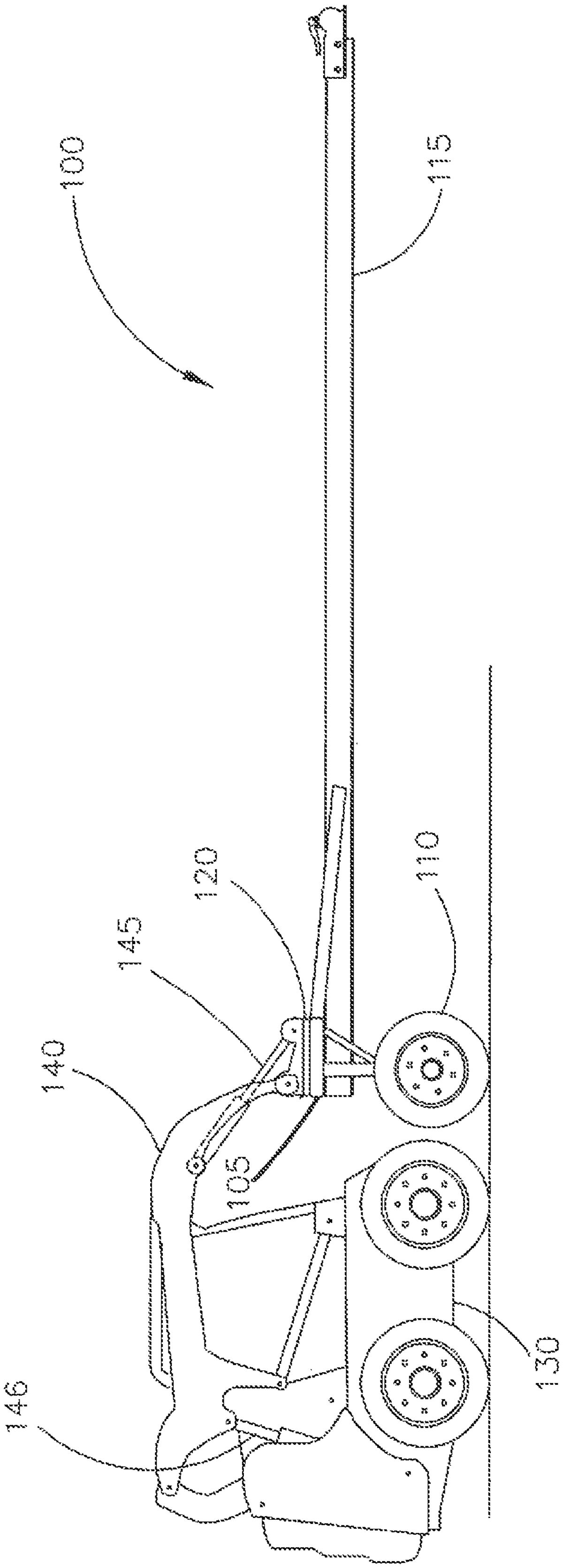
FIGS. 1A-1D depict side views of a lift attachment apparatus in accordance with an embodiment of the present disclosure.

Reference will now be made in detail to the subject matter disclosed, which is illustrated in the accompanying drawings.

The present disclosure is directed to a lift attachment apparatus for construction and farm equipment, including a loader. In an embodiment of the disclosure, lift apparatus may include a frame including an attachment device configured to attach to a tilting plane of a loader having a forward facing loader arm, a pair of wheels connected to the frame, a first wheel of the pair of wheels located on a first side of the frame and a second wheel of the pair of wheels located on a second side of the frame, the first wheel configured to be maintained parallel to the second wheel. The lift attachment apparatus may further include a boom connected to the frame, wherein control of the boom is provided by application of force to the attachment device in a downward direction by the forward facing loader arm to create lift and rotation of the tilting plane causing rotation of an end of the boom about the first wheel and the second wheel.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Referring to FIGS. 1A-1D, side views of a lift attachment apparatus 100 in accordance with an embodiment of the present disclosure are shown. Lift attachment apparatus may include a frame, the frame including an attachment device 105. Attachment device 105 may be configured to attach to a tilting plane of a loader. It is contemplated that attachment device 105 may be a quick attachment device in use with various types of attachments to connect with loaders. It is contemplated that a quick attachment device may be a device which allows a user to attach and detach attachments with a connection without difficult assembly and disassembly. Additionally, a quick attachment device may not require specialized tools which may allow for attachment and detachment of attachments in the field. A pair of wheels 110 may be coupled to the frame. It is contemplated that a first wheel of the pair of wheels may be located on a first side of the frame and a second wheel of the pair of wheels may be located on a second side of the frame, the first wheel configured to be maintained parallel to the second wheel. In an embodiment, each wheel may include a tire. Apparatus 100 may further include a boom 115 connected to the frame.

Figure 1B:
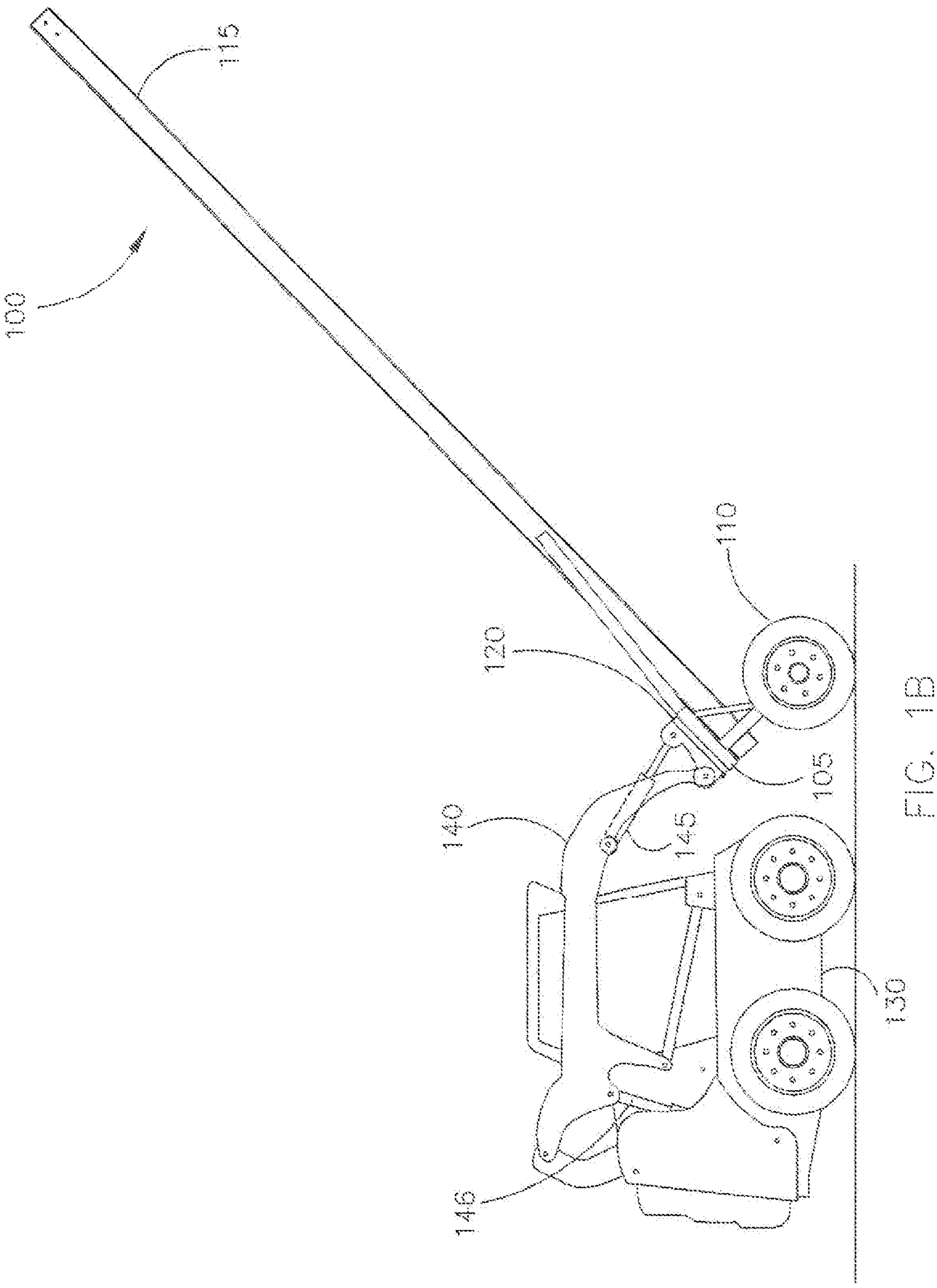
Figure 1C:
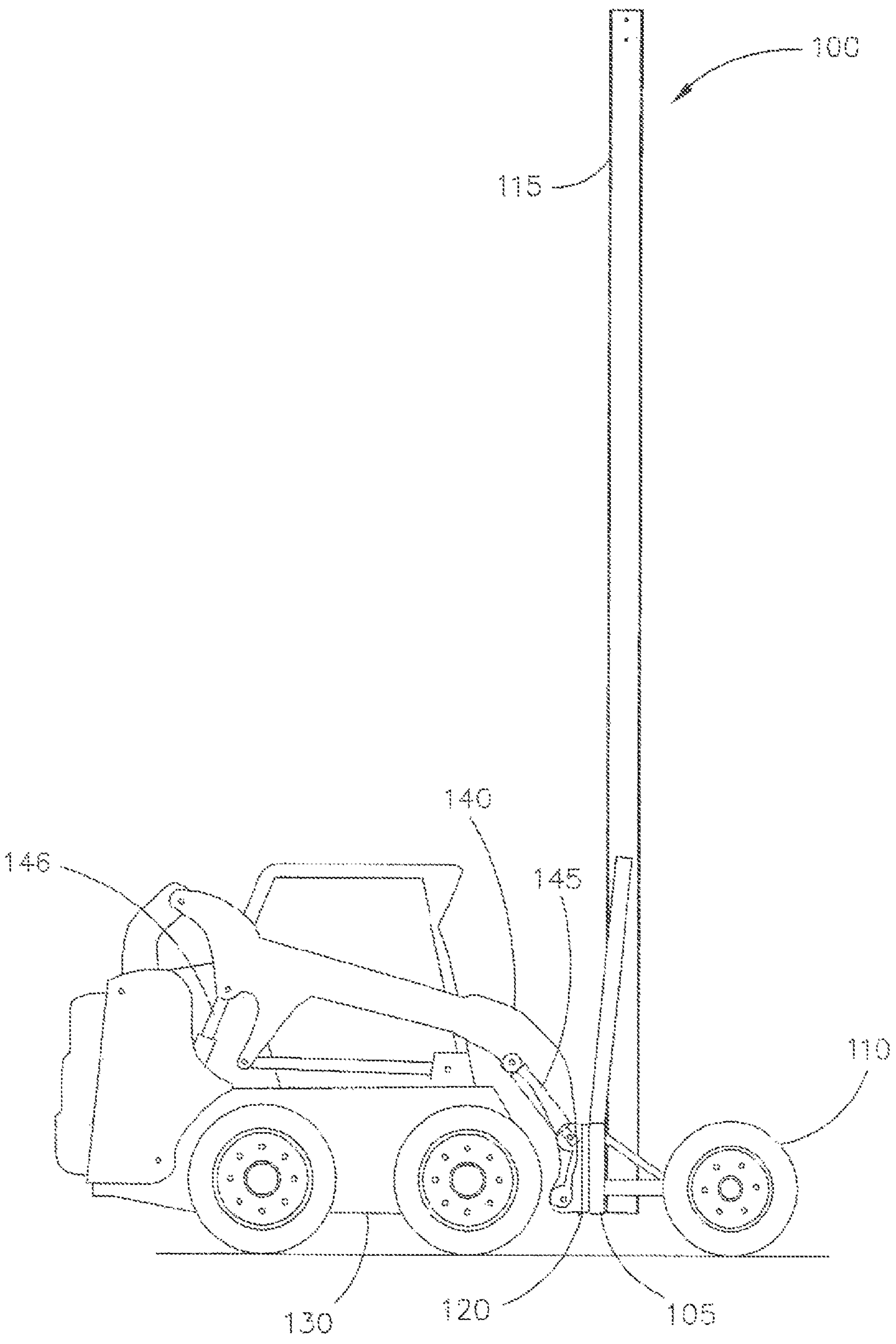

Advantageously, it is contemplated that various items (e.g. a load) may be removably coupled to an end of boom 115 and may be lifted to a desired location. Lift attachment apparatus 100 according to present disclosure may be configured to be safely rotated from a horizontal position as shown in FIG. 1A to a near vertical position (near 90 degrees to a surface) as shown in FIG. 1C without risking the load or tipping an attached loader. Attachment device 105 of frame may be configured to attach to a tilting plane 120 of a loader 130 having a forward facing loader arm 140. It is contemplated that attachment device 105 may be permanently fixed or incorporated with tilting plane 120 according to an alternative embodiment of the present disclosure. Boom 115 may be generally fixed with the attachment device 105 of the frame. It is contemplated that control of the boom 115 is provided by application of force to the attachment device 105 by the forward facing loader arm 140 in a downward direction to create lift and rotation of the tilting plane 120 causing rotation of an end of the boom about the first wheel and the second wheel of the pair of wheels 110. Tilting plane 120 may be controlled by a hydraulic cylinder 145 of loader. It is contemplated that boom 115 may be configured to be tipped up via application of force to the attachment device 105 in a downward direction and via reverse action of hydraulic cylinder 146 of the forward facing loader arm 140 of the loader 130. Through reverse action, the hydraulic capacity may be reduced, such as by about 44% for the hydraulic cylinder 146 of the forward facing loader arms. This reduction in hydraulic capacity may make it difficult to overload the apparatus 100 attachment if the load is being raised. Since the hydraulic capacities of hydraulic cylinders of many loaders are just over their tipping capacity, the reduction in hydraulic capacity may put the apparatus well below the tipping capacity and higher than the safe operating capacity, all while not adding additional wear to the loader.

Figure 1D:
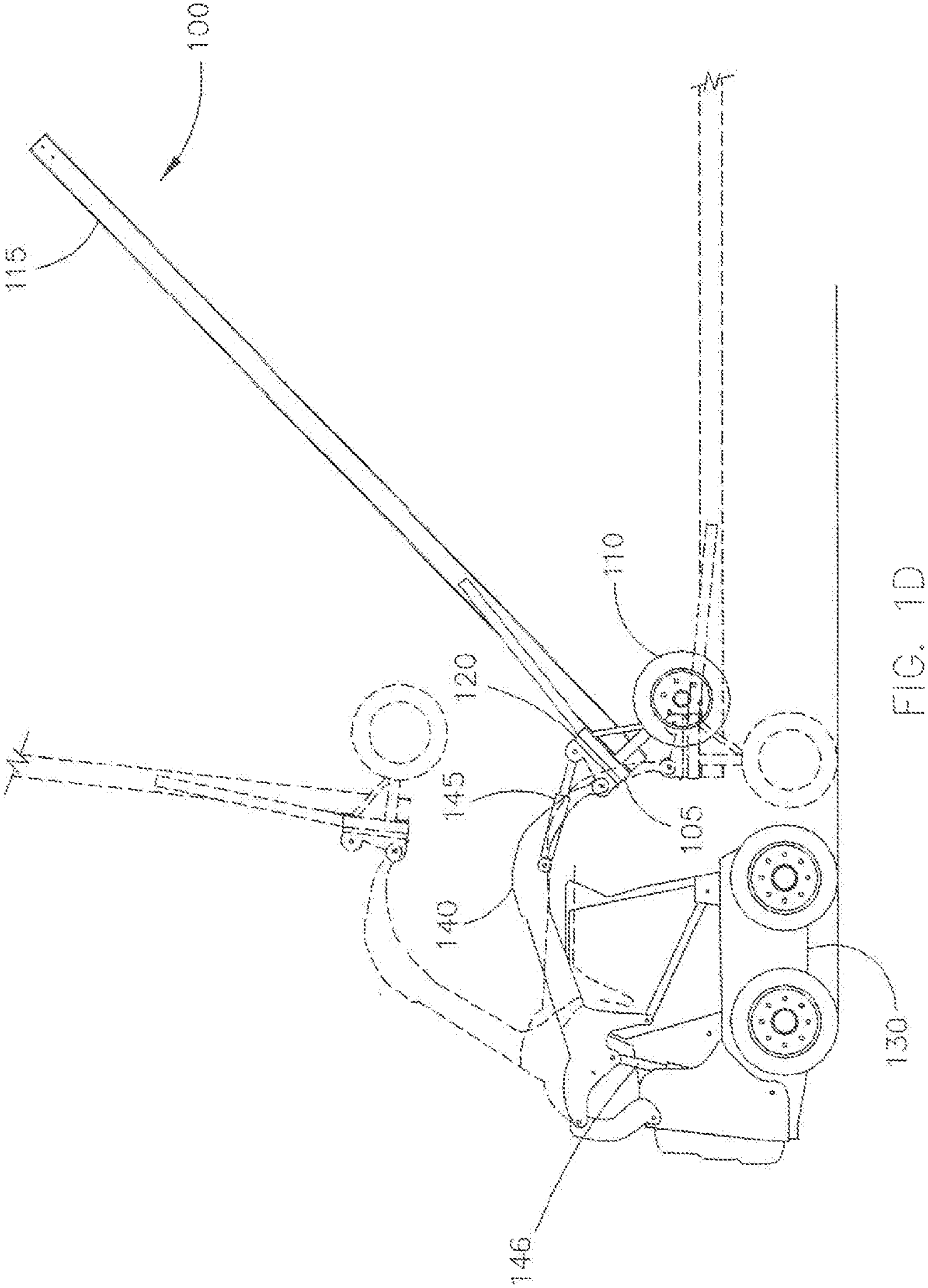

Referring to FIG. 1D, it is contemplated that lift attachment apparatus 100 may be raised by forward facing loader arm 140 whereby pair of wheels 110 may be supported by a raised surface or a vertical surface in accordance with embodiments of the disclosure to further increase the height to which an end of the boom may reach.

Referring again to FIGS. 1A-1D, boom 115 is configured as a long rod or pole. It is contemplated that boom 115 may include a trolley beam. Boom 115 may also include one or more of apertures, hooks, connectors and the like to allow coupling to material for transport. It is contemplated that boom 115 may be constructed of steel, and may be tubular in nature. However, boom 115 may be formed of various cross section shapes such as rectangular, round, triangle, roman arch, or gothic arch. Boom 115 may be constructed as a skeletal body. Boom 115 may be constructed of other materials instead of or in addition to steel, including aluminum, wood, plastic, carbon fiber, composites thereof and the like.

Loader 130 may include any type and size of loader. Loader 130 may be a track skid loader, skid steer loader, all wheel steer loader, wheel loader teleskid, boom loader, crawler loader or a front end loader. While loader 130 is described with a single forward facing loader arm 140, it is contemplated that two or more forward facing loader arms may be employed by a loader 130 without departing from the scope and intent of the present disclosure.

Figure 2:
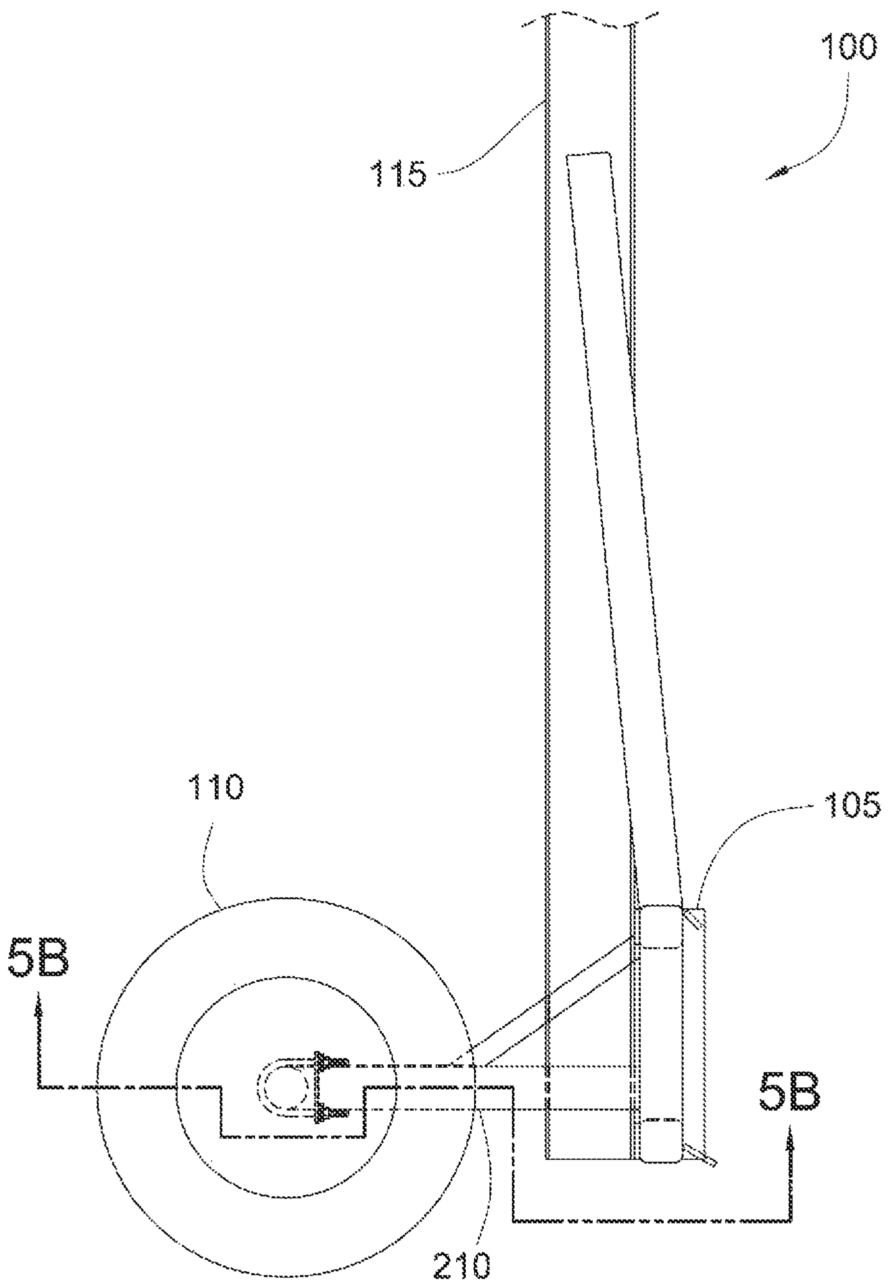
FIG. 2 depicts an exploded side view of a lift attachment apparatus in accordance with an embodiment of the present disclosure.
Figure 3A:
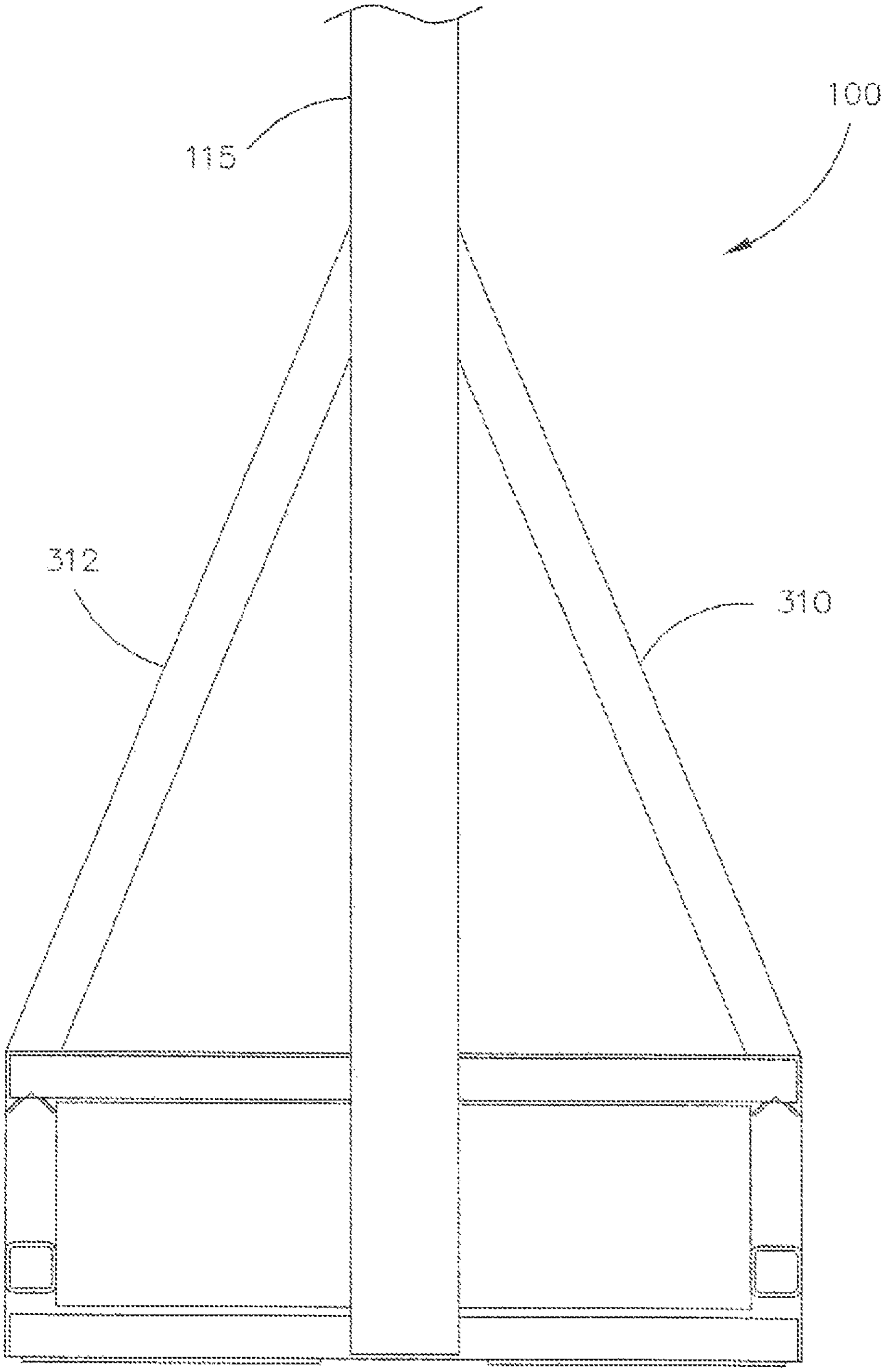
FIGS. 3A-3B depict bottom views of a lift attachment apparatus in accordance with an embodiment of the present disclosure.
Figure 3B:
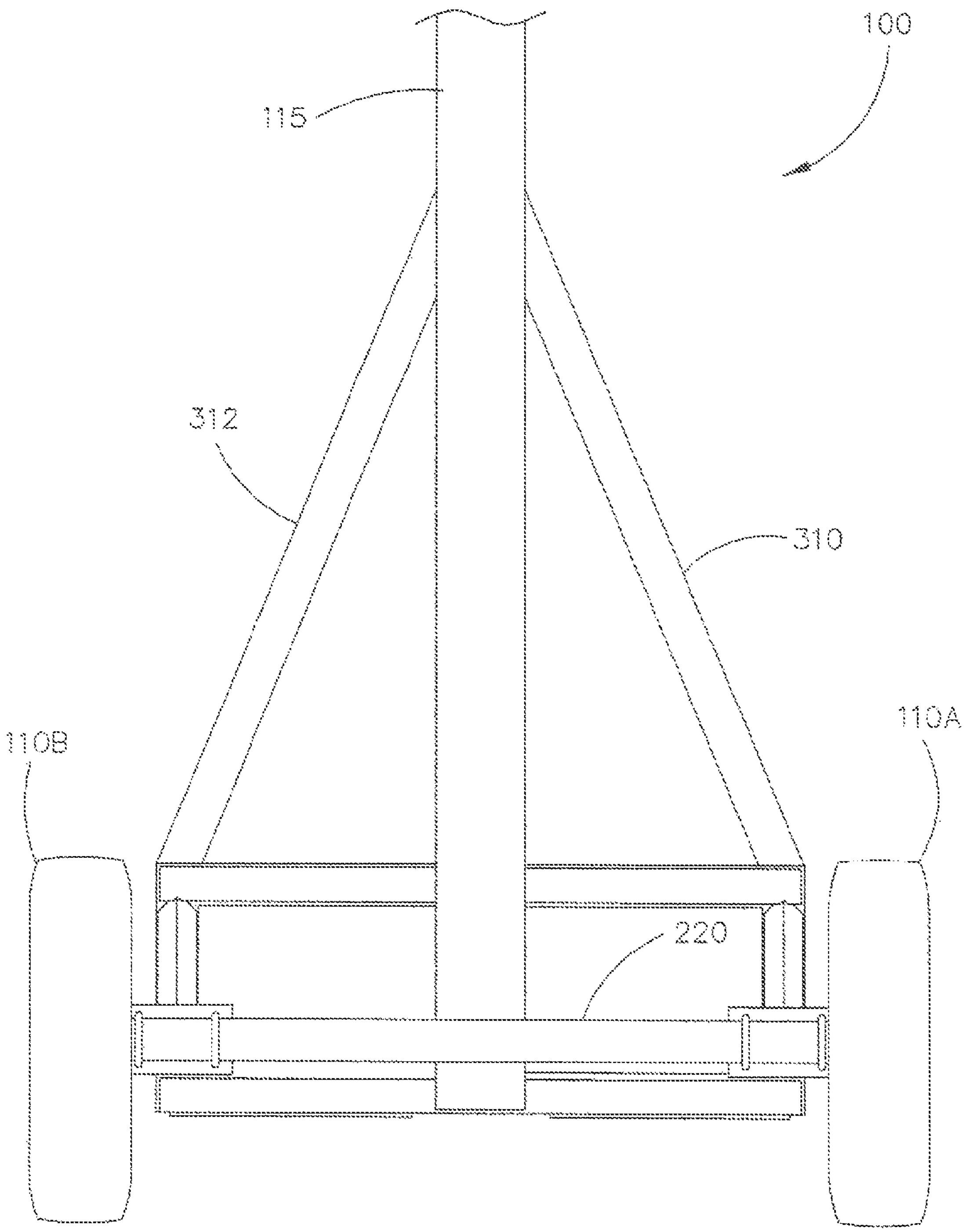

Referring to FIGS. 2 & 3B, exploded views of a lift attachment apparatus 100 in accordance with an embodiment of the present disclosure are shown. It is contemplated that pair of wheels may be coupled to the frame via an axle 220. Frame may also include a coupler 210, the coupler 210 being a non-swiveling member. Coupler 210 may refer to at least one arm that connects pair of wheels 110, via the axle 220, to the attachment device 105. In an embodiment of the disclosure, coupler 210 may be generally perpendicular to the attachment device 105. It is contemplated that coupler 210 may include a suspension device, solid cover (e.g. formed as a box), oriented at angles, and the like according to various embodiments of the present disclosure.

Referring to FIGS. 3A-3B, bottom views of a lift attachment apparatus in accordance with an embodiment of the present disclosure are shown. As shown, boom 115 may be implemented as a rod or pole. It is contemplated that frame of apparatus may include one or more supports 310, 312 to increase strength and lifting capacity of boom 115. As shown in FIG. 3B, pair of wheels 110A, 100B may be coupled to the frame via an axle. It is contemplated that a first wheel 110A of the pair of wheels may be located on a first side of the frame and a second wheel 110B of the pair of wheels may be located on a second side of the frame, the first wheel configured to be maintained parallel to the second wheel. In an embodiment, each wheel 110A, 110B may include a tire.

Figure 4:
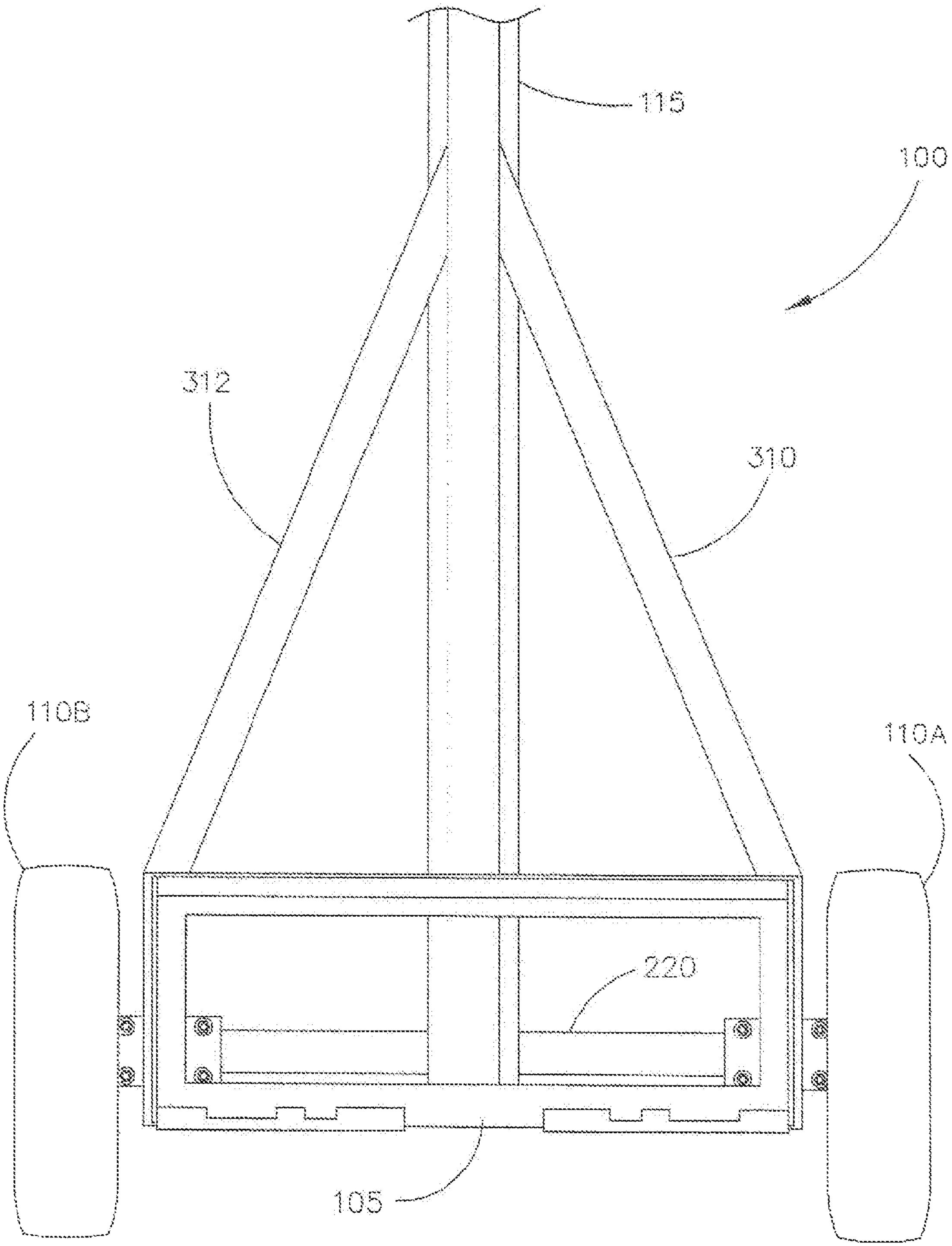
FIG. 4 depicts a top view of a lift attachment apparatus in accordance with an embodiment of the present disclosure.
Figure 5A:
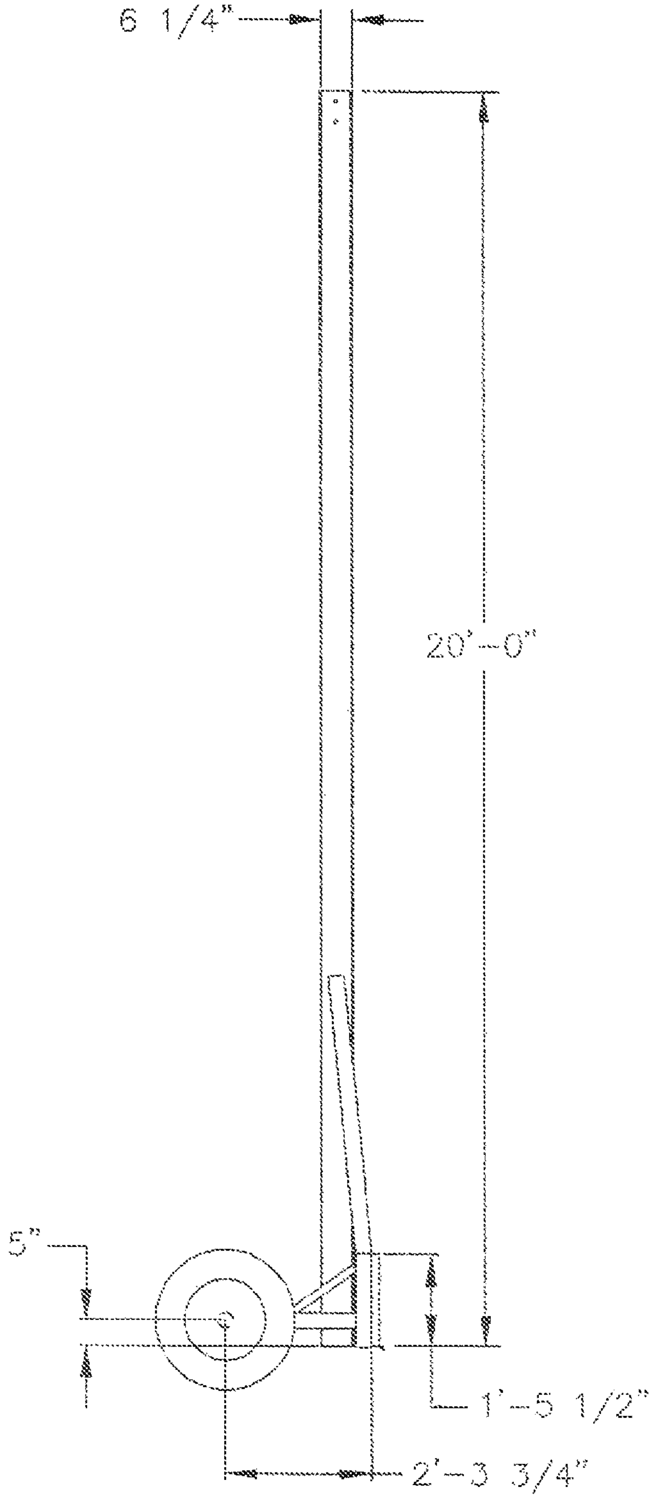
FIGS. 5A-5B depict exemplary dimensions of a lift attachment apparatus 100 in accordance with an embodiment of the present disclosure.
Figure 5B:
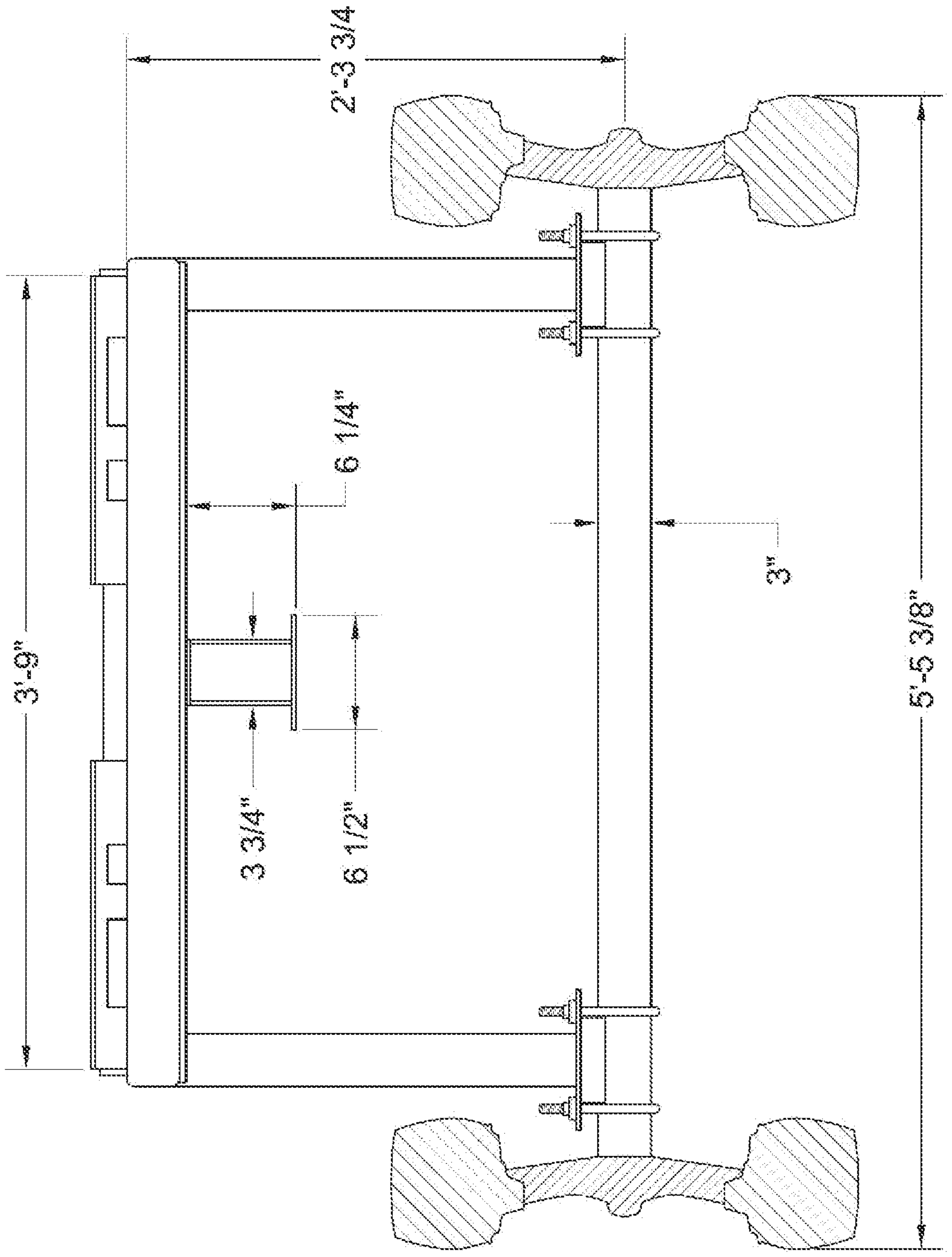

Referring to FIG. 4, a top view of a lift attachment apparatus 100 in accordance with an embodiment of the present disclosure is shown. FIGS. 5A-5B depict exemplary dimensions of a lift attachment apparatus 100 in accordance with an embodiment of the present disclosure. While the dimensions shown in FIGS. 5A-5B may be employed, it is contemplated that the dimensions may be adjusted without departing from the scope and intent of the present disclosure.

Figure 6:
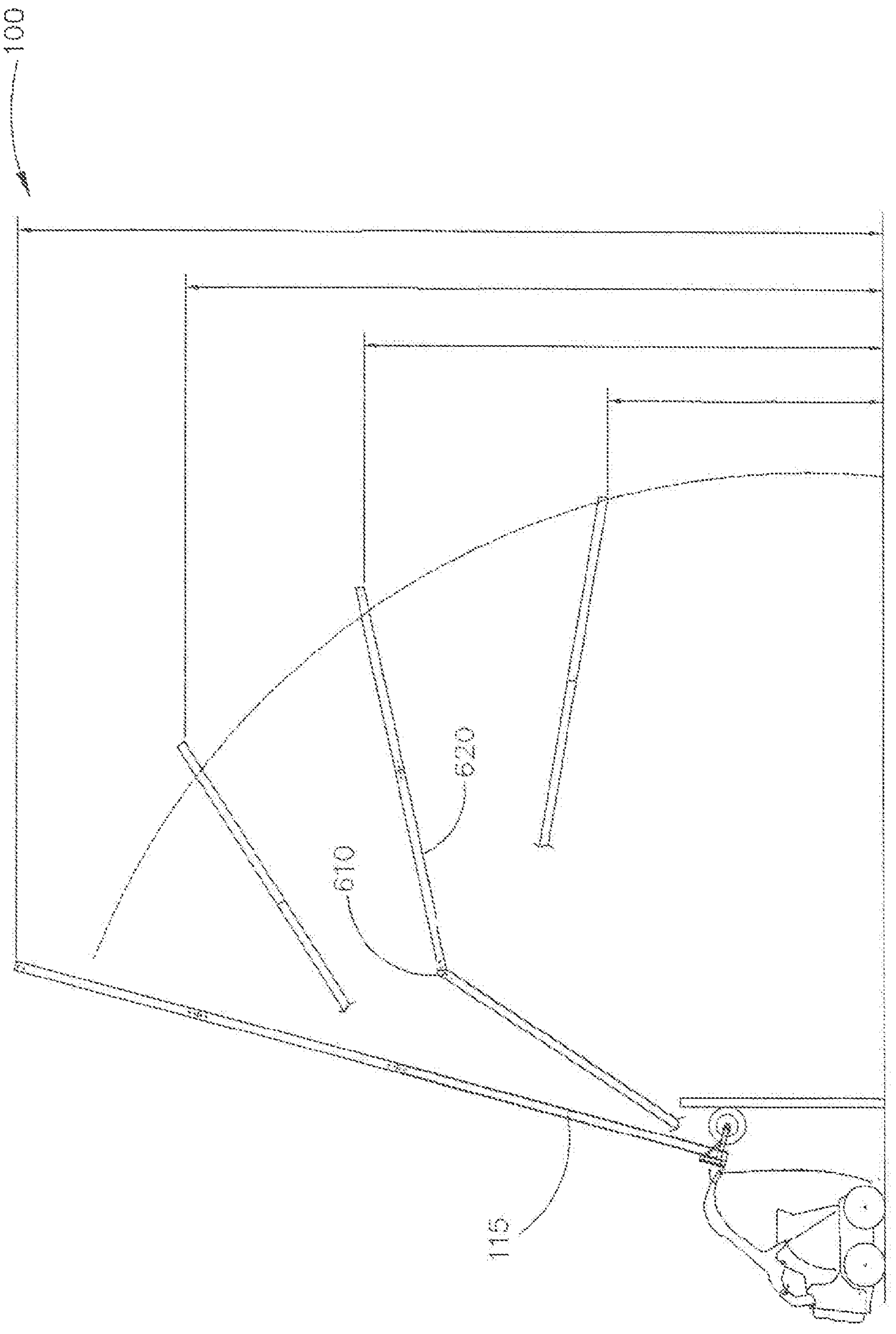
FIG. 6 depicts a lift attachment apparatus which further includes an additional extension rod in accordance with an embodiment of the present disclosure.

Referring to FIG. 6, a lift attachment apparatus 100 which further includes an additional extension rod in accordance with an embodiment of the present disclosure is shown. It is contemplated that boom 115 may further include a connector 610 coupled to an end of the boom. Connector 610 may connect boom 115 with an extension rod 620 to increase the height capacity and range of the lift apparatus 100 to exemplary heights. Connector 610 may be a straight connector, a 90 degree connector, or a 45 degree connector. Additionally, connector 610 may be an adjustable connector and also may range from 0 to 90 degrees. As shown in FIG. 6, lift attachment apparatus 100 may be supported against a vertical wall in order to increase the vertical range of the lift attachment apparatus 100. It is further contemplated that lift attachment apparatus 100 may be supported against a generally horizontal surface on a different horizontal elevation than the loader 130 to increase vertical range and horizontal range. It is further contemplated that boom 115 may further include a towing device configured to be coupled with an end of the boom 115 as shown in FIG. 1A. The towing device may include a receptacle to connect with a vehicle. For example, towing device may include a receptacle to connect with a ball hitch of a vehicle.

The lift attachment apparatus 100 as described and shown in FIGS. 1-6 provide a number of advantages. It is common that contractors may have access to a loader due to the reduced cost of a loader as compared to lifts and cranes. Additionally, through use of various attachments, loaders may be more likely to be owned due to their multiple functions, usability, and operability without specialized skill. However, previous implementations of booms with loaders are limited due to their low lift capacity, reach or mobility.

Lift attachment apparatus 100, by use of the pair of wheels 110, operating between the loader 130 and the load at the end of the boom 115, may operate as a lever. This configuration and capability to operate as a lever may dramatically improve the lift capacity of the boom 115 as compared to previous implementations. For example, the use of the pair of wheels 110 as the fulcrum, may allow an amplification of the input force provided by a loader 130 when applied to the attachment device 105 of the lift attachment apparatus 100 in order to provide a greater output force. It is contemplated that mechanical advantage of the lift attachment apparatus 100 may be greater when the pair of wheels 110 at the point to where the pair of wheels 110 come into contact with a surface is located between the attachment device 105 that is coupled to a tilting plane of a loader 130 and the load which is located at the end of the boom 115, as shown in FIG. 1B. Additionally, it is contemplated that a center point of the pair of wheels 110, (e.g. the point at which the wheels may contact the axle), may also be forward of the attachment device 105 whereby mechanical advantage of the lift attachment apparatus 100 may be greater. Use of the lift attachment apparatus 100 may allow transport of material while the loader is located more than thirty feet away or greater, which may be particularly valuable in muddy conditions or other conditions in which a surface is not solid. It is contemplated that in this arrangement, that the wheels 110 and axle 220 are in non-swiveling fixity alignment, being fixed in their alignment, being stable, and may continually act as a functional fulcrum in moving a load.

Referring again to FIG. 2, attachment device 105, coupler 210, and pair of wheels 110 may be in proximity to each other. It is contemplated, in an alternative embodiment, that pair of wheels 110 and coupler 210 may be shifted toward the end of the boom 115 while the attachment device 105 remains in the present positon as shown in FIG. 2. For example, it is contemplated that such design according to an alternative embodiment may be desirable for larger loads.

Figure 7:
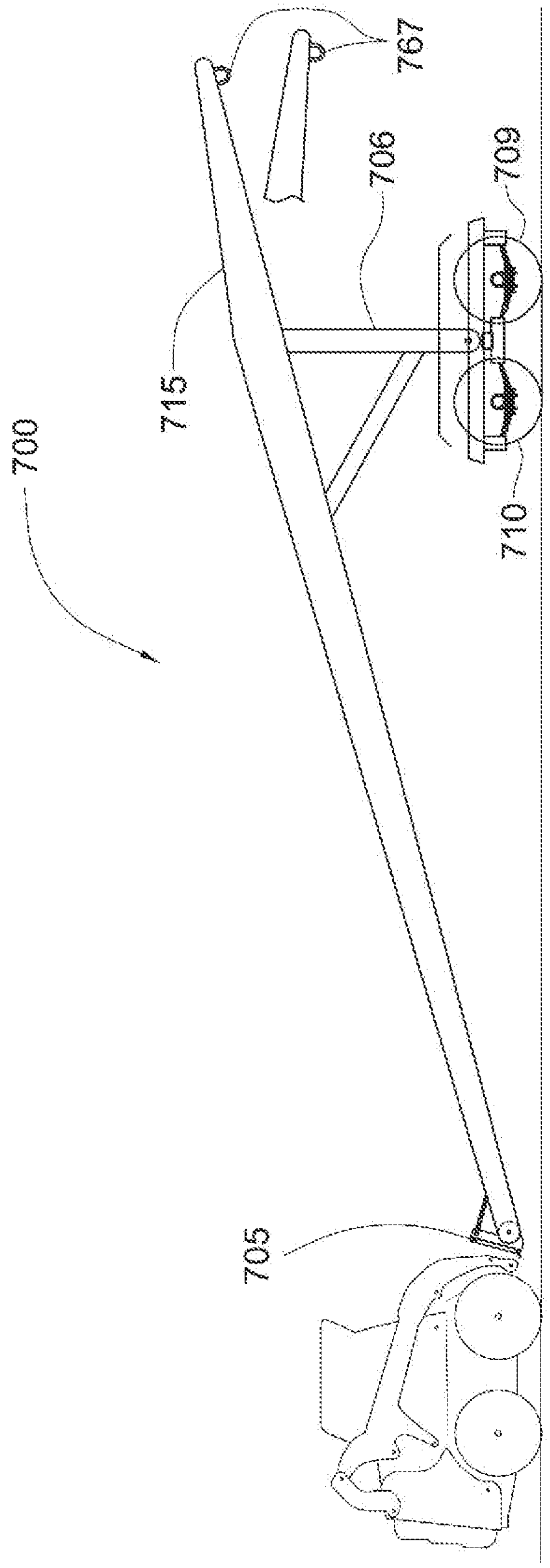
FIG. 7 depicts a lift attachment apparatus according to an alternative embodiment of the present disclosure.

Referring to FIG. 7, a lift attachment apparatus 700 according to an alternative embodiment of the present disclosure is shown. Lift attachment apparatus 700 may include an attachment device 705. Attachment device 705 may be configured to attach to a tilting plane of a loader. It is contemplated that attachment device 705 may be a quick attachment device in use with various types of attachments to connect with loaders. Lift attachment apparatus 700 may include a boom 715, a vertical tilting non-swiveling coupler 706, pair of wheels or may include multiple pairs of wheels being front wheels 709 and rear wheels 710, and hoop loading point 767. It is contemplated that lift attachment apparatus 700 may be suitable for substantially heavy loads. It is contemplated that a Bobcat S205 would be able to lift 13 tons with lift attachment apparatus 700. It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, but may rock in a generally vertical direction against the ground as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction.

Figure 8A:
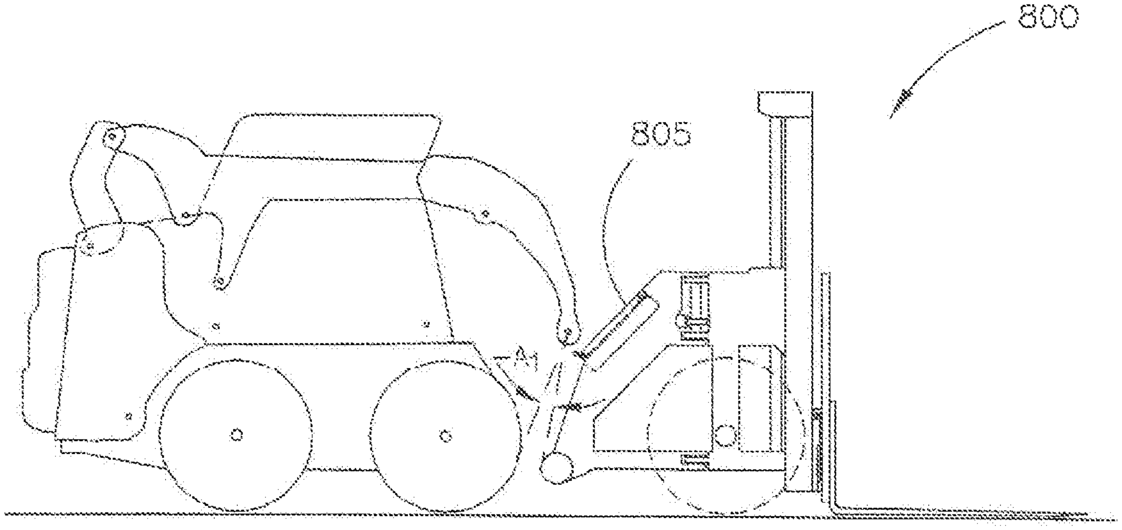
FIGS. 8A-8G depict a lift attachment apparatus according to an additional alternative embodiment of the present disclosure.
Figure 8B:
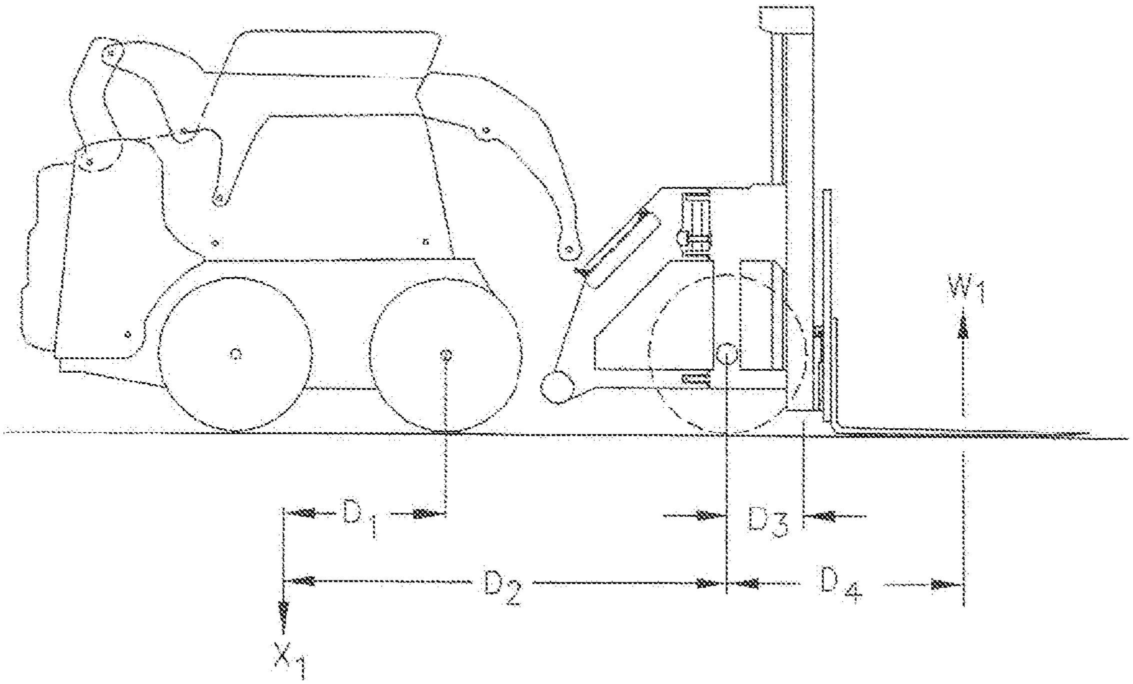
Figure 8C:
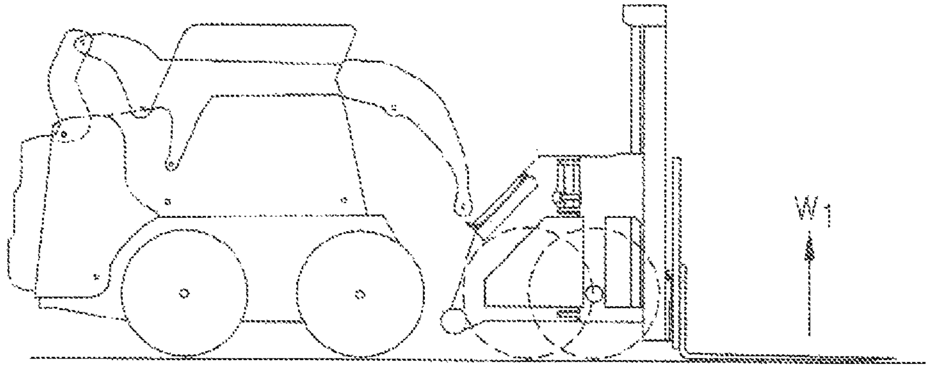
Figure 8D:
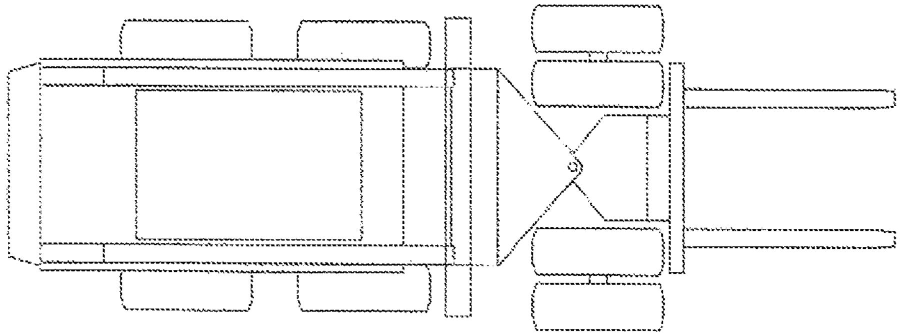
Figure 8E:
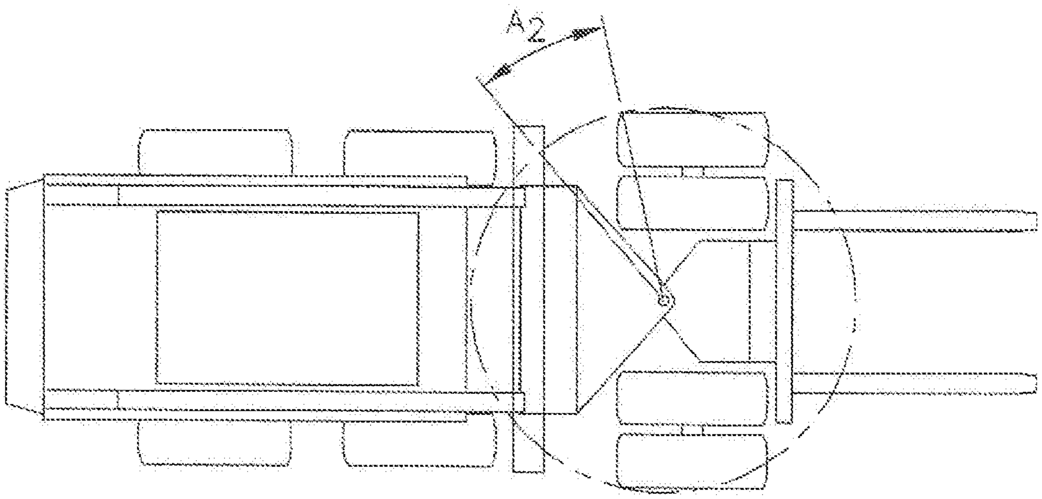
Figure 8F:
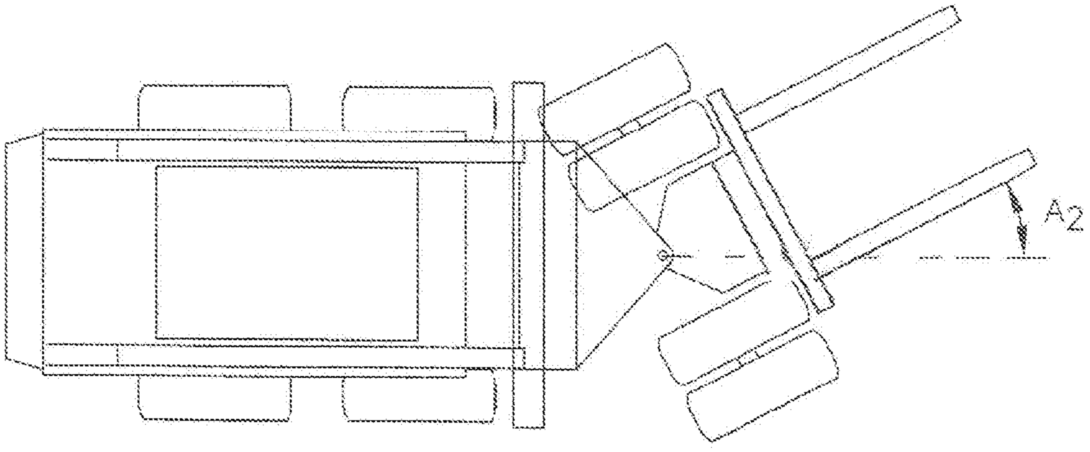
Figure 8G:
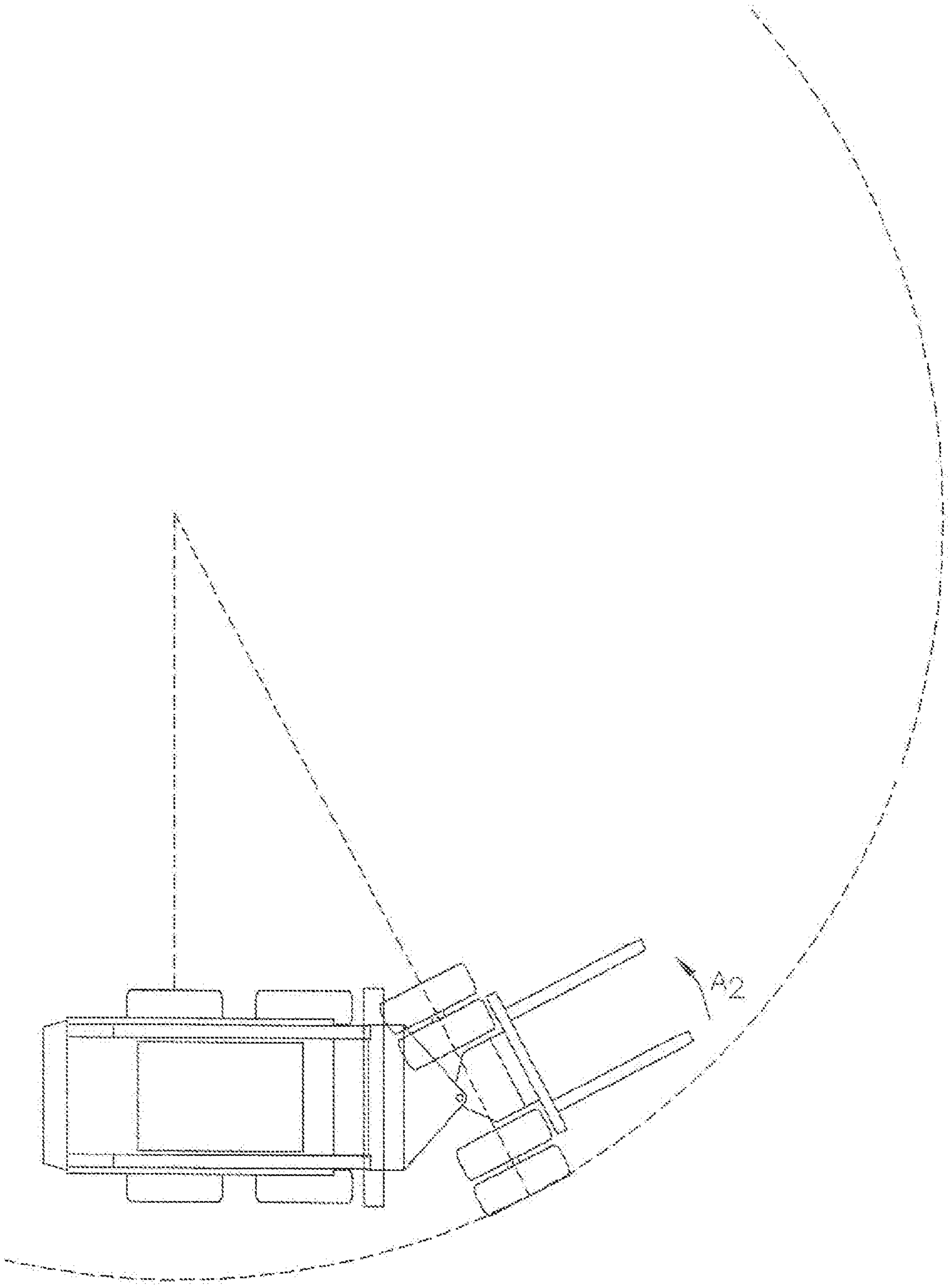

Referring to FIGS. 8A-8G, a lift attachment apparatus 800 according to an additional alternative embodiment of the present disclosure is shown. Lift attachment apparatus 800 may be configured as a forklift attachment for a loader. Lift attachment apparatus 800 may include an attachment device 805. Attachment device 805 may be configured to attach to a tilting plane of a loader. It is contemplated that attachment device 805 may be a quick attachment device in use with various types of attachments to connect with loaders. As shown in FIG. 8C, the dashed line closest to the loader may be exemplary wheel placement when turning while the other dashed line may refer wheel placement when moving in a generally straight direction. Referring to FIGS. 1A, 7, 8H, 9A, 10A, 11E, 12A, 13F, 13G & 14A, it is further contemplated that for attachment wheel(s) 110, 810, 910, 1010, 1110, 1210, 1310 & 1410, the wheel's angle may be fixed in relationship to the boom, a set of forks or the loader and the center of the wheel(s) of the attachment be between the loader and the center of the load area. It is contemplated that a loader, a load area and attachment wheel(s) may operate to act as a fulcrum behind the load. To describe it in more specific detail, the three systems are further defined in the following as including: 1, a loader of a type with forward facing quick attachment capabilities where the attachment can be lifted as a primary function and tilted as a primary function with the controls of the loader from the loader operator's position; 2, a load area which may be on a boom, forks or other load holding system where the system has a point(s) for a center of a load to be secured; and 3, a wheel(s) between the loader and the load area center point(s), with the center of the wheel(s) being in a state of fixity of direction between the loader and the load area center point(s) through articulation, steering as a primary function or held in a tightly regulated angle vertically and horizontally at all times as it serves for the wheel(s) to maintain mechanical advantage as a fulcrum in all necessary tipped angles of operation.

Lift attachment apparatus 800 may include a forklift which may include at least one hydraulic cylinder to control the raising and lowering of the forklift. Additionally, lift attachment apparatus 800 may include a hydraulic cylinder to control steering of the lift attachment apparatus 800. It is contemplated that the lift attachment apparatus 800 may utilize at least one auxiliary hydraulic controller of the loader to control operation of the at least one hydraulic cylinder for the forklift operation and steering. It is contemplated that at least one hydraulic cylinder may be a single acting hydraulic cylinder, a double acting hydraulic cylinder, gears, chains or in combination, and further may be powered electrically. It is contemplated that force applied by at least one forward facing loader arm in a downward motion along with upward lift of a tipping mechanism of the loader may cause force that creates upward leverage with the wheels of the lift attachment apparatus 800. Lift attachment apparatus 800 may increase safe operating capacity far beyond a tipping capacity of a loader using the loader's arms and/or tipping function.

Lift attachment apparatus 800 may or may not include wheels centered on the load which may cause the load to bob back and forth while in motion at an amount determined by the play in the lifting components of the loader. Lift attachment apparatus 800 may include brakes. Brakes and a small battery to power the brakes may be set with a standard variable brake controller and may be activated by the parking brake on the loader with a kit a heavy equipment mechanic could install. With brakes, loader and lift attachment apparatus 800 may operate similar as a truck with a car trailer that has independent brakes. Lift attachment apparatus 800 may or may not employ powered wheels that are operated with loader controls or tapped into the loader's left and right wheel controls. It is contemplated that lift attachment apparatus 800 may include a hitch for transport. The hitch may be a two inch interior width square pipe below the attachment device being integrated with safety chains. A two inch outside dimension square pipe with a coupler on the end may attach to a trailer ball on a vehicle. Forklift may further include additional forks to carry the weight, such as four forks. It is contemplated that the hydraulic capacity may be at least 7,200 lbs. with a Bobcat 2009 S205 skid-steer loader. As depicted, the loader may not physically tip forward until the load exceeds 12,000 lbs., but the loader's hydraulic bypass may be activated prior to a load being lifted above its resting place, which may be much safer than a standalone loader with forks. Wheels of the attachment 800 may be located behind moving parts of the attachment and may allow access into limited access spaces that an arrangement with which the wheels under or next to the forks may not fit into.

Figure 8H:
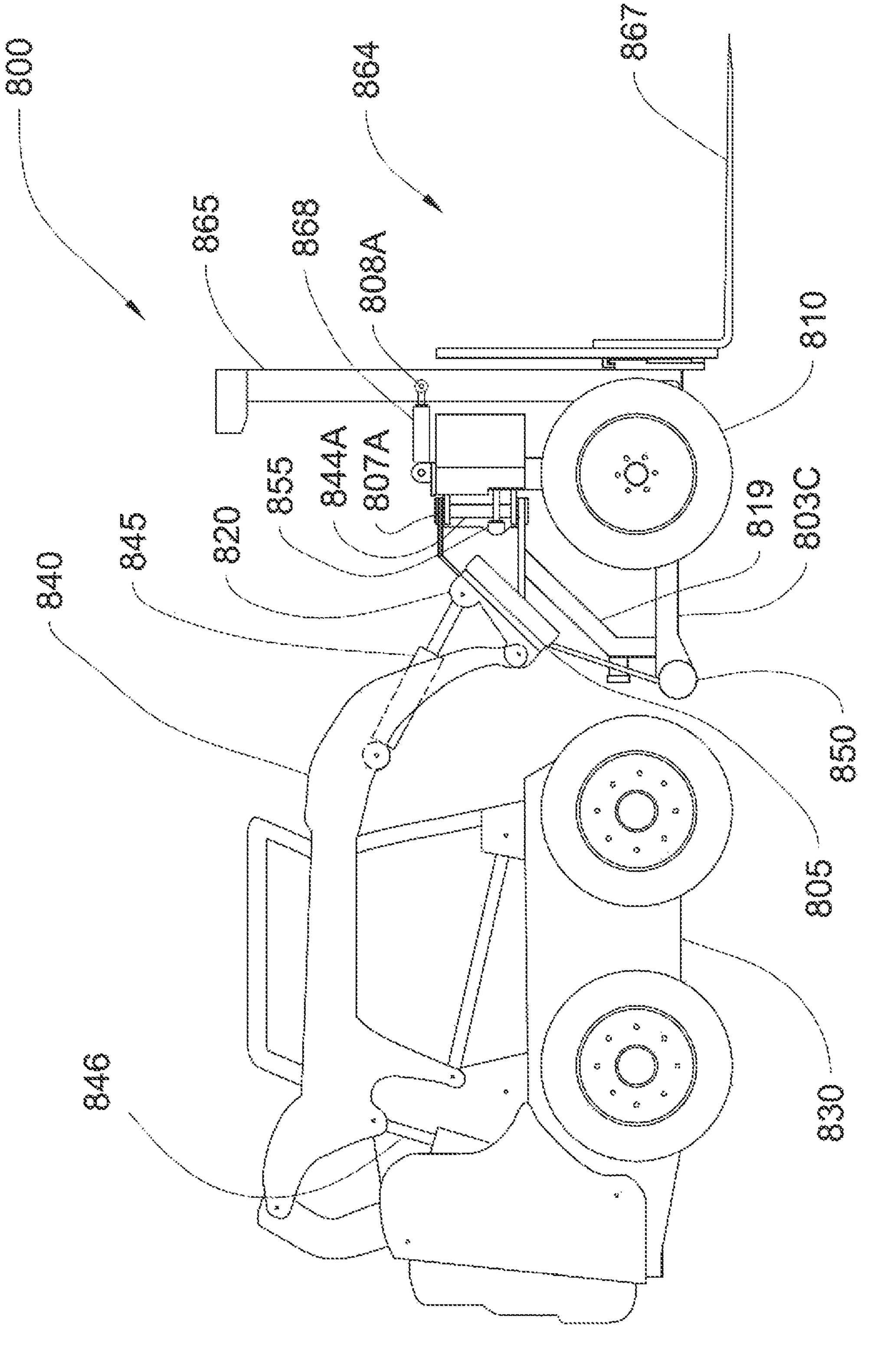
FIG. 8H depicts a side view of a lift attachment apparatus in accordance with an embodiment of the present disclosure.

Referring to FIG. 8H, it is contemplated that lift apparatus 800 may be configured as a forklift attachment for a loader. Lift apparatus 800 may include an attachment device 805. Attachment device 805 may be configured to attach to a tilting plane of a loader 820. It is contemplated that attachment device 805 may be a quick attachment device in use with various types of attachments to connect with loaders.

Figure 8I:
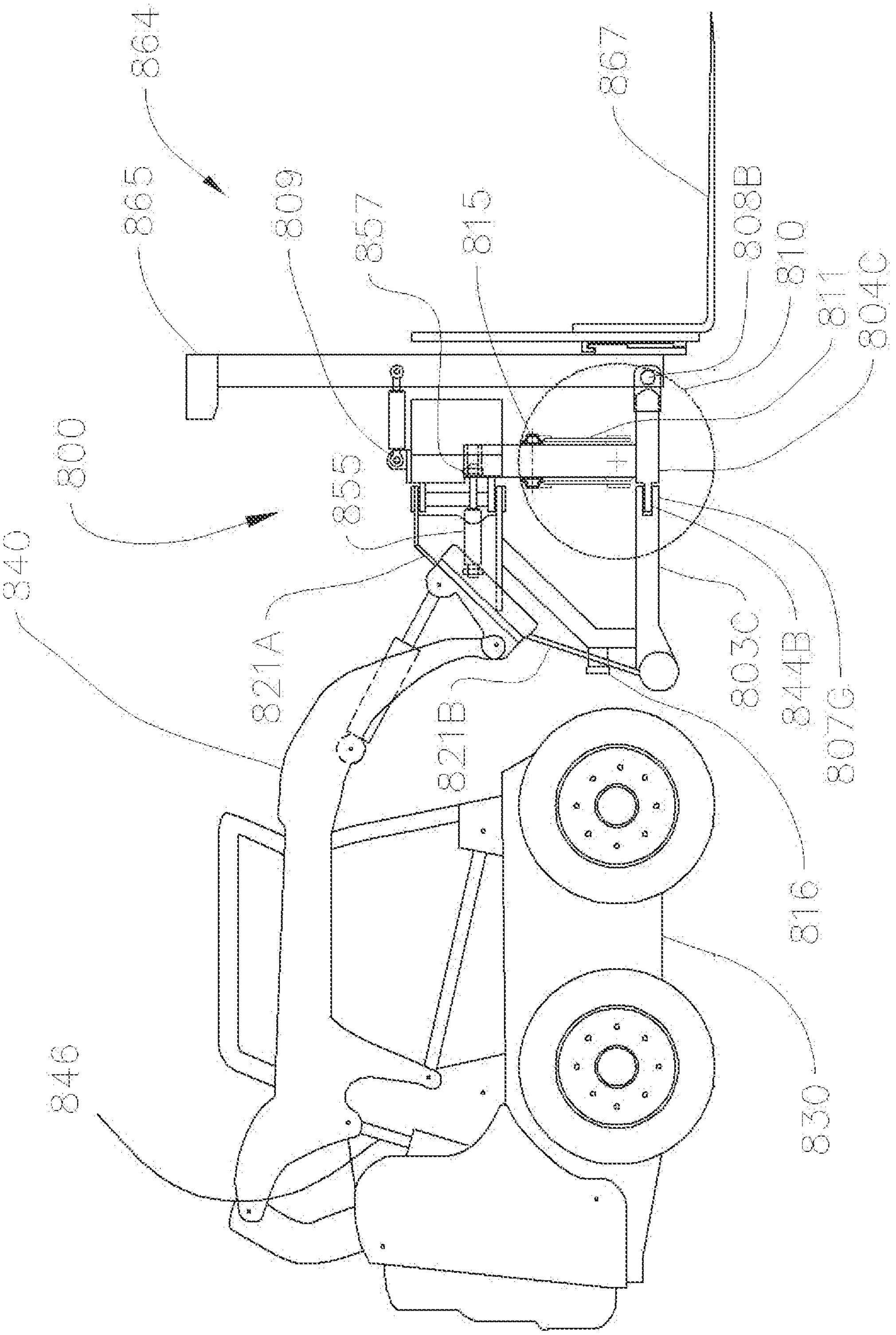
FIGS. 8I-8J depict exploded side views of a lift attachment apparatus in accordance with an embodiment of the present disclosure.
Figure 8J:
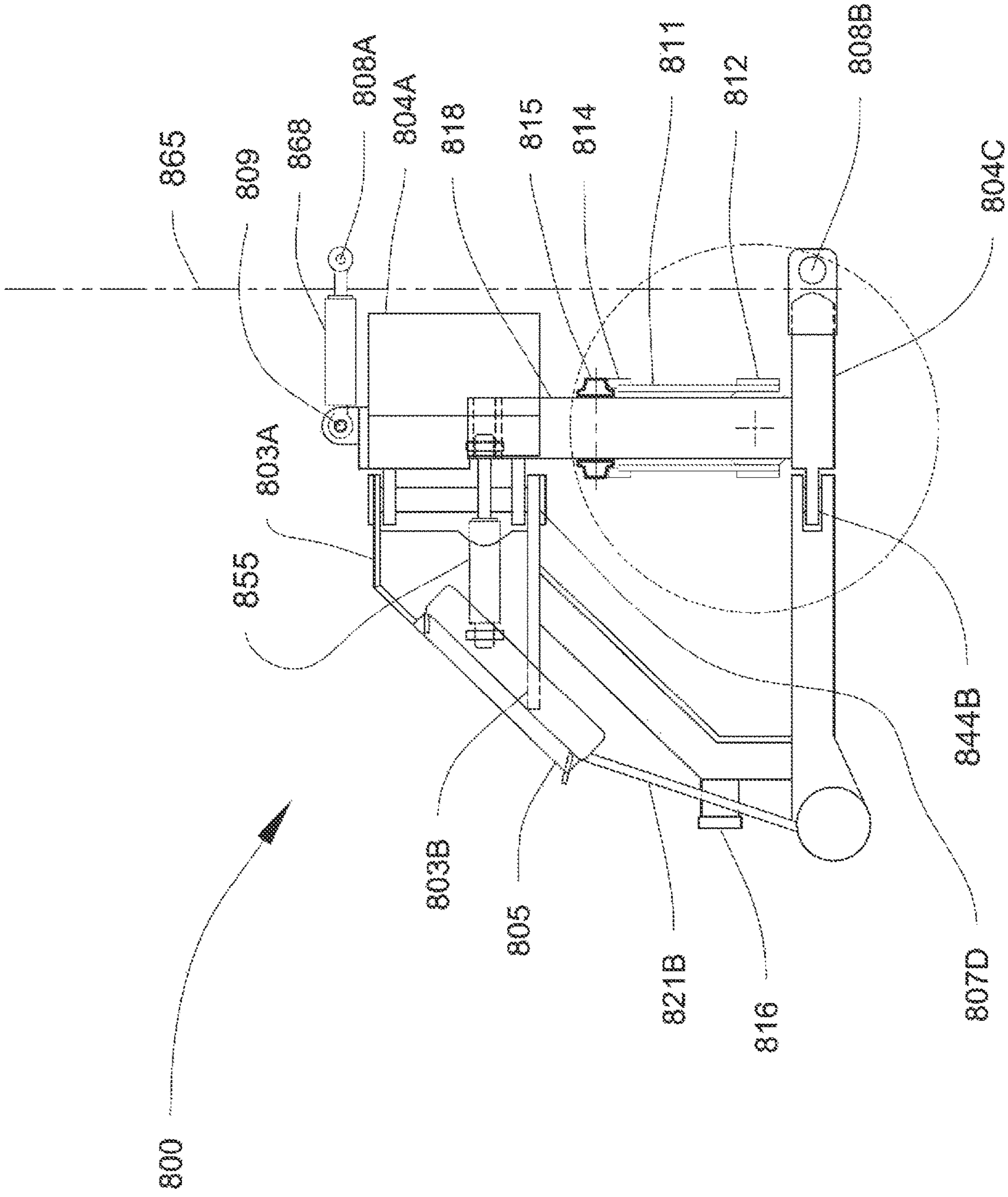
Figure 8K:
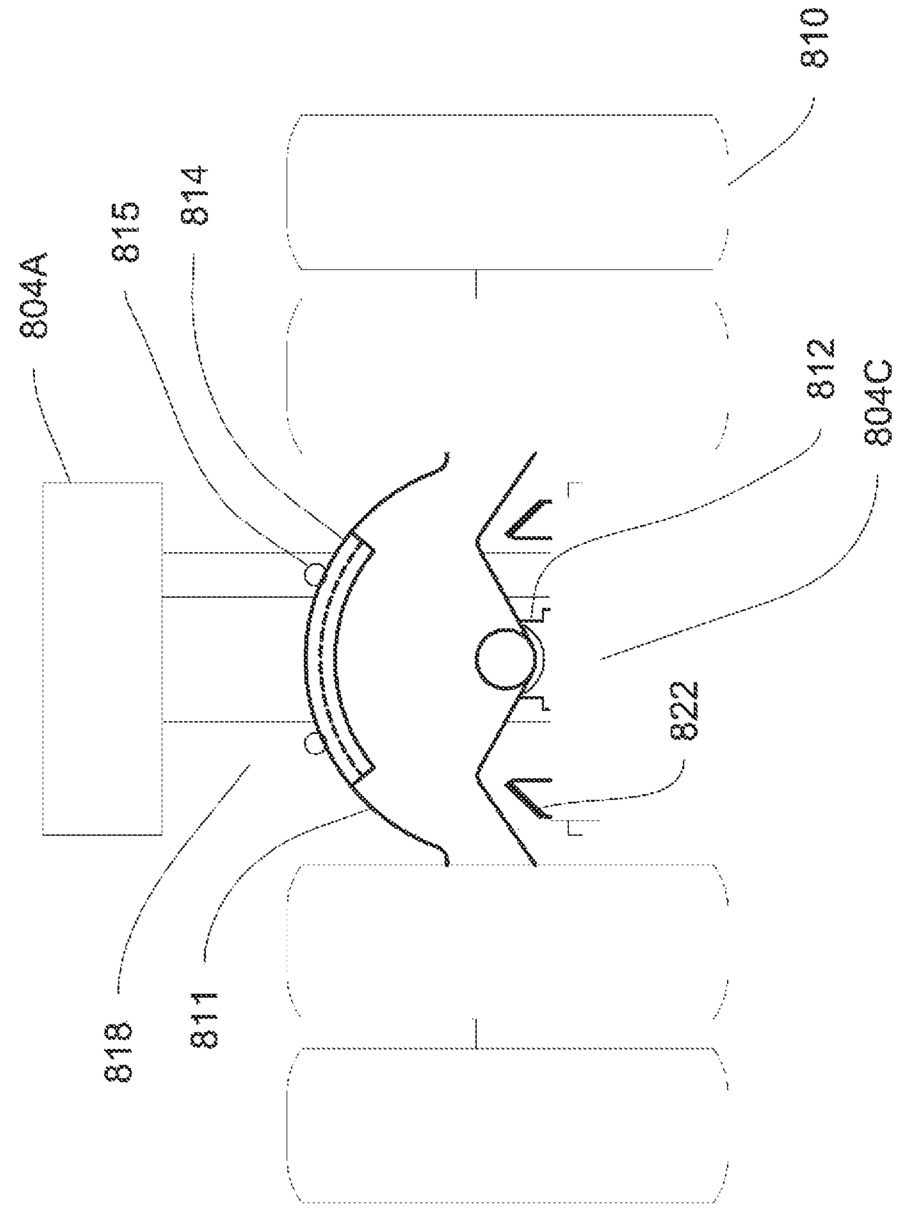
FIGS. 8K-8M depict exploded rear views of a lift attachment apparatus in accordance with an embodiment of the present disclosure.
Figure 8L:
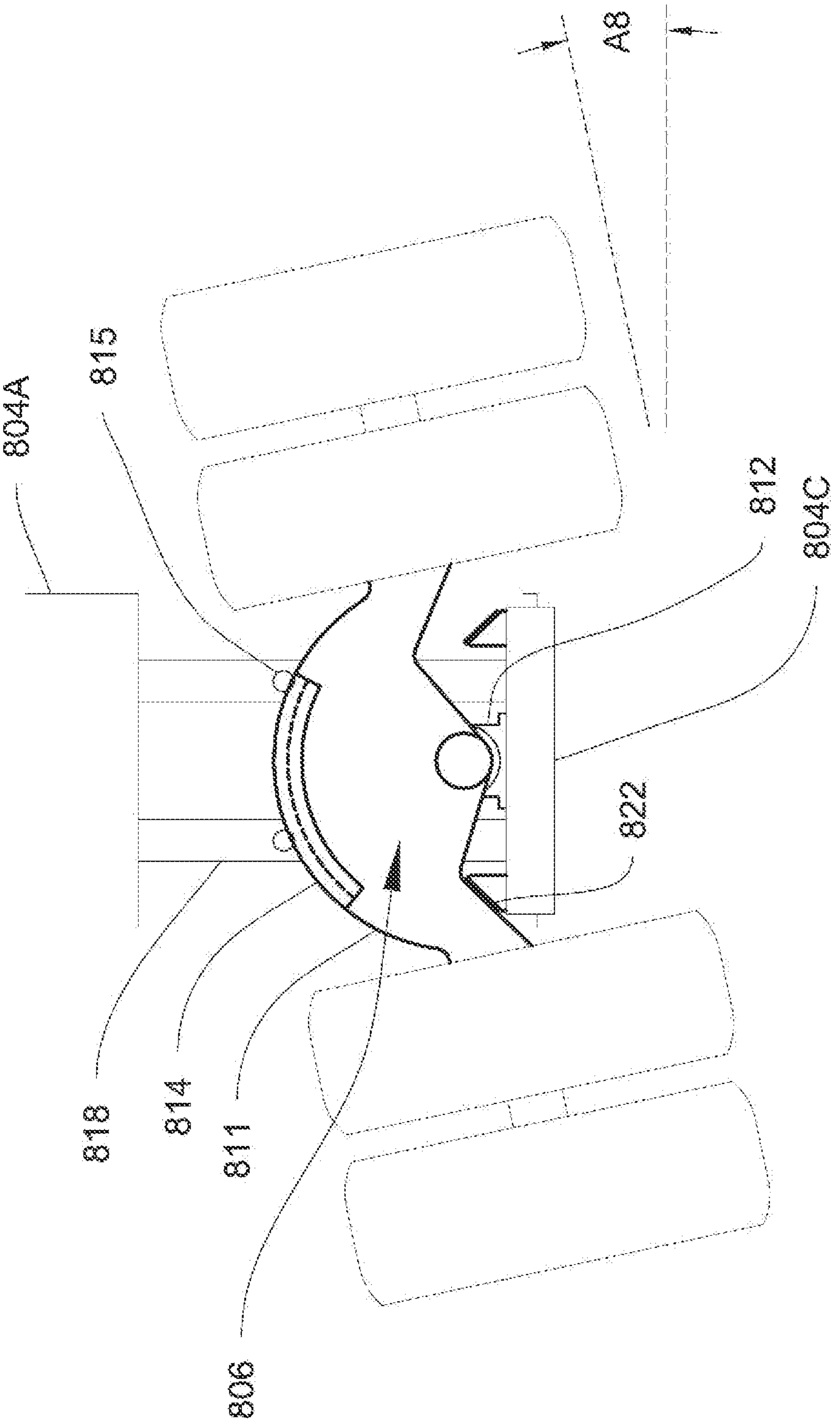
Figure 8M:
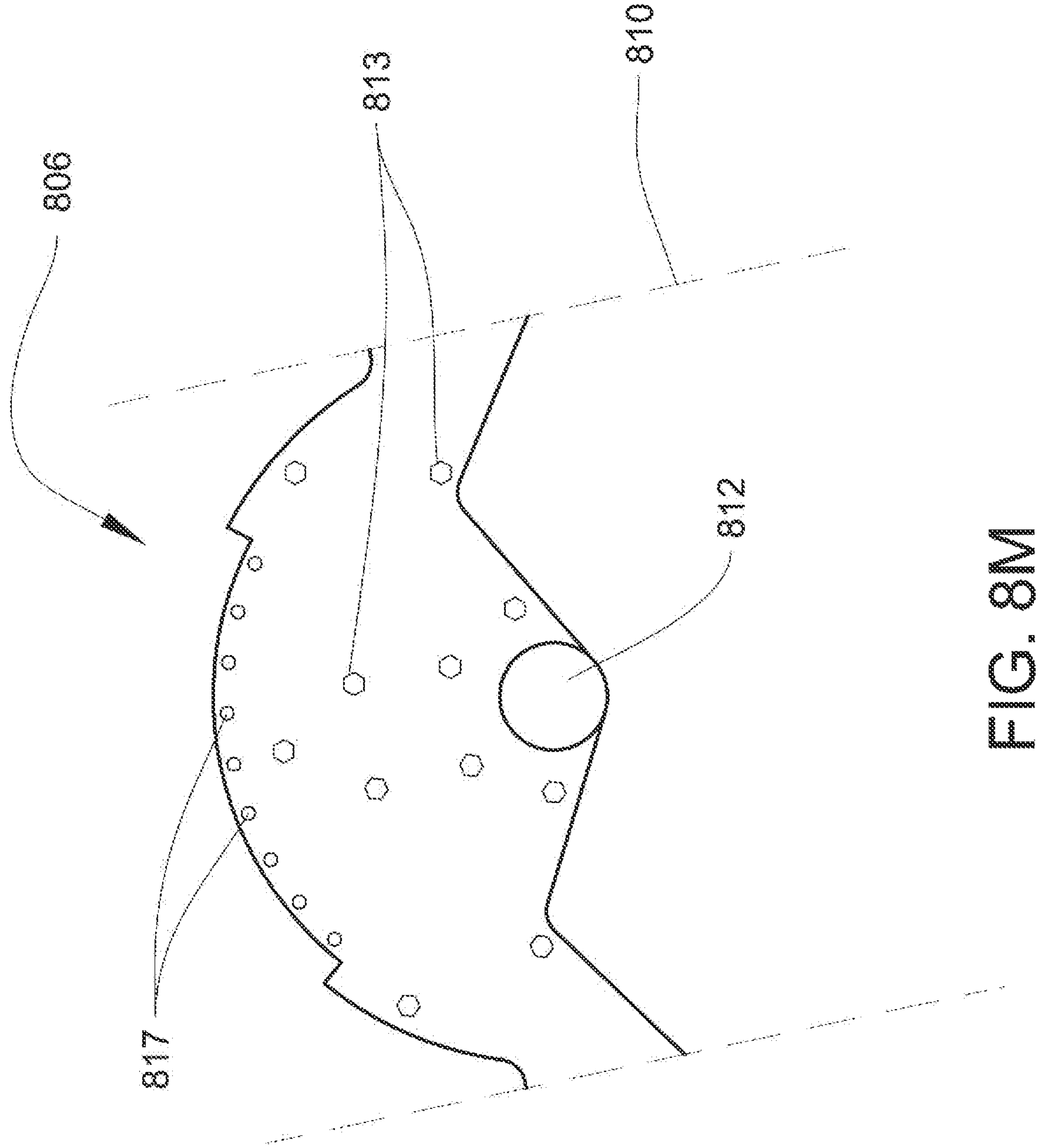
Figure 8N:
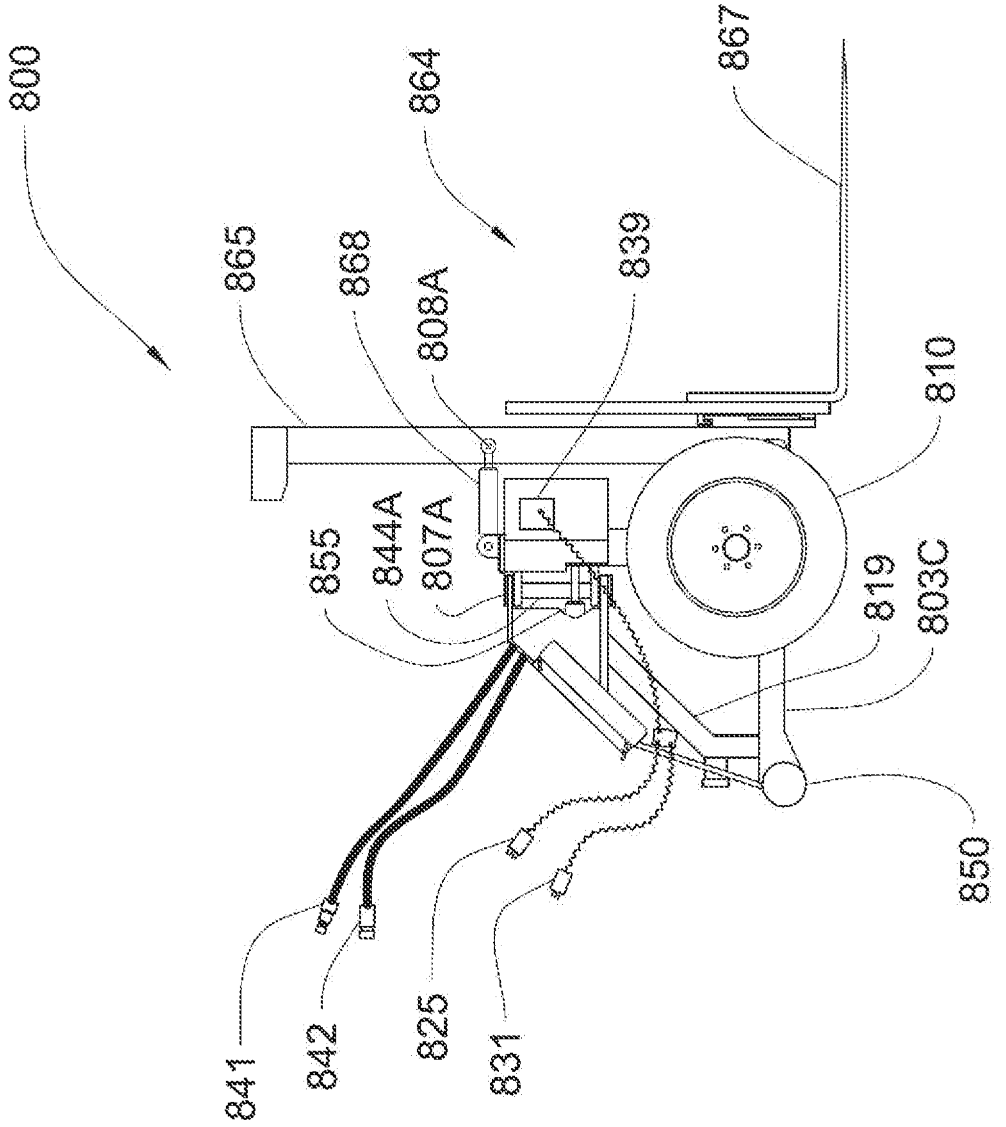
FIG. 8N depicts a side view of a lift attachment apparatus in accordance with an embodiment of the present disclosure.
Figure 8P:
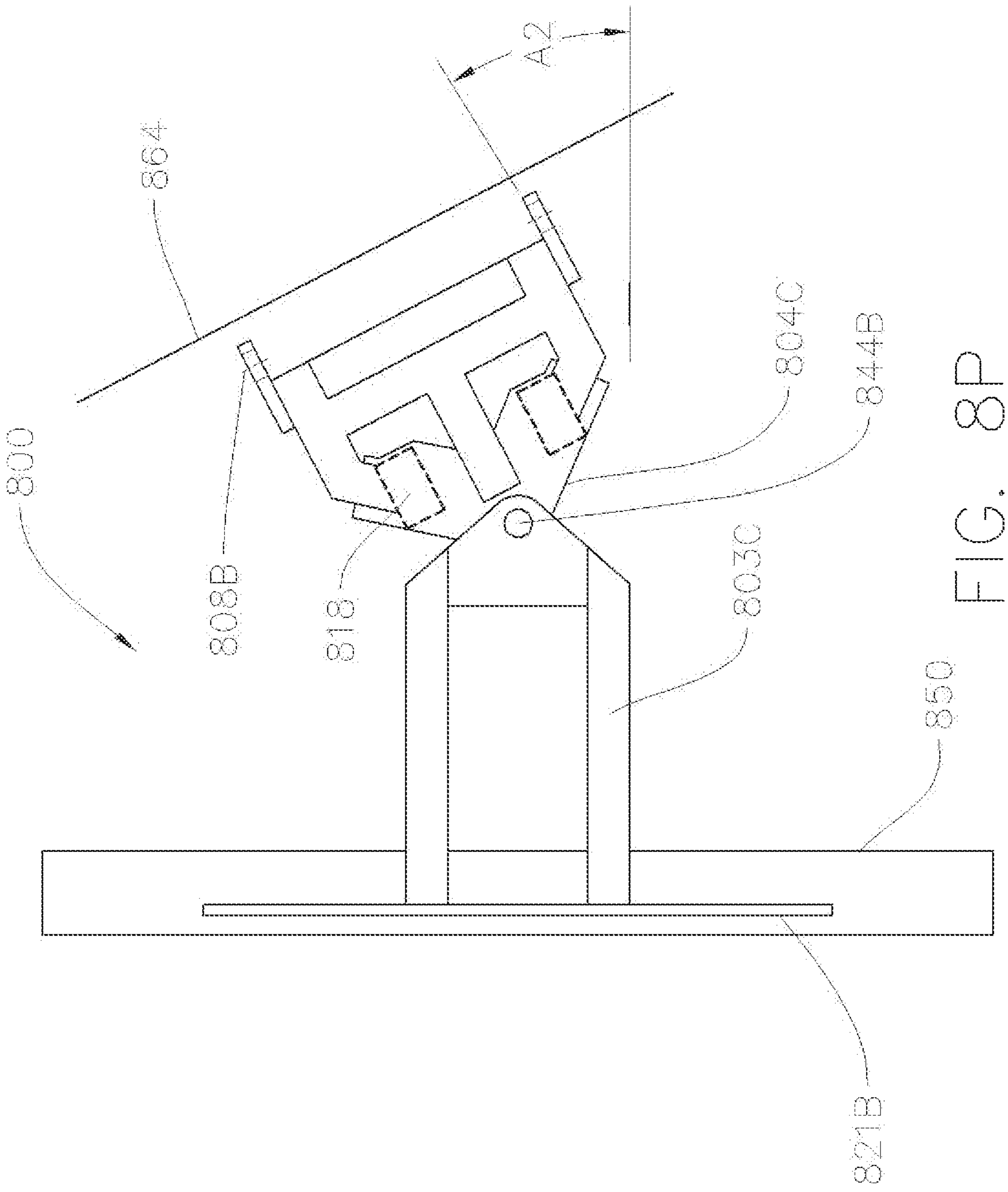
FIGS. 8P-8V depict exploded top views of a lift attachment apparatus in accordance with an embodiment of the present disclosure.
Figure 8Q:
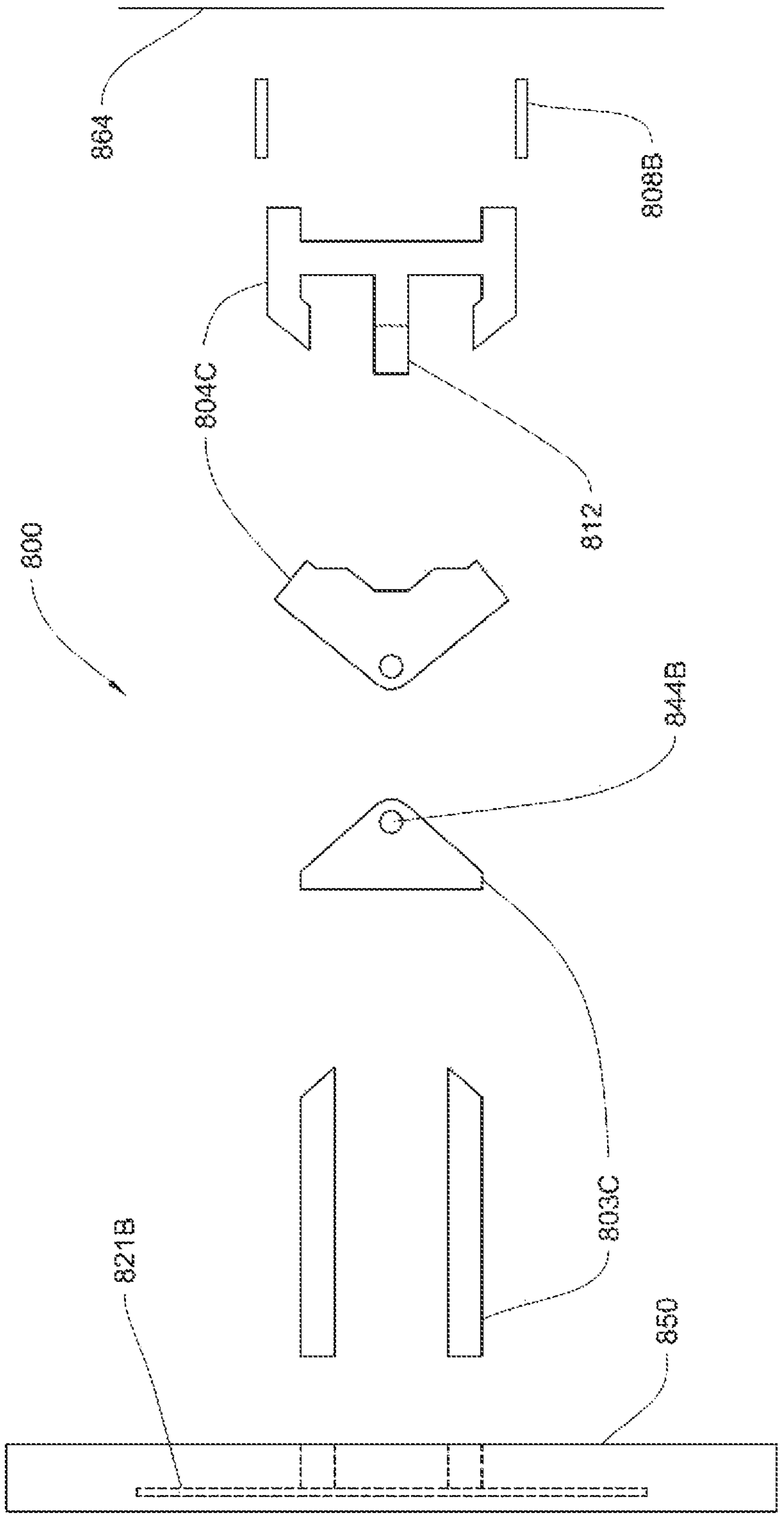
Figure 8R:
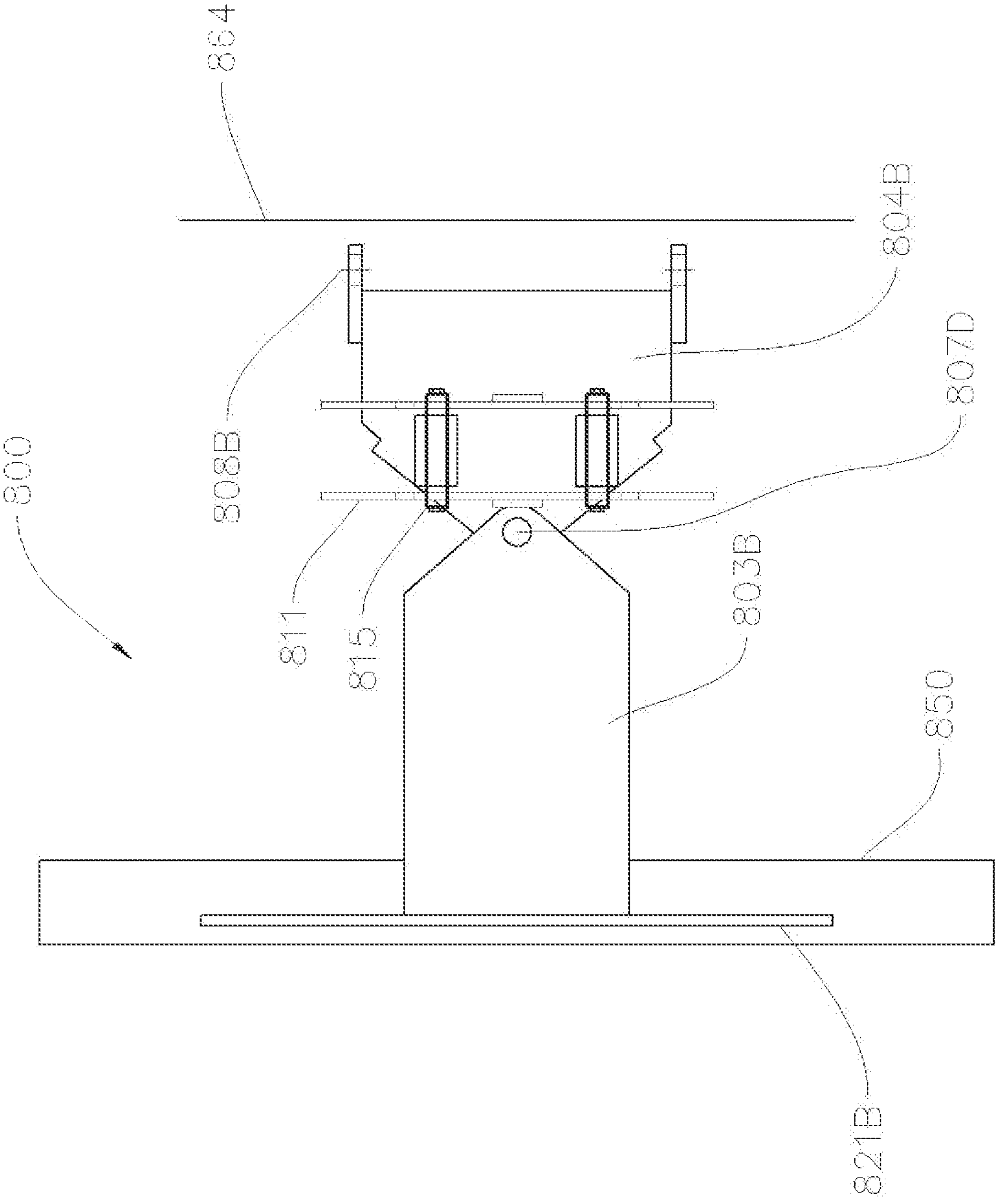
Figure 8S:
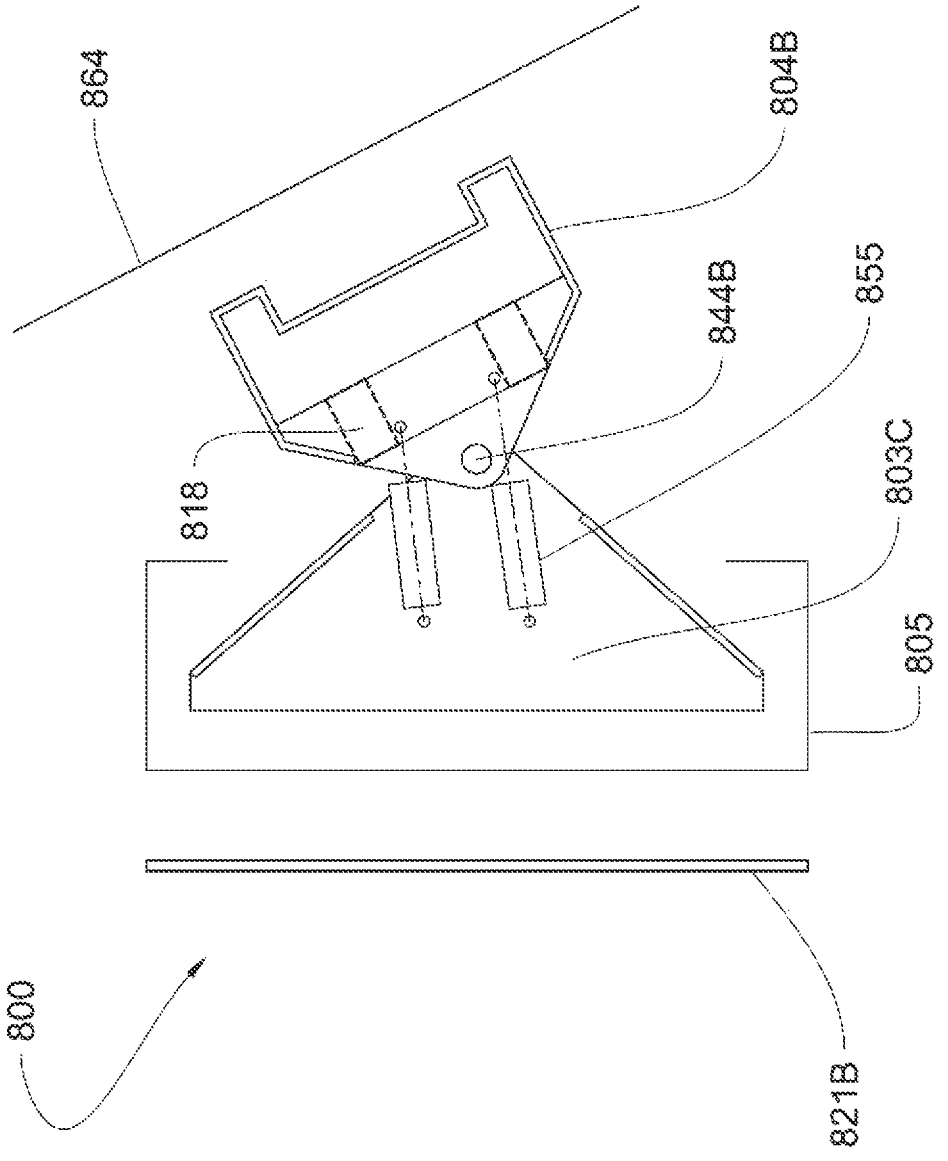
Figure 8T:
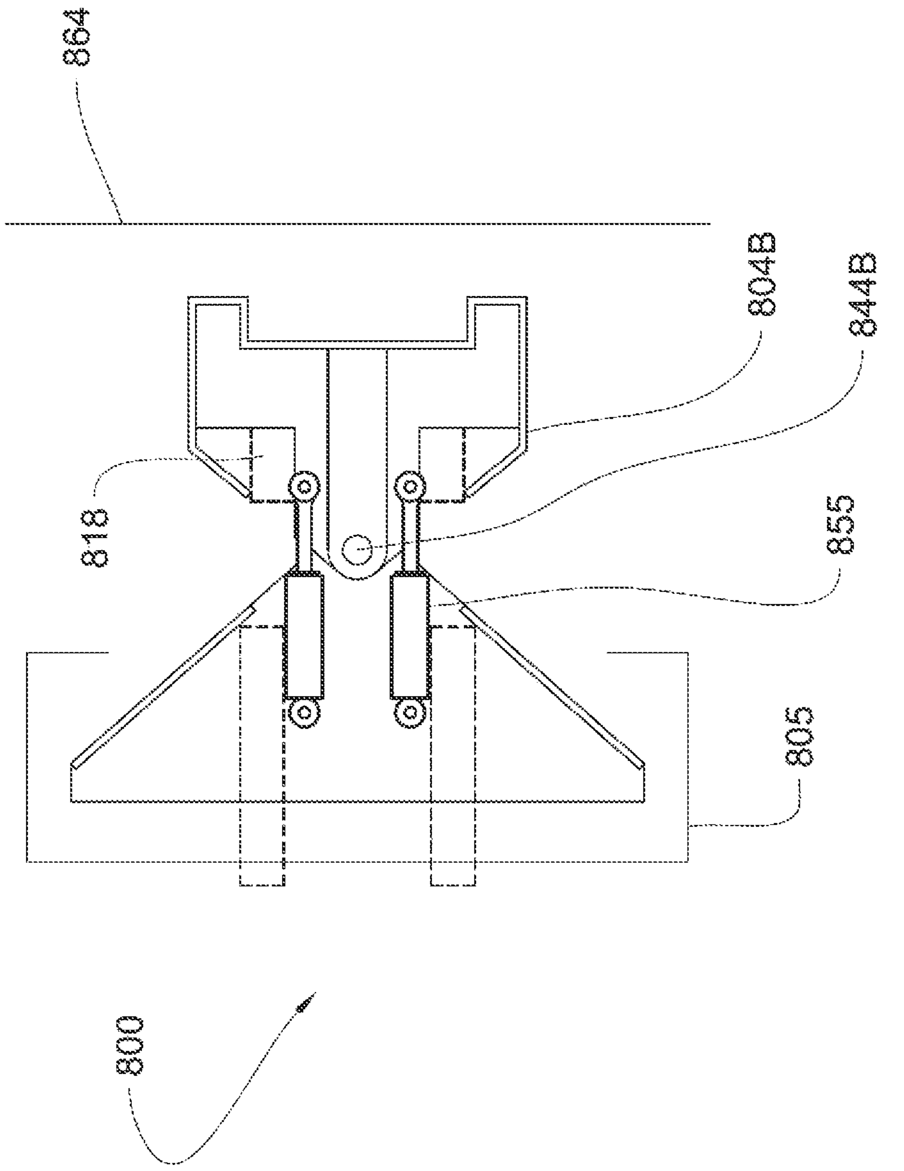
Figure 8U:
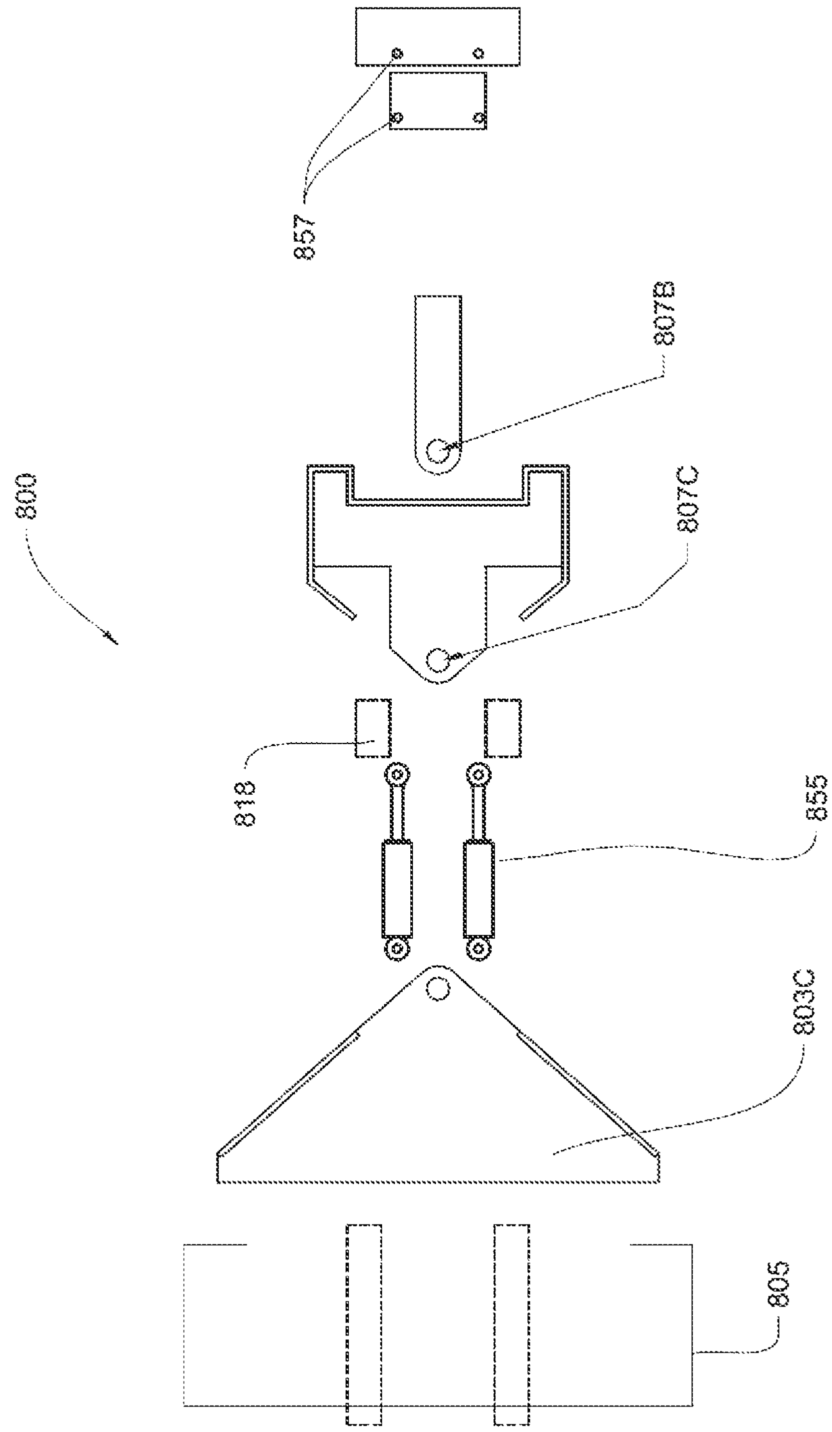
Figure 8V:
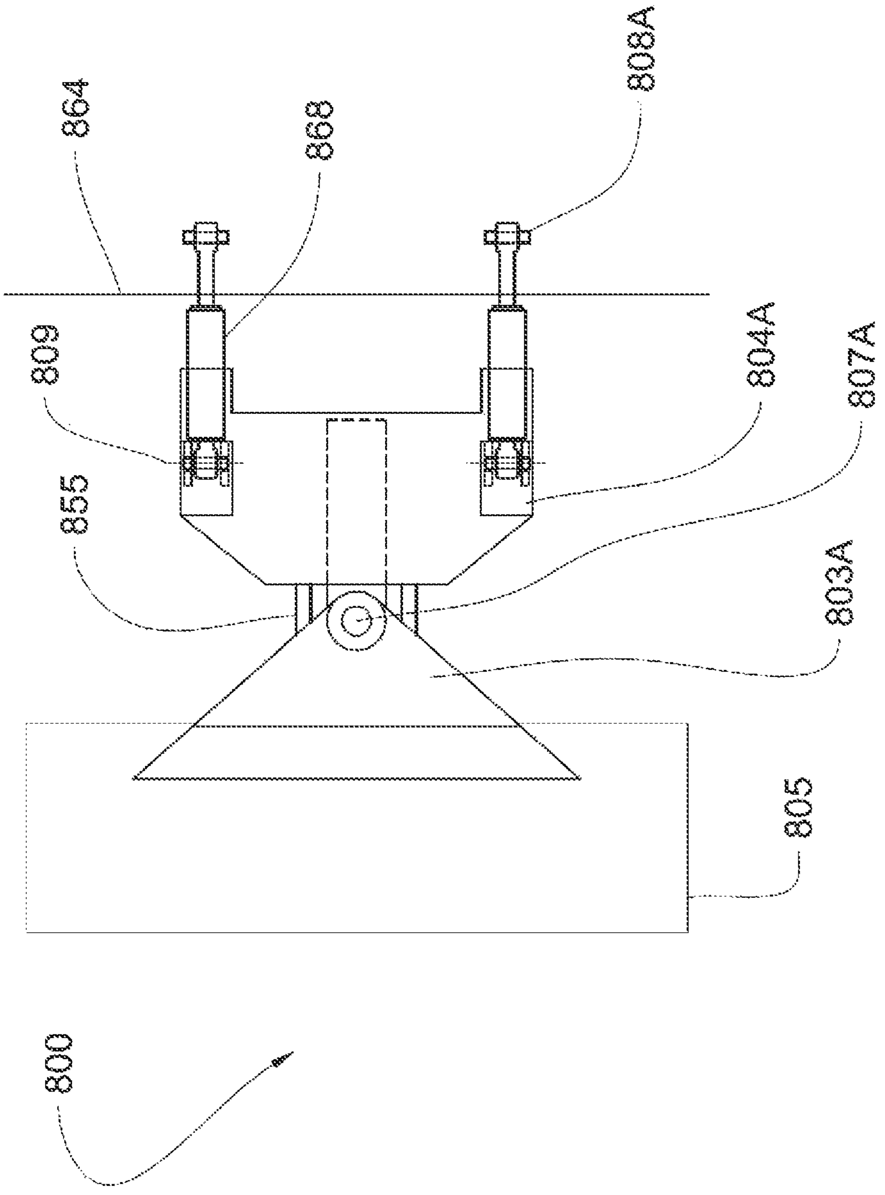

Referring to FIGS. 8H-8V, lift attachment apparatus 800 may include a forklift which may include at least one hydraulic cylinder of a third party manufactured forklift assembly with forks 864 to control raising and lowering of the forklift. Additionally, lift attachment apparatus 800 may include a hydraulic cylinder 855 to control steering of the lift attachment apparatus 800. It is contemplated that the lift attachment apparatus 800 may utilize at least one auxiliary hydraulic controller of the loader 830 to control operation of the at least one hydraulic cylinder 855 for the forklift operation and steering. It is contemplated that at least one hydraulic cylinder 855 may be a single acting hydraulic cylinder, a double acting hydraulic cylinder, gears, chains or in combination, and further may be powered electrically. It is contemplated that force applied by at least one forward facing loader arm 840 in a downward motion along with upward lift of a tipping mechanism of the loader 830 may cause force that creates upward leverage with the wheels 810 of the lift attachment apparatus 800. Lift attachment apparatus 800 may increase safe operating capacity far beyond a tipping capacity of a loader using the loader's arms and/or tipping function.

Referring to FIGS. 8H-8J, lift attachment apparatus 800 may not include wheels centered on the load which may cause the load to bob back and forth while in motion at an amount determined by the play in the lifting components of the loader. Lift attachment apparatus 800 may include brakes. Brakes and a small battery to power the brakes may be set with a standard variable brake controller and may be activated by the parking brake on the loader. With brakes, loader 830 and lift attachment apparatus 800 may operate similar to a truck with a car trailer that has independent brakes. Lift attachment apparatus 800 may or may not include powered wheels that are operated with loader controls or tapped into the loader's left and right wheel controls. It is contemplated that lift attachment apparatus 800 may include a hitch 816 for transport. Hitch 816 may be a two inch interior width square pipe passing through the back plate for the loader side of the frame 821 and being connected to the loader side frame support post 819 below the attachment device being integrated with safety chains. A two inch outside dimension square pipe with a coupler on the end may attach to a trailer ball on a vehicle. Forklift may further include additional forks 867 used as a loading point(s) used as a loading point(s) to carry the weight, such as four forks. It is contemplated that the hydraulic capacity may be at least 7,200 lbs. at loading point W1 shown in FIG. 8B with a Bobcat 2009 S205 skid-steer loader. As depicted, the loader may not physically tip forward until the load exceeds 12,000 lbs. at W1, but the loader's hydraulic bypass may be activated prior to a load being lifted above its resting place, which may be much safer than a standalone loader with forks. Referring to FIGS. 8I, 8J, 8P and 8R, the center of the wheel(s) 810 of the attachment 800 may be mounted behind mounting positions 808B being a loading point(s) of mast 865 of the attachment and may allow access into limited access spaces.

Referring to FIGS. 8H-8J, it is contemplated that the lifting side of the frame 804 can be articulated around the articulation hinge pins 844 within the holes of 807 causing the mast 865 and the forks 867 used as a loading point(s) to be turned at the same angle as the created articulation of a degrees of 0 to a contemplated degree $A_2$ being as much as 27.5 degrees in this configuration as shown in FIGS. 8E-8G & 8P, but may be of any angle up to 70 degrees. It is contemplated that the angle of $A_2$ could exceed 70 degrees with a slightly different configuration.

Referring to FIGS. 8H-M and 8P, it is contemplated attachment device 805 may be mechanically fixed or integrated into frame 803 and when attachment apparatus 800 articulates the frame 804 around frame 803 around the pins 844, the bottom of wheel(s) 810 will stay in the same plane as the base of the loader 830 even if hydraulic cylinder 868 moves pin attachment 808A of the mast 865 toward or away from mounting position 809 causing it to rotate around mounting position 808B being a loading point(s) of the mast 865. Upon any rotation of the frame 804 out of a vertical alignment with frame 803 as shown in FIG. 8P, it is contemplated that if the mast 865 is tipped up or down from 0 degrees perpendicular from the loader's 830 wheels or from 0 degrees perpendicular to the ground the forks 867 used as a loading point(s) may not twist along with the wheels 810, but may be out of a plane parallel with the wheels of loader 830. The use of cylinder 845 of the loader rotating the tilting plane 820 or the use of cylinder 846 of the loader causing forward facing loader arm 840 may be used to straighten attachment apparatus 800 to make the wheels 810, the forks 867 used as a loading point(s), or the mast 865 to be put in a desirable relationship to the ground for operational functionality. Hydraulic cylinder 868 may be used to change the angle of the third party manufactured forklift assembly with forks 864 independently of the other moving parts of loader 830 or attachment apparatus 800. It is further contemplated that if the lifting side of the frame 804 is articulated around the operators side of the frame 803 at hinge pins 844 in an inward motion and if the forks 867 used as a loading point(s) are tipped outside of a parallel plane of the base of the loader's wheels using the hydraulic cylinder 845 or hydraulic cylinder 846 to move forks 867 used as a loading point(s) in a downward motion, that the wheel 810 furthest towards the inside of the turn will be raised to a higher elevation than that of the outermost wheel 810 of the turn if the wheel(s) 810 were in a fully mechanically fixed relationship. It is also contemplated that if the forks 867 used as a loading point(s) are raised in an upward motion using the hydraulic cylinder 846 or hydraulic cylinder 845 so that frame 803 is not in a plane parallel with the wheels of the loader 830 while the attachment is articulated, the wheel 810 on the outermost outside of the turn will be raised above that of wheel 810 on the innermost inside of the turn if the wheel(s) 810 were in a mechanically fixed relationship to frame 804. It is contemplated that hub carrier leaves 811 together mounted to wheel(s) 810 create an axle on each side. With the functionality of hub carrier leaves 811 included, it is contemplated that the wheels 810 may be in the same plane as the surface they are rolling on or in the same plane as the wheels of the loader 830 for lift attachment apparatus 800 to be functional where the loader 830 can tip the forks 867 used as a loading point(s) without using any of the hydraulic cylinders or motors on lift attachment apparatus 800. It is contemplated that the wheels 810 mounted to hub carrier leaves 811 could be rotated around the pillow block bearing with pin 812 as shown in FIGS. 8J-8L. A race roller bushing 815 mounted to lifting frame support post 818 and riding against race 814 mounted with bolts through holes 817 may provide additional support. It is further contemplated that shock pad devices 822 may limit this dual sided vertically rocking hub carrier assembly coupler 806 for stability as shown in FIGS. 8K-8M to an angle of As being shown with a maximum allowable tilt of 12 degrees to the dual sided oscillating hub carrier assembly.

Added support to keep the hub carrier leaves 811 in an advantageous arrangement may be provided by bolts 813 and it is further contemplated that the race roller bushings may be mounted in an adjustable configuration to be in a position against race 814 where race 814 may be made of two pieces of 0.5" steel welded half lap spliced with one being a tapered track butting and lapping the hub carrier leaf 811. Referring to FIG. 8L, it is also contemplated the dual sided vertically rocking hub carrier assembly coupler 806 may rotate with the support of less moving parts such as eliminating all bearings except for the pillow block bearing with pin 812 which may be a ball bearing, a tapered bearing, a double row ball bearing, a double row tapered bearing, a sheave bearing, a turret bearing, a slewing bearing, a turntable bearing, another type of bearing or other mechanically rotating stabilization device. Bearing 812 may also be 2 or more center aligned bearings on either face or internally of vertically rocking hub carrier assembly coupler 806. It is contemplated that in this arrangement, the wheels 810 are aligned in a fixed position, being a stable position, where the alignment of the wheels 810 will not be swiveled to a misaligned angle, but will continually act as a functional fulcrum in moving a load.

Referring to FIGS. 8H-8J, it is contemplated that lift attachment apparatus 800 may be damaged if not designed to go against the moving wheels of loader 830 and the forward tilt limiting bumper 850 may be employed. It may be also advantageous that the limiting bumper 850 may prevent lift attachment apparatus 800 from tipping too far forward by hitting the loader's tire, tipping too far back during operation of moving material by hitting the ground or tipping too far back during disconnecting tilting plane 820 of the loader from attachment device 805 by resting on the ground.

Referring to FIGS. 8H and 8N, it is contemplated controls of different kinds may be employed to control lift attachment apparatus 800 with loader 830. A 7 pin plug 831 or other plug may be used to fit in the electric output receptacle of loader 830 and a power cord 825 may be employed if a higher amperage of power is desired for operation. Power cord 825 may be wired directly into the loader 830 or an aftermarket receptacle if an adequate one is not provided on loader 830. It is contemplated that hydraulic power may be provided to run the hydraulics of lift attachment apparatus 800 through the hydraulic quick connect couplers of loader 830. It is contemplated that male flat faced quick coupler with hydraulic hose 841 could be mounted into the female output of loader 830 and that female flat faced quick coupler with hydraulic hose 842 could be mounted into the male input of loader 830. A controller device 839 may be provided to operate the various parts of lift attachment apparatus 800 utilizing the controls of loader 830. Controller device 839 may include a low voltage actuating device for electric or hydraulic controls, it may include an additional hydraulic pump or motor, it may include a battery or communication devices to communicate between the loader 830 and lift attachment apparatus 800 and it may include solenoids, relays, or other devices. It is also contemplated that controller device 839 may also include cords, hoses, or fluid storage containers.

Referring to FIGS. 8M-8V, exploded views of lift attachment apparatus 800 are shown. It is contemplated that various mechanical devices i.e., an operator side of the frame 803A, 803B and 803C; a lifting side of the frame 804A, 804B, 804C; and attachment device 805, holes 807 for articulating hinge pins 844, mounting ends 808 in positions for mast 865 mounting location 809 for cylinder 868, hub carrier leaf 811 held together with leaf bolts 813 and being rested against bearing 815 through race 814 being bolted down, pillow block bearing with pin 812, lifting frame support post 818, lifting side frame post 819, back plate 821, forward tilt limiting bumper 850, hydraulic cylinder 855, pin attachments 857 and a third party manufactured forklift assembly with forks 864 may be employed for operational flexibility.

Referring to FIGS. 8S-8T, the hydraulic cylinders 855 have space to operate within lift attachment apparatus as shown. Referring to FIGS. 8I, 8P, 8Q, and 8V, a variety of arrangements may be employed with the third party manufactured forklift assembly with forks 864. The specifications and drawings within this application are not limiting allowing any aftermarket fork assembly with forks 864 to be utilized. It is contemplated that third party manufactured assembly with forks 864 may be a "Lift-Tek 100 RT-MS". It is contemplated that another fork assembly 864 may be employed if the hydraulic fluid is not compatible with loader 830, or if the hydraulic or electric functions are not compatible, or if the sizing is not compatible. It is further contemplated that adapters or devices that convert power from the loader 830 to fork lift assembly 864 may be utilized.

Figure 8W:
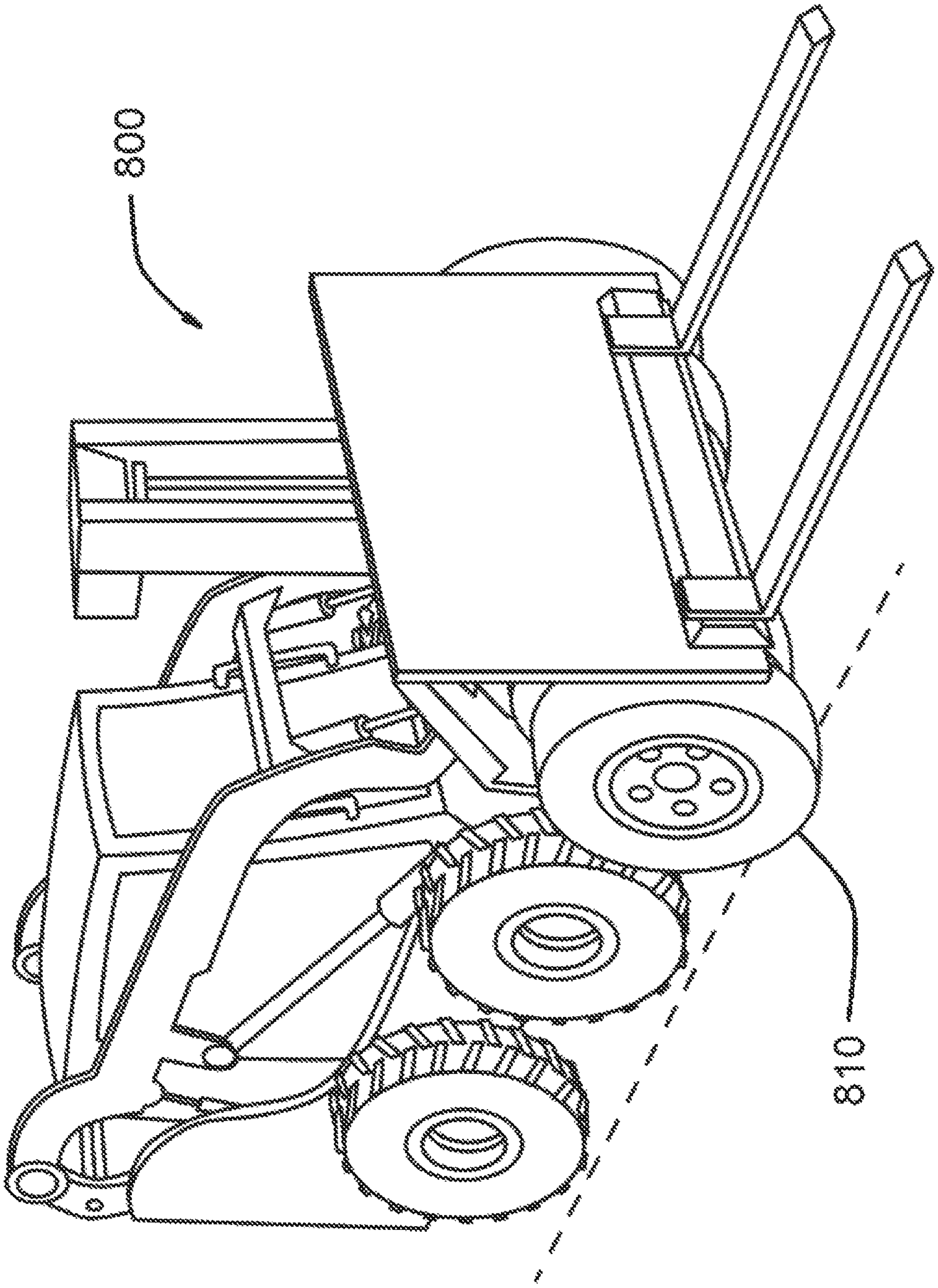
FIGS. 8W-8X depict an artist's rendering of a lift attachment apparatus in accordance with an embodiment of the present disclosure.
Figure 8X:
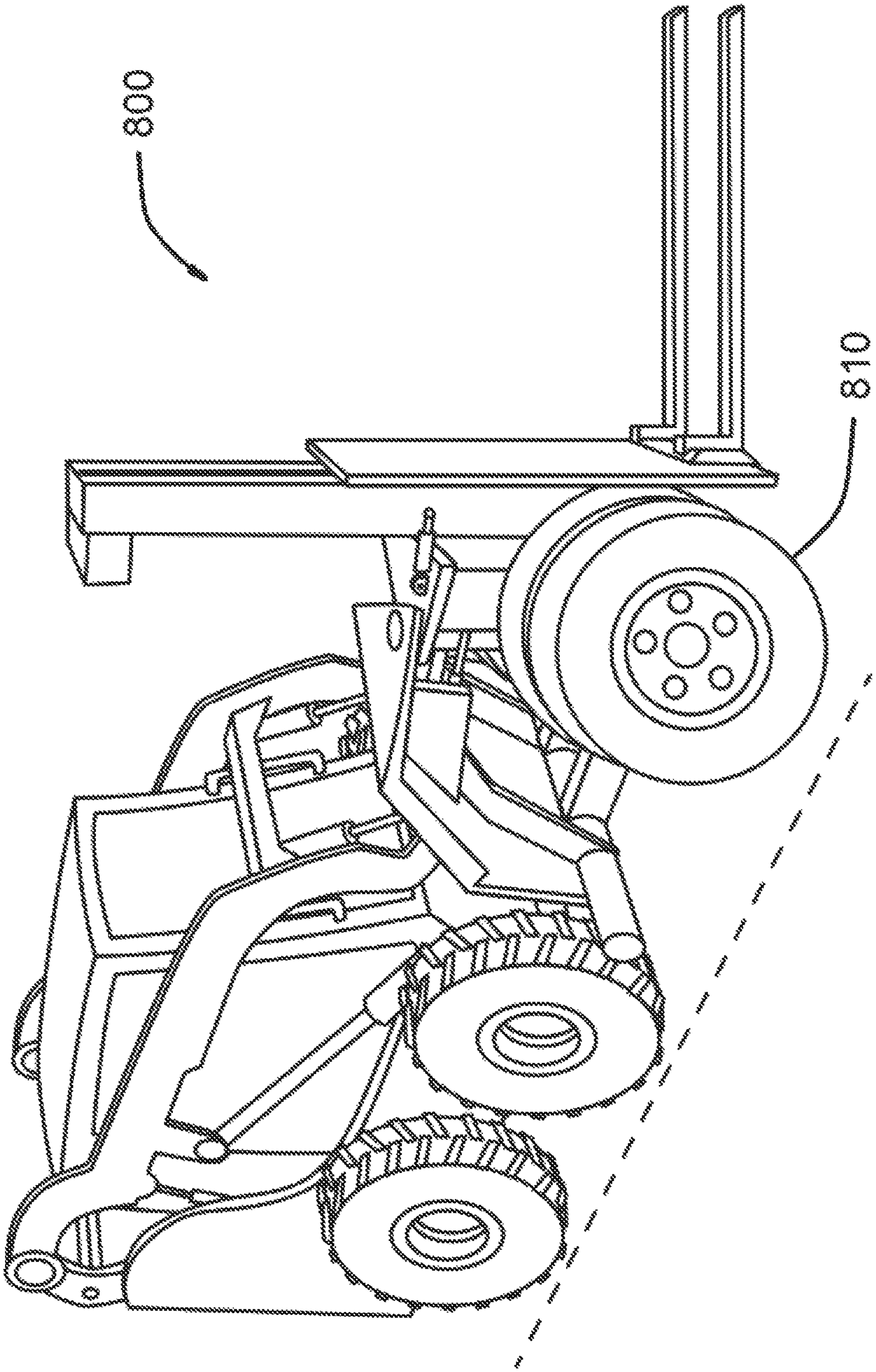

Referring to FIGS. 8H, 8K-8L, and 8W-8X, a lift attachment apparatus 800 with loader 830 shown in a straight position and a turned position are provided. It is contemplated that if lift attachment apparatus 800 was turned as it is in FIG. 8X and the fork lift assembly 864 was tilted forward using the hydraulic cylinders of the loader 830, the wheel 810 on the far right side from the operator's perspective would lower at a faster rate than wheel 810 on the opposite side of lift attachment apparatus 800. This may illustrate the benefit of a dual sided vertically rocking hub carrier assembly coupler 806 shown in 8K-8M. It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, but may rock in a generally vertical direction against the ground as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction. It is further contemplated that the one or more wheel(s) may remain parallel with the at least two forks of the forklift attachment when moving straight as shown in FIG. 8W and when turning as shown in FIG. 8X, thus the direction of movement of the wheels is parallel to the at least two forks of the forklift attachment.

Referring to FIGS. 7-13G, It is contemplated that the present disclosure is further directed to a lift attachment apparatus with a power steering system and/or powered drive wheels for construction and farm equipment, including a loader. In an embodiment of the disclosure, lift attachment apparatus may include a frame including an attachment device configured to attach to a tilting plane of a loader having a forward facing loader arm, a pair of wheels connected to the frame by means of a hub carrier assembly, a first wheel of the pair of wheels located on a first side of the frame and a second wheel of the pair of wheels located on a second side of the frame, the first wheel configured to be maintained within 20 degrees of parallel to the second wheel. The lift attachment apparatus may further include a boom connected to the frame, wherein control of the boom is provided by application of force to the attachment device in a downward direction by the forward facing loader arm to create lift and rotation of the tilting plane causing rotation maintained parallel to the loader arms of an end of the boom about the first wheel and the second wheel.

Referring to FIGS. 9A-9D, side views of a lift attachment apparatus 900 in accordance with an embodiment of the present disclosure are shown. Lift attachment apparatus 900 may include a frame, the frame including an attachment device 905. Attachment device 905 may be configured to attach to a tilting plane of an all wheel drive loader 930 with tunable steering, such as a BOBCAT A300 loader. It is contemplated that attachment device 905 may be a quick attachment device in use with various types of attachments to connect with loaders. It is contemplated that a quick attachment device may be a device which allows a user to attach and detach attachments with a connection without difficult assembly and disassembly. Additionally, a quick attachment device may not require specialized tools which may allow for attachment and detachment of attachments in the field. A pair of wheels 910 may be coupled to the frame. It is contemplated that a first wheel of the pair of wheels may be located on a first side of the frame and a second wheel of the pair of wheels may be located on a second side of the frame, the first wheel configured to be maintained in alignment through structured mechanical configuration near parallel to the second wheel. In an embodiment, each wheel may include a tire. Lift attachment apparatus 900 may further include a boom 915 connected to the frame.

Figure 9A:
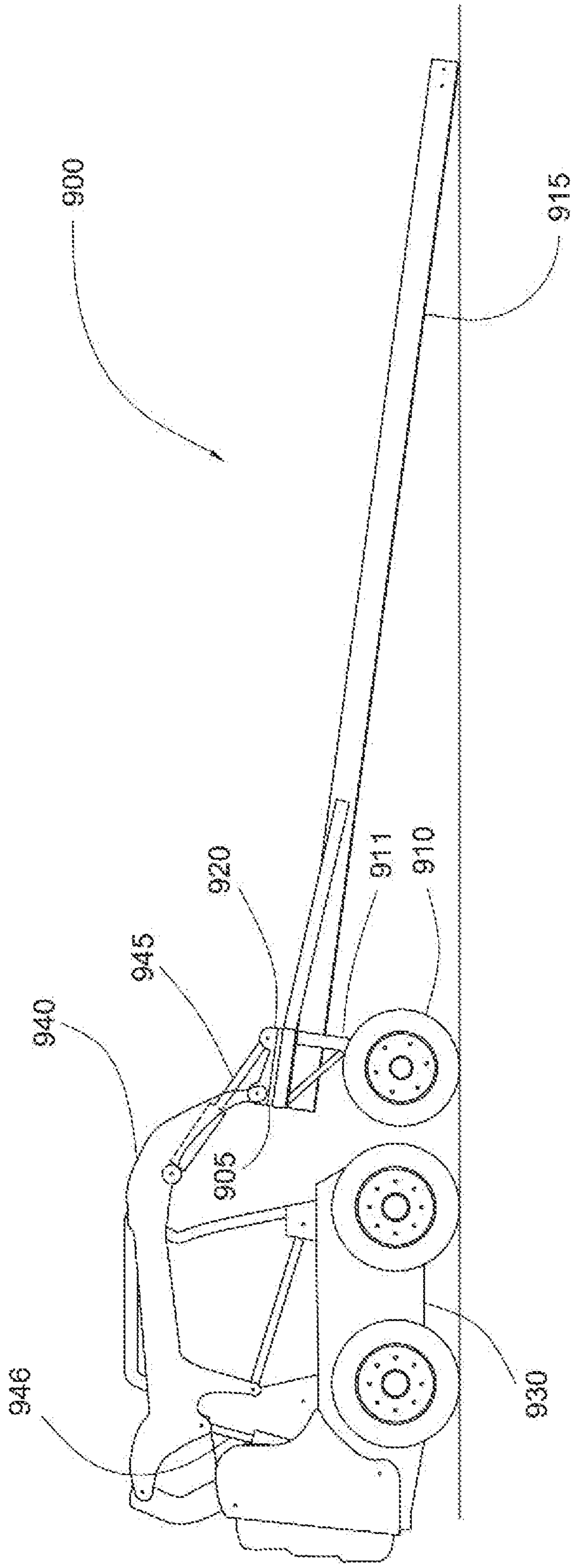
FIGS. 9A-9D depict side views of a lift attachment apparatus with a power steering system in accordance with an embodiment of the present disclosure.
Figure 9B:
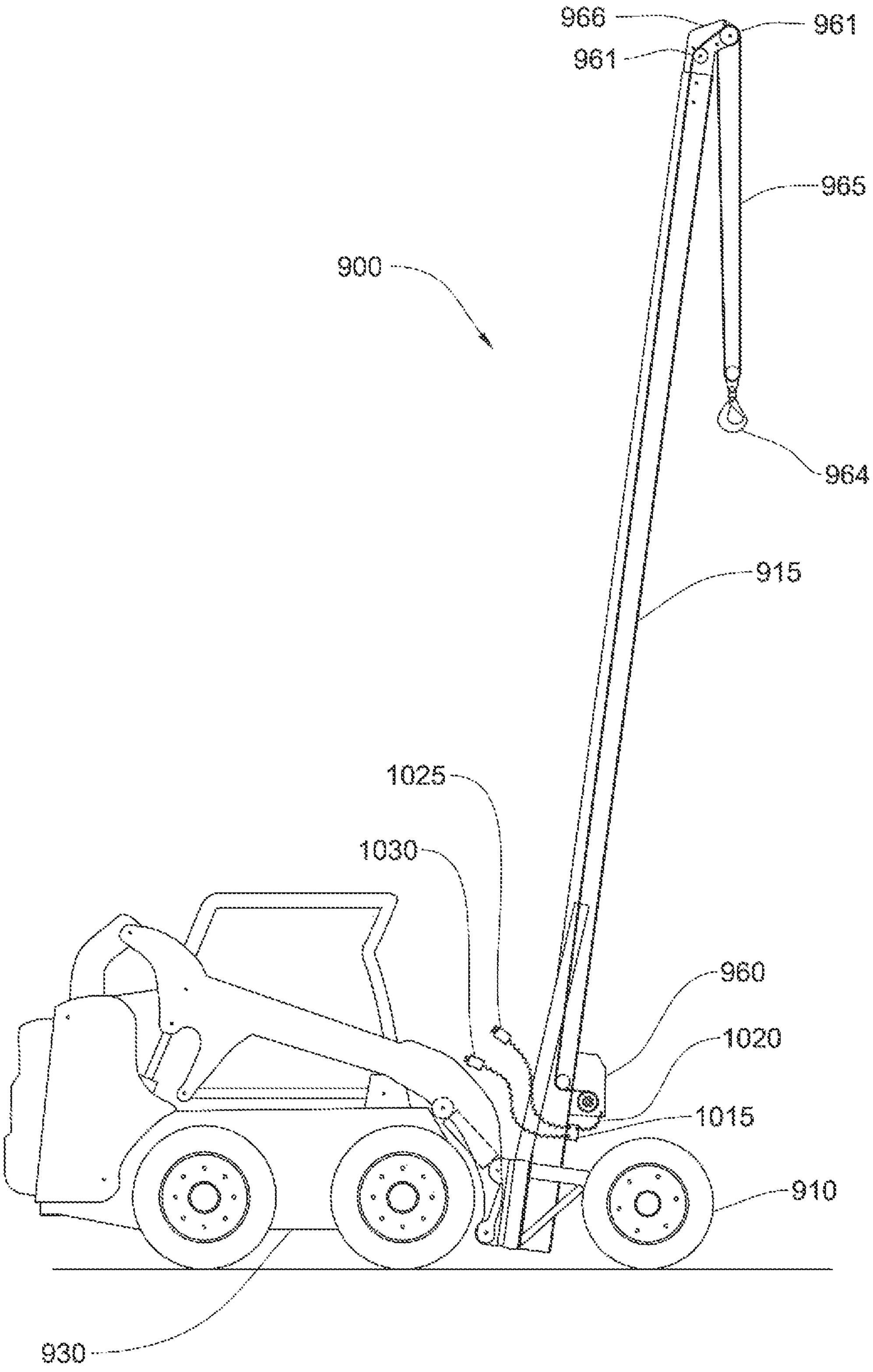

Advantageously, it is contemplated that various items (e.g. a load) may be removably coupled to an end of boom 915 with a loading point at the end and may be lifted to a desired location. Lift attachment apparatus 900 according to present disclosure may be configured to be safely rotated from a position near horizontal to the ground (0 to 10 degrees) as shown in FIG. 9A to a near vertical position (near 80 to 90 degrees to a surface up against wheel 910) as shown in FIG. 9B without risking the load or tipping an attached loader. Attachment device 905 of the frame may be configured to attach to a tilting plane 920 of a loader 930 having a forward facing loader arm 940. It is contemplated that attachment device 905 may be permanently fixed or incorporated with tilting plane 920 according to an alternative embodiment of the present disclosure. Boom 915 may be generally fixed with the attachment device 905 of the frame. It is contemplated that control of the boom 915 is provided by application of force to the attachment device 905 by the forward facing loader arm 940 in a downward direction to create lift and rotation of the tilting plane 920 causing rotation of an end of the boom about the first wheel and the second wheel of the pair of wheels 910. Tilting plane 920 may be controlled by a hydraulic cylinder 945 of loader. It is contemplated that boom 915 may be configured to be tipped up via application of force to the attachment device 905 in a downward direction and via reverse action of hydraulic cylinder 946 of the forward facing loader arm 940 of the loader 930. Through reverse action, the hydraulic capacity may be reduced, such as by about 44% for the hydraulic cylinder 946 of the forward facing loader arms. This reduction in hydraulic capacity may make it difficult to overload the lift attachment apparatus 900 if the load is being raised. Since the hydraulic capacities of hydraulic cylinders of many loaders are just over their tipping capacity, the reduction in hydraulic capacity may put the apparatus 900 well below the tipping capacity and higher than the safe operating capacity. Advantageously, hydraulic cylinder 945 of the loader may not be working in a reverse action and gains support towards lifting loads on the end of the boom with pressure applied to wheel 910 with the downward action of the loader arms 940 with the retracting action of hydraulic cylinder 946. In a standard attachment arrangement without support external of the loader such as a standard bucket, the hydraulic cylinders 945, 946 work separately to support the load according to how they are designed to operate. In this arrangement, these hydraulic cylinders 945, 946 work together with the support of wheels 910 which are also carrying the weight of the load.

Figure 9C:
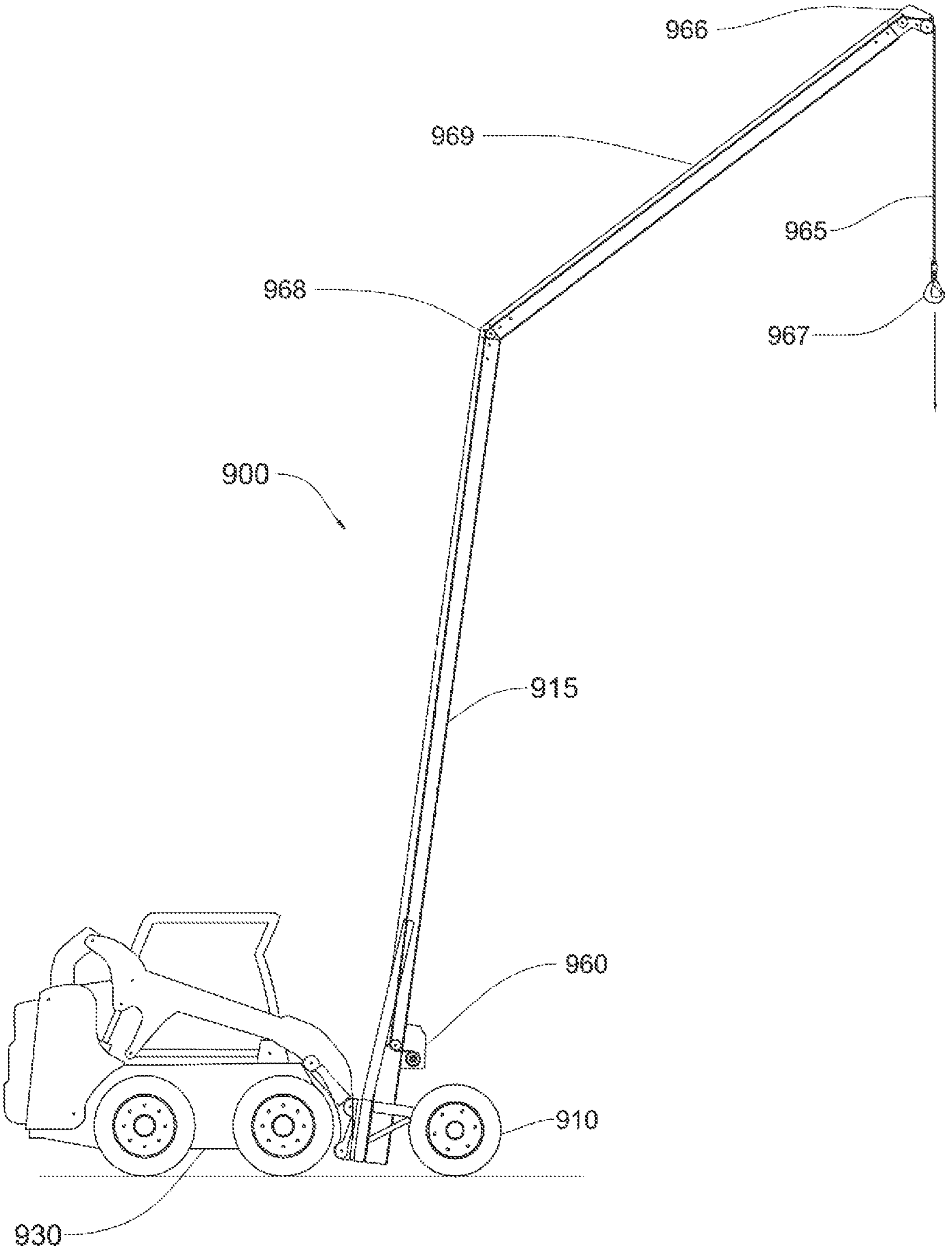
Figure 9D:
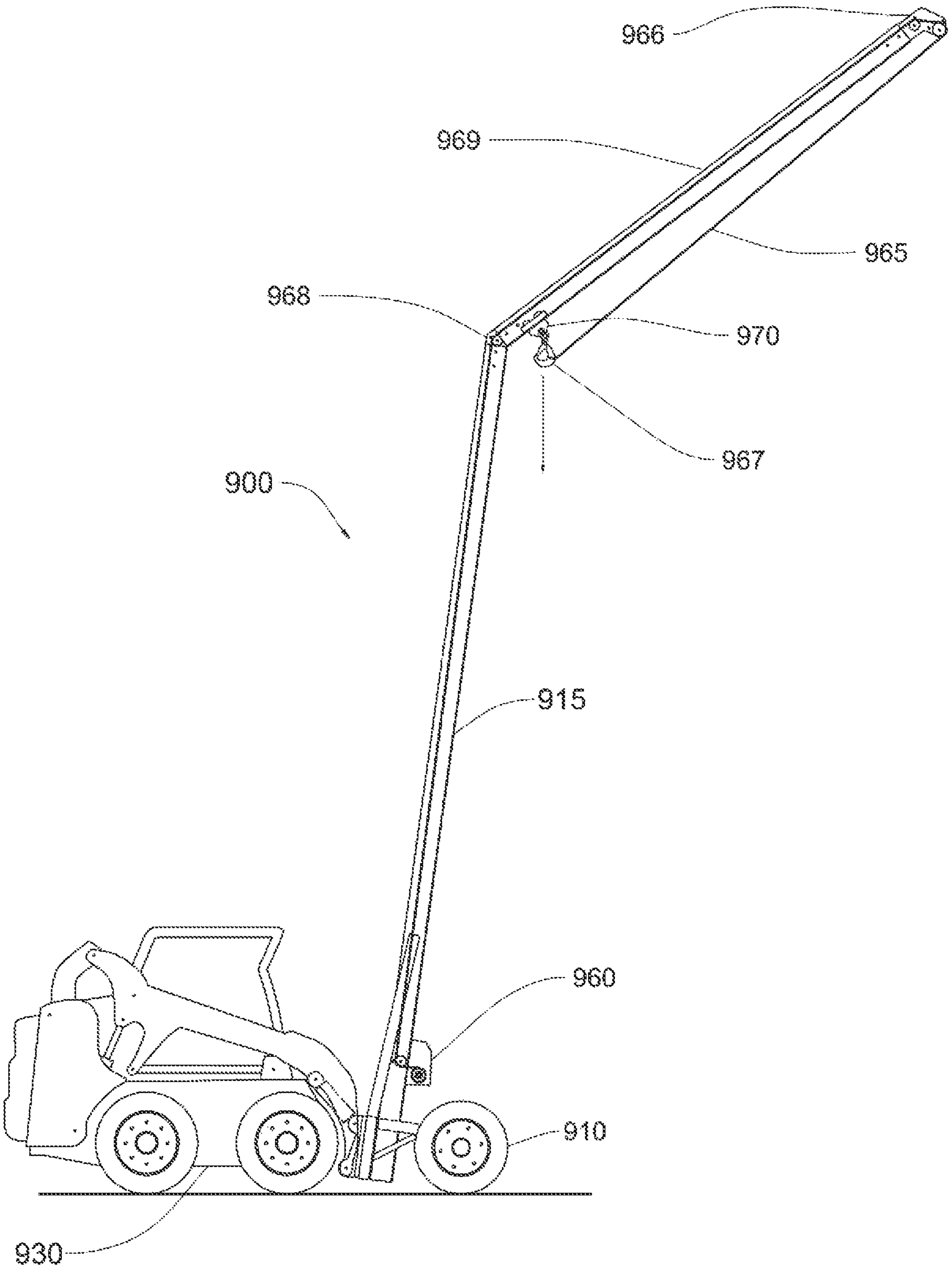

Referring to FIG. 9B-9D, a side view of the loader 930 with the lift attachment apparatus 900 attached in a near vertical position is shown. Advantageously, boom 915 may include a cable hoist assembly with the cable hoist assembly having most of the cable protected within the boom and other components. The cable hoist assembly may include various mechanical devices, i.e., a winch 960, cable sheaves 961, block and tackle 964 being a loading point(s), lifting hook 967 being a loading point(s), beam trolley 970 being a loading point(s), stranded wire rope cable 965, lift attachment apparatus extension rod 969 and lift attachment apparatus jib 966 may be connected to the lift attachment apparatus 900 to increase operational flexibility. It is contemplated that other mechanical devices may be employed to power and control these functions, such as a 7 pin plug 1030 or other similar plug to fit the electric output receptacle of loader 930 going to 7 pin electric controller with minimum of a 2 way function 1015 or one configured to work with loader 930 and relay rated for amperage with loom with three 12V control wires 1020 and winch 960, cord 1025 rated for amperage of winch 960 plugged into or wired directly to loader. In FIG. 9B, a winch 960, cable sheaves 961, block and tackle 964, stranded wire rope cable 965, and lift attachment apparatus jib 966 is shown. In this configuration, the winch 960 may pull up at half of the winch pulley output speed, but may generate twice the rated lifting capacity provided that block and tackle 964 being a loading point(s) and other components are rated for it. It is contemplated the winch 960 may have a controller independent of the loader 930.

FIG. 9C depicts a side view of the loader 930 with the lift attachment apparatus 900 attached in a near vertical position with additional operating devices, i.e., a winch 960, stranded wire rope cable 965, cable sheaves 961, a rod connector having a built in cable sheave 968, lift attachment apparatus extension rod 969, lift attachment apparatus jib 966, and lifting hook 967. In this configuration, it is contemplated the winch 960 may be too powerful to use with a block and tackle 964 with a returned cable. For this reason, the lift attachment apparatus is shown with hook 967 being a loading point(s), as it would be less probable to cause overwear or failure to effect components; rod connector having a built in cable sheave 968 or extension rod 969. It is contemplated it would be beneficial that without a block and tackle 964, that loads would be able to be lifted at a faster rate and to a further distance from loader 930. In FIG. 9D, a similar arrangement to FIG. 9C is depicted, as FIG. 9D depicts added beam trolley 970 as part of the configuration. As shown in FIG. 9D, it is contemplated the winch 960 would be under a reduced load as the flange on extension rod 969 with a loading point at the end would hold the load in part, allowing the winch 960 to pull faster and in a smoother controlled fashion as there would be reduced hanging cable, rope, strapping or chain. It is contemplated the load attachment apparatus could pick up larger loads closer to a wall when lift attachment apparatus jib 966 would be beyond the wall but the rod connector 968 was horizontally on the same side of the wall as the loader 930. It is contemplated this would increase safety as boom 915 would be closer to a rigid surface in the event of any accident of the load being dropped, failure caused by the loader operator, or failure of the loader with attachments.

The lift attachment apparatus 900 as described and shown in FIGS. 9A-9D provides a number of advantages. It is common that contractors may have access to a loader due to the reduced cost of a loader as compared to lifts and cranes. Additionally, through use of various attachments, loaders may be more likely to be owned due to their multiple functions, usability, and operability without specialized skill. However, previous implementations of booms with loaders are limited due to their low lift capacity, reach, or mobility.

Lift attachment apparatus 900, by use of the pair of wheels 910, operating between the loader 930 and the load at the end of the boom 915, may operate as a lever. This configuration and capability to operate as a lever may dramatically improve the lift capacity of the boom 915 as compared to previous implementations. For example, the use of the pair of wheels 910 as the fulcrum, may allow an amplification of the input force provided by a loader 930 when applied to the attachment device 905 of the lift attachment apparatus 900 in order to provide a greater output force. It is contemplated that mechanical advantage of the lift attachment apparatus 900 may be greater when the pair of wheels 910 at the point to where the pair of wheels 910 come into contact with a surface is located between the attachment device 905 that is coupled to a tilting plane of a loader 930 and the load which is located at the end of the boom 915, as shown in FIG. 9B. Additionally, it is contemplated that a center point of the pair of wheels 910, (e.g. the point at which the wheels may contact the axle), may also be forward of the attachment device 905 whereby mechanical advantage of the lift attachment apparatus 900 may be greater. Use of the lift attachment apparatus 900 may allow transport of material while the loader is located more than thirty feet away or greater, which may be particularly valuable in muddy conditions or other conditions in which a surface is not solid. It is contemplated that the stability is increased when the load is forward of the center of the wheels because of the constant increased compression maintained in one direction. This advantage may be not achieved if the load was placed directly between a set of wheels or placed on wheels that were free to swivel. Advantageously, directly applied controls of the loader to control the direction of the wheels of the lift attachment apparatus 900 as a primary function and a separate function of the loader's wheels may act as a similar mechanical function as an axle connected in a fixed direction in relationship to the frame as shown on FIGS. 1A-6. Furthermore with the lift attachment apparatus 900, the wheels may be maintained to be rolling in a direction that is optimal for lifting as a primary function without moving the wheels of the loader and if the loader is moved the wheels of the attachment do not become misaligned from simply moving the loader to a different location. It is contemplated that in this arrangement, that the wheels 910 are fixed in their alignment, being stable, and may continually act as a functional fulcrum in moving a load.

Figure 10A:
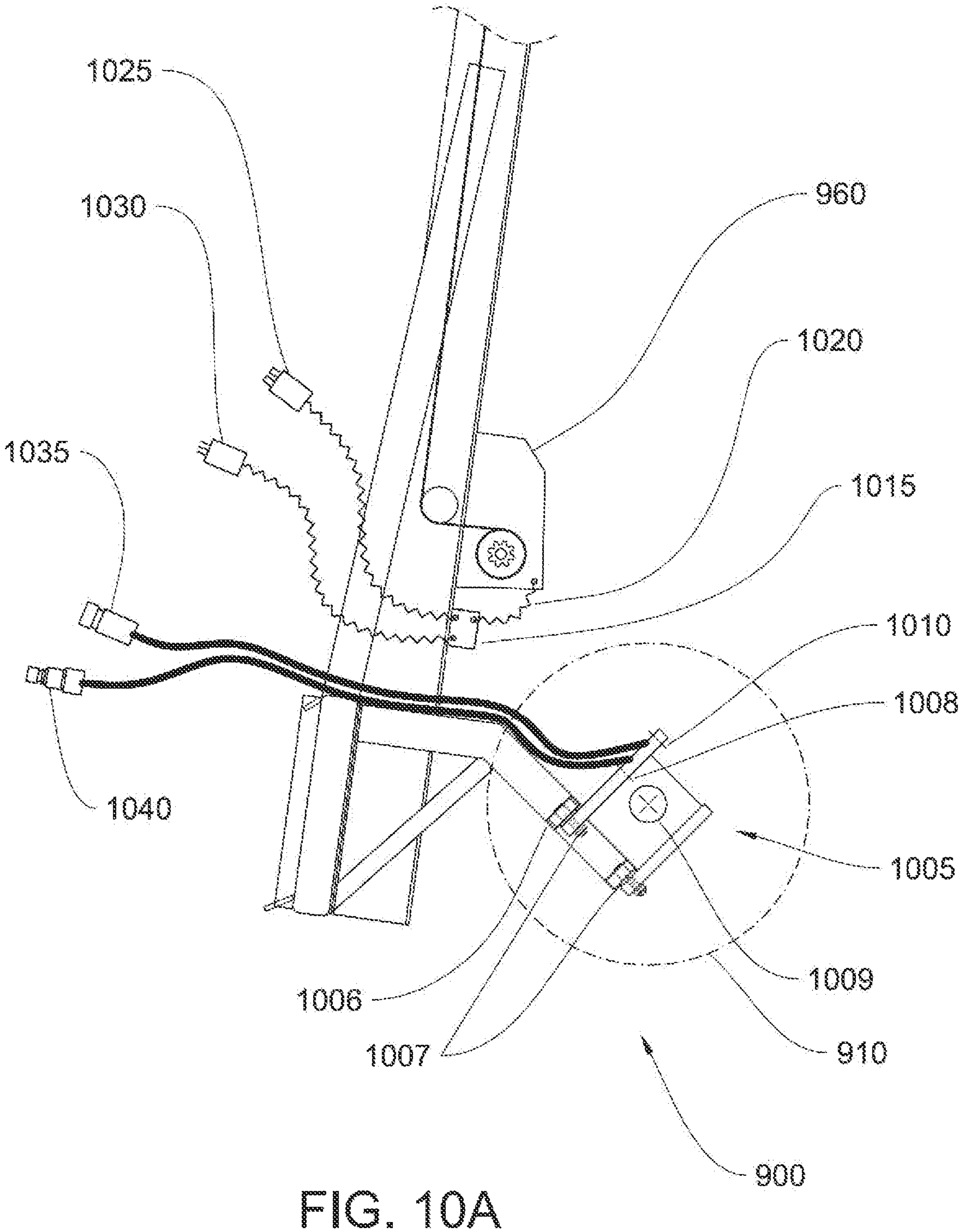
FIGS. 10A-10L depict detailed exploded views of a lift attachment apparatus with power steering system in accordance with an embodiment of the present disclosure.

Referring to FIGS. 10A-101, a lift attachment apparatus 900 with power steering is shown. Lift attachment apparatus 900 may include a frame including an attachment device configured to attach to a tilting plane of a loader having a forward facing loader arm, a pair of wheels connected to the frame by a hub carrier for power steering maintained in a rigid position determined by the loader operator via hand controls attached to a first wheel of the pair of wheels located on a first side of the frame and a second wheel of the pair of wheels located on a second side of the frame, the first wheel configured to be maintained within 20 degrees of parallel to the second wheel horizontally. When the wheels are turned to other positions, the wheels may positively or negatively camber vertically determined by the selected turned position maintained by the operator via hand controls. Advantageously, a first wheel of the pair of wheels located on a first side of the frame and a second wheel of the pair of wheels located on a second side of the frame may be maintained within 6 degrees of parallel to the second wheel horizontally when the wheels are unturned and when turned the inside wheel of the turn (the wheel with a shorter path and sharper radius of travel when being moved along the ground) maintains a sharper turn than the outer wheel (the wheel with the longer path and less sharp radius of travel when being moved along the ground) creating a sharper turning radius for the inside wheel. It is contemplated that positive cambered wheels in the straight position may improve stability and a straight direction may be more easily maintained as is the case with many tractors. It is also contemplated that with a full turn, negative cambered wheels with the inside wheel of the turn (the wheel with a shorter path and sharper radius of travel when being moved along the ground) than the outer wheel (the wheel with the longer path and less sharp radius of travel when being moved along the ground) may turn with less resistance. Advantageously, the wheels are configured to be maintained in a positive camber vertically when in an unturned position, near 0 camber vertically when in a half turned position and in a negative camber vertically when in a fully turned position. These previously described operations within this paragraph are configured to be controlled within the cab of the loader while not allowing the hub carrier assembly to turn because of the rotation of the boom around the wheels or the direction the wheels of loader 930 may be directed. It is contemplated this is necessary to maintain consistent and controllable lift height and lift operation when the loader arms are in all variously selected positions while the attachment wheels are in contact with the ground or another surface. In the configuration as it is described, it may be obvious that casters or wheels not mechanically controlled may be dangerous and uncontrollable if attempting to use the wheels as a "mechanically aligned" moving fulcrum for lifting as a primary function. In the configurations of others' attachments having casters, they may have alignment, but that alignment may be secondary, or from the movement of the loader, and may therefore be described as "reactive alignment". It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction.

Referring to FIG. 10A, an exploded detailed side view of a lift attachment apparatus 900 with a power steering system is shown. The power steering system may include a plurality of components, including a wheel 910, power steered hub carrier assembly coupler 1005 with aperture 1009 for an axle to be supported in, frame hub carrier assembly mount 1006, centerline for holes 1007 for main hub carrier ball joints, centerline for hole 1010 for a ball stud for an end of a tie rod, centerline for hole 1008 for a rod end of steering hydraulic cylinder, a winch 960, 7 pin electric controller 1015 with 2 way function relayed to winch amperage, wire loom with three 12V control wires 1020, 30 amp or higher rated cord 1025 plugged into or wired directly to loader, Bobcat style 7 pin plug with wiring harness in loom 1030, hydraulic flat faced quick coupler receiving negative pressure outflow to turn left 1035, hydraulic flat faced quick coupler receiving positive pressure inflow to turn left 1040.

Figure 10B:
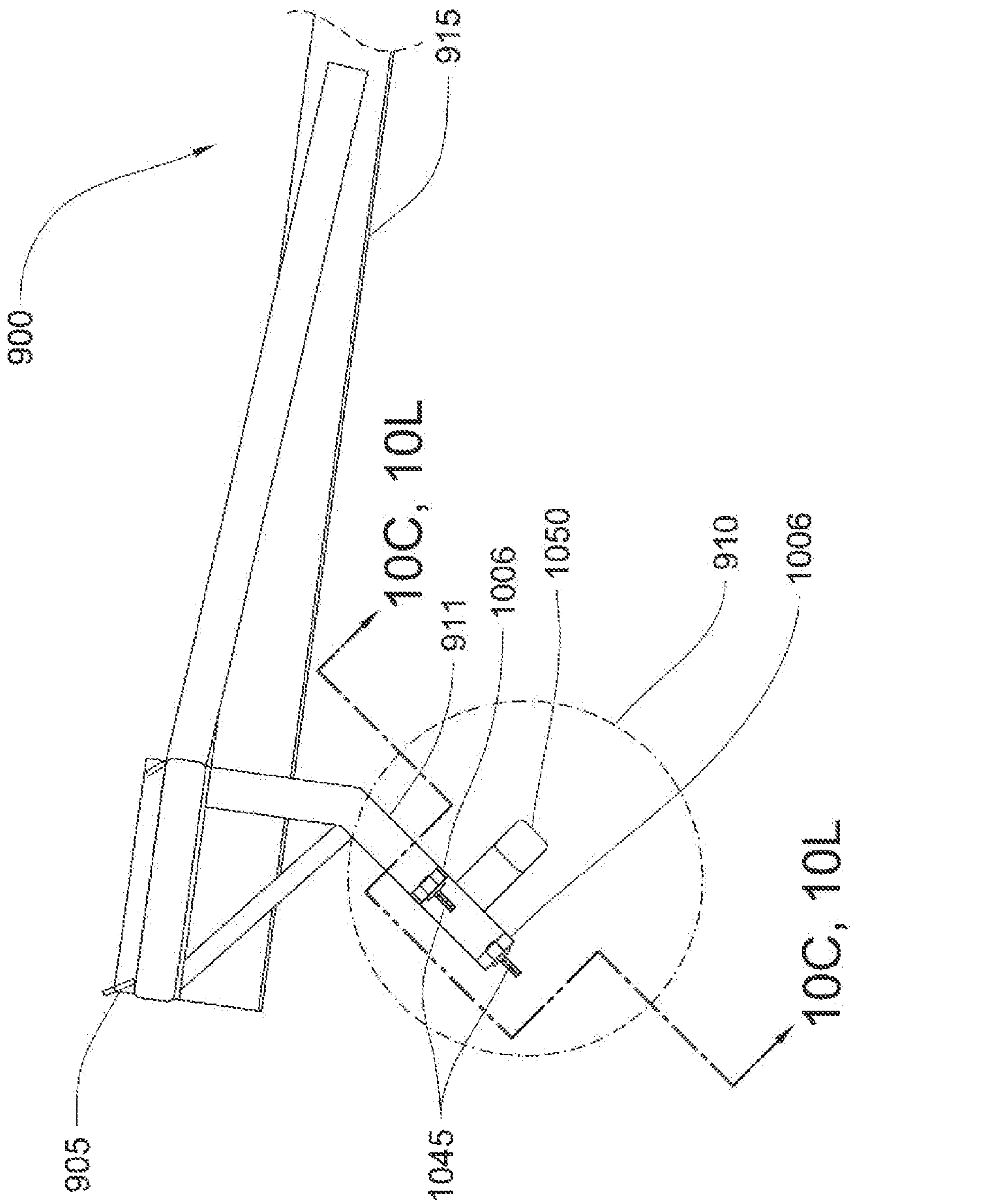

FIG. 10B depicts an exploded detailed side view of the lift attachment apparatus 900 with power steering system without power steered hub carrier assembly coupler 1005 shown in FIG. 10A, attachment device 905, frame hub carrier assembly mounts 1006, ball joints with studs 1045, and steering control bumper 1050.

Figure 10C:
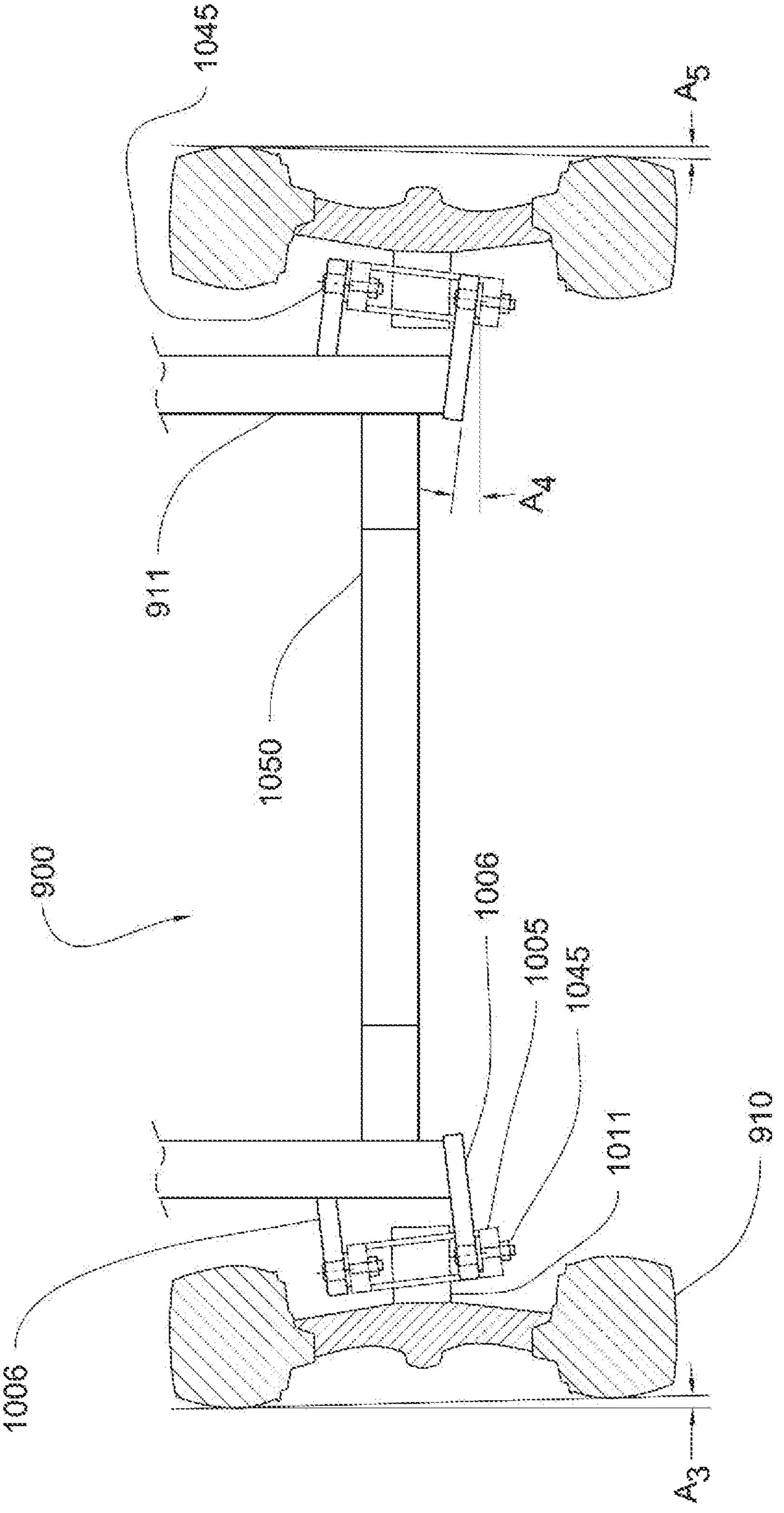

FIG. 10C depicts a rear view of the lift attachment apparatus 900 with a power steering system from the view of the loader driver with the coupler 911 being a non-swiveling member perpendicular to the ground with an upper portion of coupler removed above the shown cutline, steering control bumper 1050, frame hub carrier mount 1006 pitched at value of $A_4$ shown at 6.8 degrees attached with ball joints with studs 1045 for left and right sides of the power steering system to a frame hub carrier assembly mount 1006 pitched a 6.8 degrees respectively. It is contemplated that under some conditions it may be advantageous to have frame hub carrier mount 1006 pitched at value of $A_4$ to have a pitched value of greater values or less values, including values of less than 0 so different cambering can be achieved in a turned position. It is also contemplated axle 1011 may be mounted differently in aperture 1009 shown in FIG. 10A to widen the wheelbase or increase the vertical camber as is desired. It is contemplated that a loader operator purchasing a new attachment that did not want to use the steering controls on a regular basis may want the wheels to be negatively cambered to make it easier to drag the tires into a turn without turning the hub carrier assembly or may desire to have the wheels have no camber so the tires have more consistent wear across the tread in the event the attachment is used on rough surfaces.

Figure 10D:
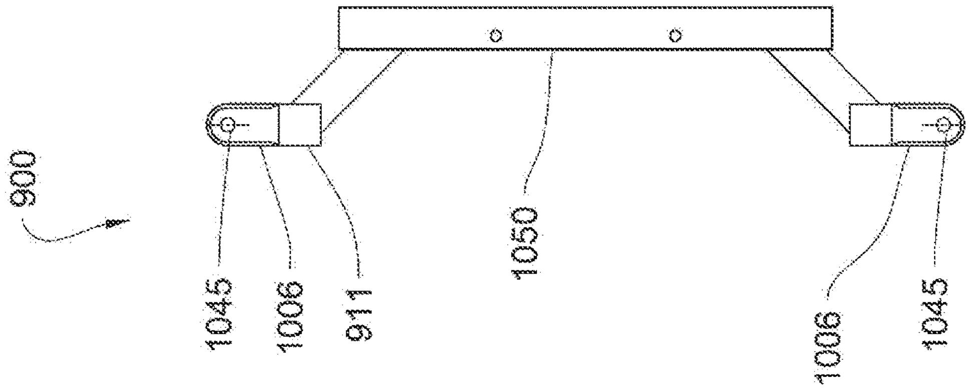
Figure 10E:
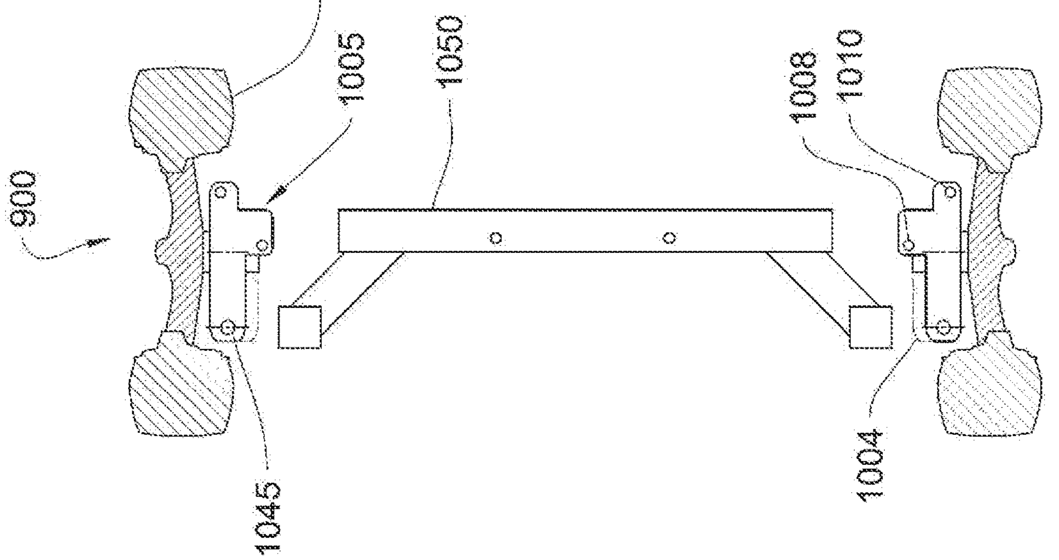
Figure 10F:
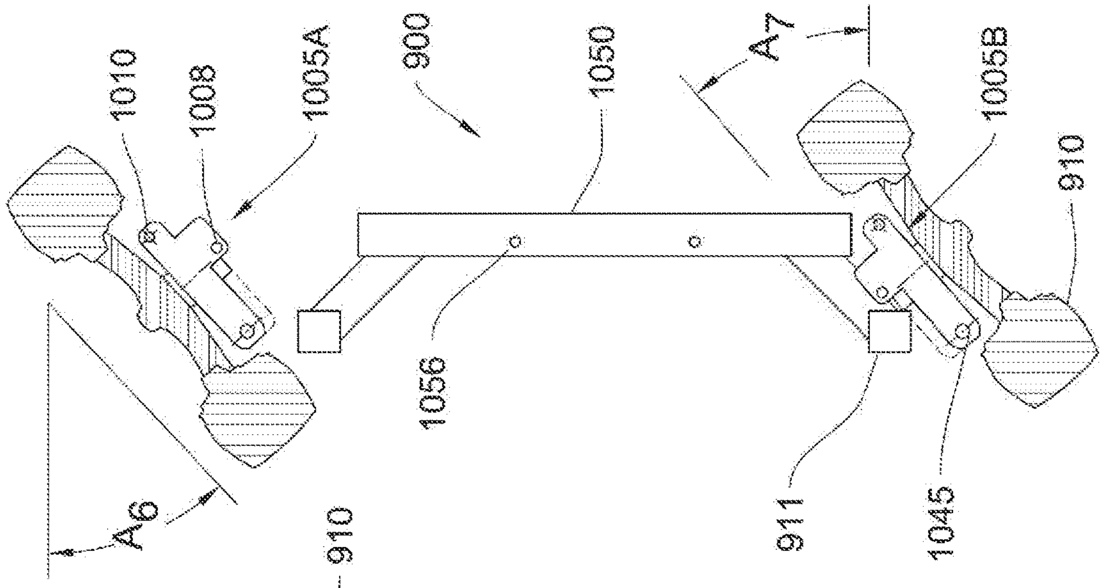
Figure 10H:
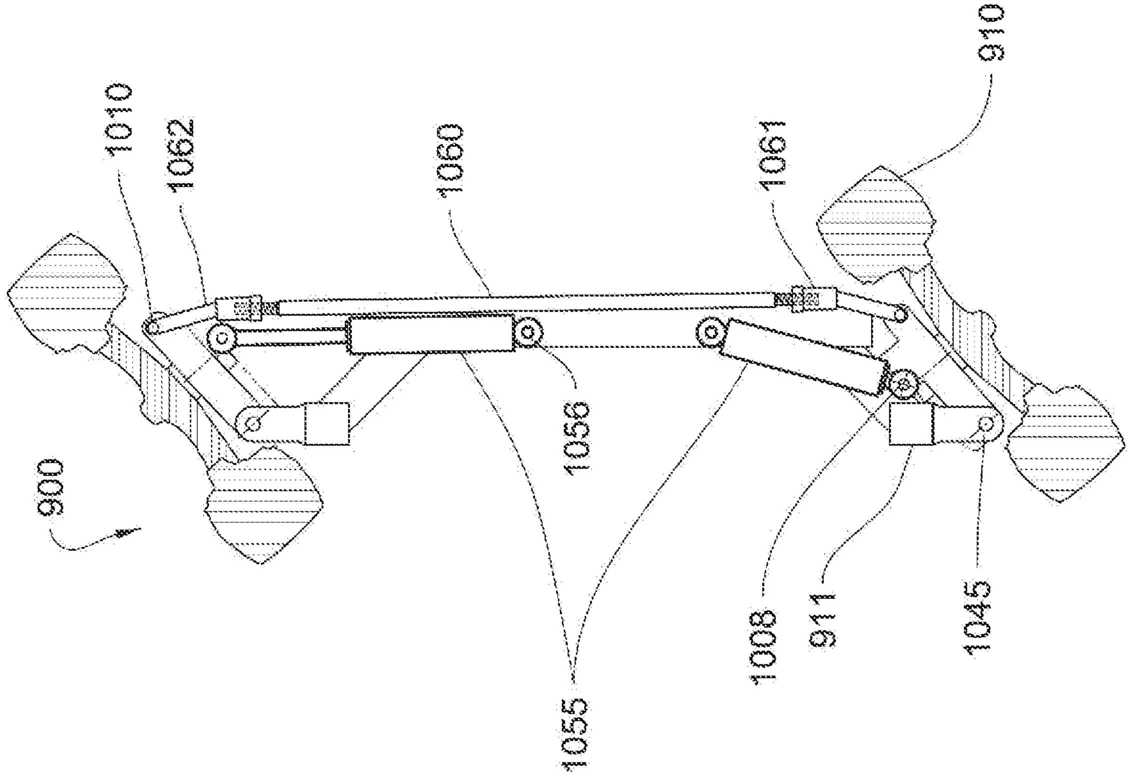

FIG. 10D depicts an exploded top view of lift attachment apparatus 900 with a power steering system including mounting components for the power steering system components, i.e., frame hub carrier mounts 1006, steering control bumper 1050, main hub carrier ball joints with studs 1045 for left and right sides of the power steering system. Frame coupler 911 is cut off at the same point as in FIG. 10C as shown. FIG. 10E depicts an exploded top view of the lift attachment apparatus 900 with a power steering system including power steering system components, i.e., steering control bumper 1050, main hub carrier ball joints with studs 1045, center of hole for tie rod ends 1010, centerline for hole 1008 for the rod end of steering hydraulic cylinder, right and left power steered hub carrier assembly coupler 1005 being in a state of non-swiveling fixity alignment without the frame hub carrier mounts shown with the bottom outline of the hub carrier assembly 1004. Frame coupler 911 is cut off at the same point as in FIG. 10C as shown. FIG. 10F depicts an exploded top view of the lift attachment apparatus 900 with a power steering system including power steering system components, i.e., steering control bumper 1050, left hub carrier assembly 1005A shown with a value of $A_6$ above it being 43 to 46 degrees with right hub carrier assembly 1005B shown with value of $A_7$ to the right of it being 38 to 41 degrees, steering hydraulic cylinder studs 1056, centerline for hole 1008 for the rod end of steering hydraulic cylinder, center of hole for tie rod ends 1010. It is contemplated that having the inside wheel 910 of the turn being a greater value of $A_6$ then $A_7$ will be an advantageous arrangement as an inside wheel of a turn has a sharper radius to travel around then the outside wheel. It is contemplated that when the wheels 910 are turned in the opposite direction that the values of $A_6$ and $A_7$ would switch in value at their respective opposite amount of turning right versus left. FIG. 10F is shown without the frame hub carrier mounts and frame coupler 911 is cut off at the same point as in FIG. 10C as shown. As it is currently configured on FIGS. 10C-101 with the positively cambered wheels in the strait position shown on FIG. 10C as $A_3$ and $A_5$, both of these angles are a positive camber of 1.5 degrees. In this strait position it is contemplated that with a slight positive camber going strait will be more stable than it would if the wheels had no camber or had negative camber. When the wheels 910 are turned to the left as shown in FIGS. 10F &10H it is contemplated the values of $A_3$ and As may become negative camber values above 0 making the attachment turn with greater ease if conventional wisdom on the effects of negative camber are correct. It is further contemplated that if the wheels are turned as shown in FIGS. 10F & 10H the value of As may have a lesser negative camber then $A_5$, as the turning radiuses of $A_6$ and $A_7$ may be different as previously disclosed.

Figure 10G:
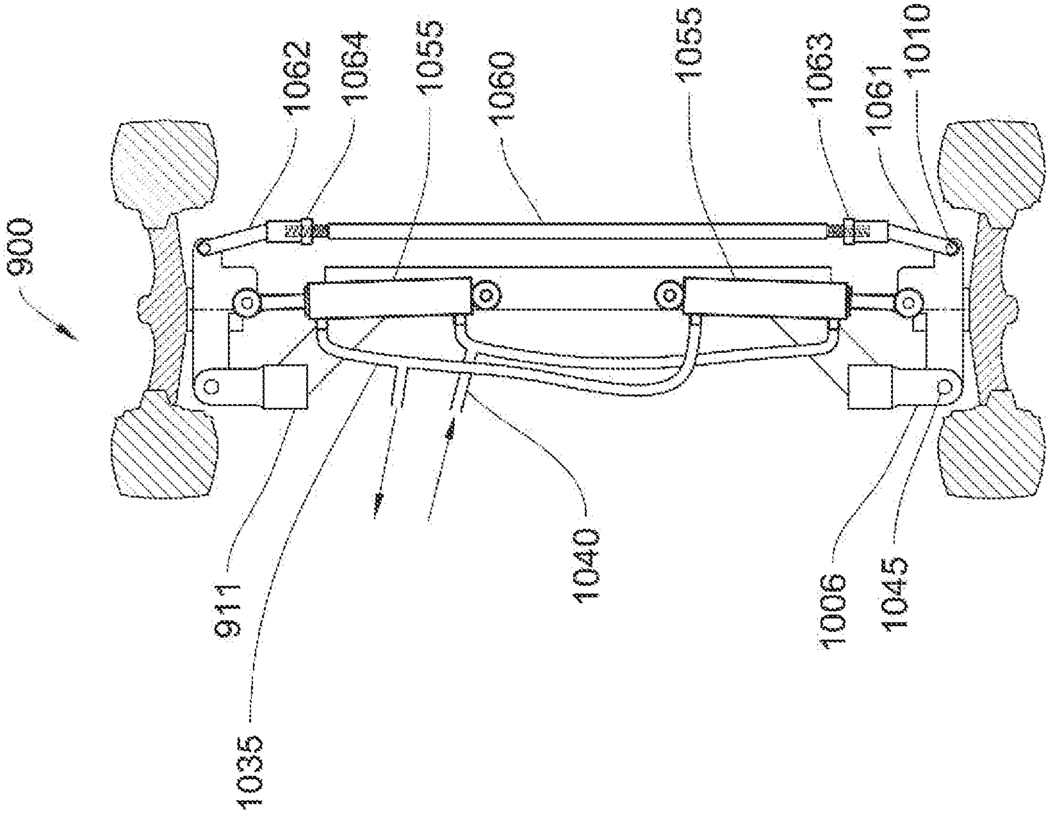

FIG. 10G depicts an exploded top view of the lift attachment apparatus 900 with a power steering system including power steering system components, i.e., the frame hub carrier mounts 1006, the center of hole for tie rod ends 1010, the adjustable tie rod 1060 with left hand male thread on the right end and right hand male thread on the left end, right tie rod end with left hand female thread 1061, left tie rod end with right hand female thread 1062, tie rod end jam nut with left hand thread 1063, tie rod end jam nut with right hand thread 1064, double acting hydraulic cylinders 1055. It is contemplated hydraulic hose with female flat faced quick coupler 1035 will receive negative pressure outflow to turn left and hydraulic hose with male flat faced quick coupler 1040 will receive positive pressure inflow to turn left. Frame coupler 911 is cut off at the same point as in FIG. 10C as shown.

FIG. 10H depicts an exploded top view of the lift attachment apparatus 900 with a power steering system including power steering system components with the wheels 910 turned, i.e., double acting hydraulic cylinders 1055, main hub carrier ball joints with studs 1045 for left and right sides of the power steering system, steering hydraulic cylinder studs 1056, centerline for hole 1008 for the rod end of steering hydraulic cylinder, the adjustable tie rod 1060 with left hand male thread on the right end and right hand male thread on the left end, right tie rod end with left hand female thread 1061, left tie rod end with right hand female thread 1062, and frame coupler 911 which is cut off at the same point as in FIG. 10C as shown.

Referring again to FIGS. 10E-10H, the top view of the main hub carrier ball joints with studs 1045 are what the hub carrier assemblies 1005 rotate around when making the wheels 910 turn to the left and right. In FIGS. 10E & 10G, the center of hole for tie rod ends 1010 may be closer to a line parallel to the outside of the hub carrier than the main hub carrier ball joints with studs 1045 are. This arrangement may make the adjustable tie rod 1060 holes 1010 center further apart than the distance that the center of the main hub carrier ball joints with studs 1045 are from their respective right and left sides. This arrangement may allow the wheels to turn from left or right with the inside wheel of the turn to rotate around the main hub carrier ball joints with studs 1045 at a higher value. It is contemplated that these distances could be changed to form a variety of outcomes where the turning radius of the attachment apparatus 900 with a power steering system could be adjusted to fit a variety of different kinds of loaders of different sizes including the wheel 910 being more than 20 degrees from parallel. Referring to FIG. 10C, it is also contemplated that all cambered values and differences in turning could be made 0 degrees by simply making the frame hub carrier mounts 1006 have an $A_4$ value of 0 and have the distance of the center of the holes for tie rod ends 1010 from the left to the right side of the lift attachment apparatus 900 with a power steering system may be the same distance as the center of the main hub carrier ball joints with studs 1045 are from each other on the left and right side. It is contemplated this would make the wheels 910 be fixed in a parallel position to each other no matter what the direction of the wheels of loader 930 are directionally turned or traveling, no matter what angle the boom is at vertically or no matter if the wheels 910 are off the ground or on uneven terrain. It is contemplated that in this arrangement, that the wheels 1010 are fixed in their alignment, being stable, and may continually act as a functional fulcrum in moving a load.

Figure 10I:
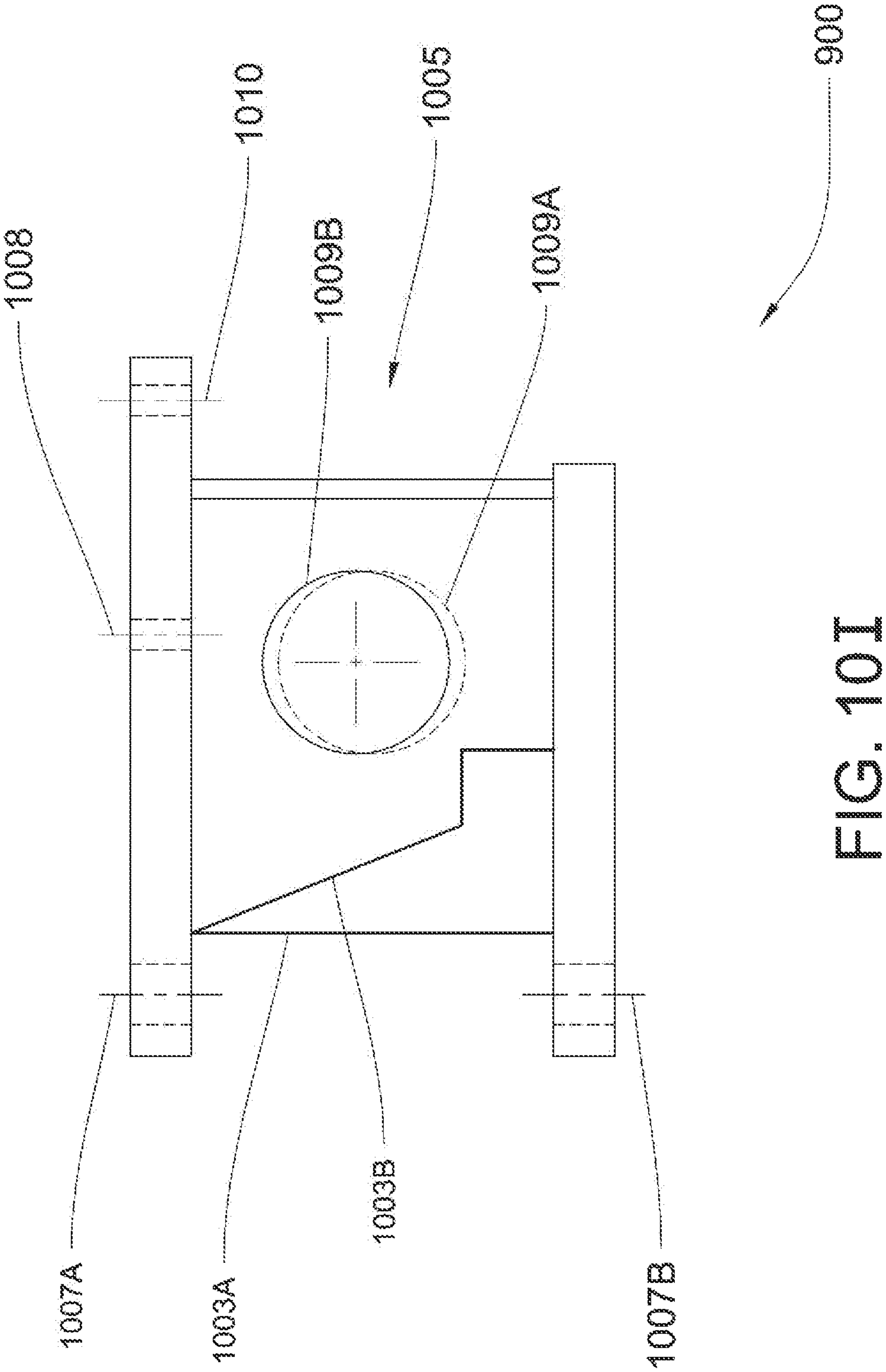

FIG. 10I depicts an exploded detailed side view of attachment apparatus 900 power steering system including hub carrier assembly 1005, with associated components, i.e. outside aperture 1009A for an axle to be supported in on the outside of the hub carrier assembly within the outside side hub carrier web 1003A with the rearward profile shown on the left side indicated with the 1003A leader line, inside aperture 1009B for an axle to be supported in on the inside of the hub carrier assembly within the inside side hub carrier web 1003B with the rearward profile shown on the left side indicated with the 1003B leader line, shown centerline for hole 1007A for main hub carrier ball joint, shown centerline for hole 1007B for main hub carrier ball joint, shown centerline for hole 1010 for a ball stud for the end of a tie rod and the centerline for hole 1008 for the rod end of steering hydraulic cylinder. It is contemplated that the inner side hub carrier web may have a profile that will fit around the frame hub carrier assembly mount 1006 shown in FIGS. 10A-10D and FIGS. 10G-10H. It is further contemplated that aperture 1009A and 1009B may be cut at a higher or lower position to change vertical camber and vertical location of wheels 910 shown in FIG. 10C as $A_3$ and $A_5$ as a positive camber of 1.5 degrees or be moved left to right to bring the wheels 910 out of a parallel position as shown on FIGS. 10E & 10G without making any other adjustments. Apertures 1009A, 1009B may be generally circular shaped or oval shaped. It is contemplated these adjustments may be advantageous to change the performance of steering and stability and to add or take away traction or drag on the wheel 910 treads as may be desired. With power steering, two functions may be implemented in an optimal manner; the load may be able to be lifted and maintained with the wheels aligned into a fully functional placement and independent of the wheels of the loader's wheels movement while the attachment wheels may be turned and maintained to allow the operator of the loader to move and turn the loader without compromising the stability of the load held from the loading point(s). It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, but be turned, cambered or aligned with powered steering as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction.

Referring again to FIGS. 9B-9D, boom 915 is configured as a long rod or pole. It is contemplated that boom 915 may include a lifting hook 967, block and tackle 964, beam trolley 970, stranded wire rope cable 965, lift attachment apparatus extension rod 969 and lift attachment apparatus jib 966. Boom 915 may also include one or more apertures, hooks, connectors, and the like to allow coupling to material for transport. It is contemplated that boom 915 may be modified by use of a lift attachment apparatus extension rod 969 and/or a lift attachment apparatus jib 966.

Figures 10J, 10K:
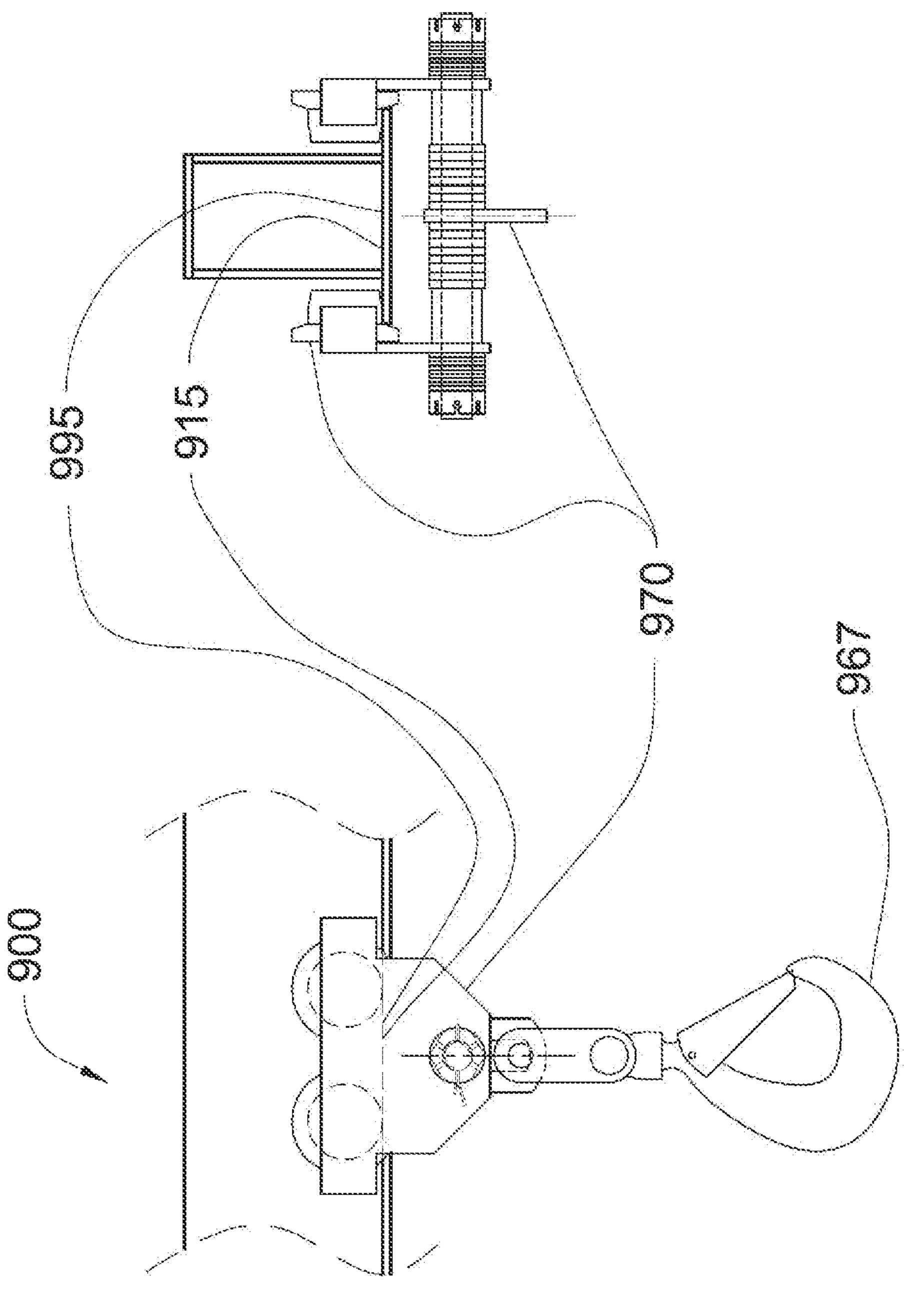
Figure 10L:
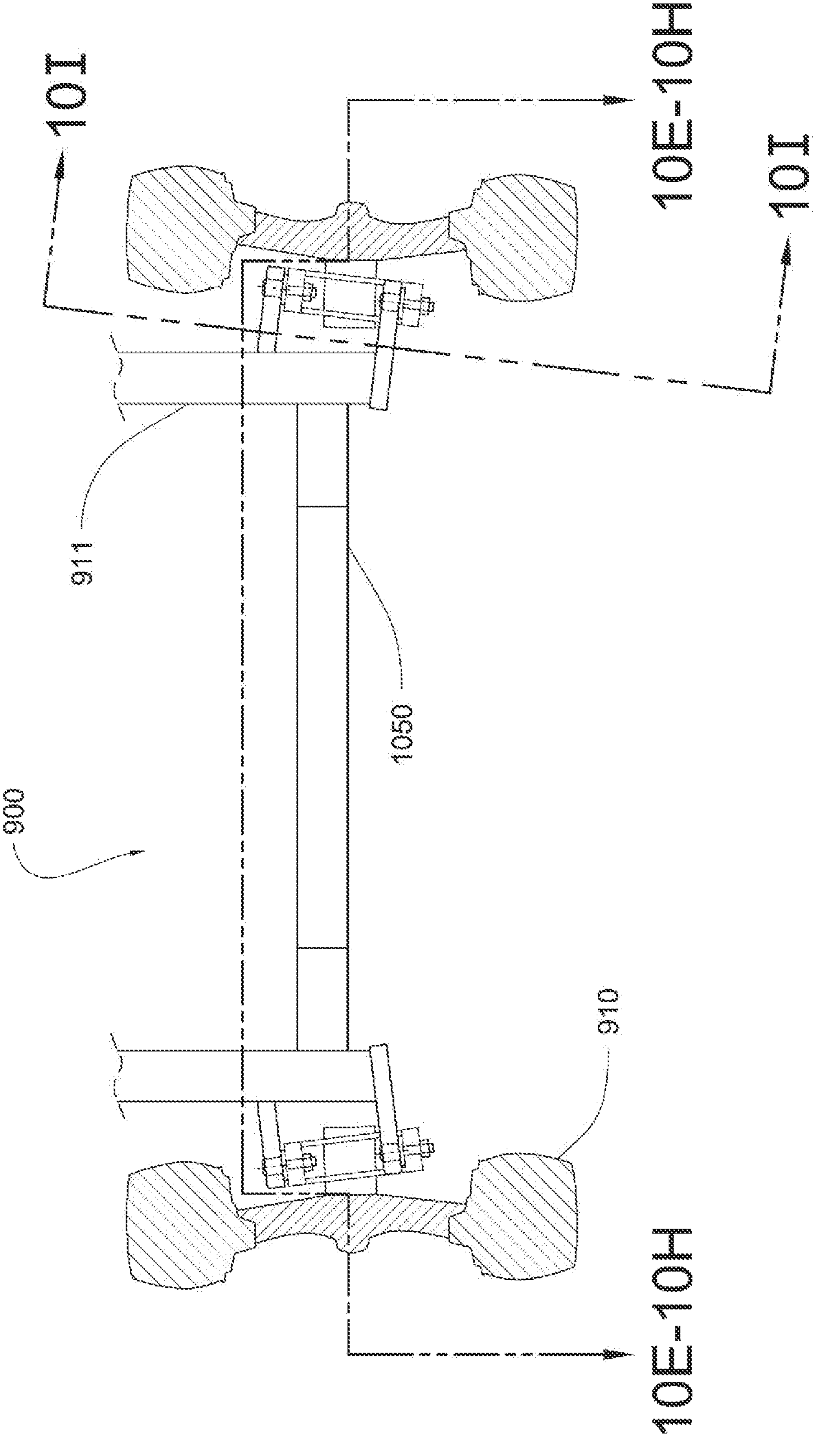

It is contemplated that boom 915 may be constructed of steel, and may be tubular in nature. However, boom 915 may be formed of various cross section shapes such as rectangular, round, triangle, roman arch, or gothic arch. Boom 915 may be constructed as a skeletal body. Boom 915 may be constructed of other materials instead of or in addition to steel, including aluminum, wood, plastic, carbon fiber, composites thereof and the like. Referring to FIGS. 10J-K, the side and cross section of boom 915 and lift attachment apparatus extension rod 969 may be constructed with a flange to carry a beam trolley as shown riding on flange plane 995 being a loading point in front of the center of the wheels 910. It is contemplated that various devices could be rolled on different shapes if incorporated into the shape of boom 915 and lift attachment apparatus extension rod 969 as shown on FIG. 9D and that additional devices may be added, such as powered wheels on a trolley or other rolling configuration, stopping devices on boom 915 and lift attachment apparatus extension rod 969 and other fail-safe devices to move, maintain, or limit the movement of cables, hooks or rollers of the cable hoist assembly.

Referring to FIGS. 11A-11F, a power driven lift attachment apparatus 1100 according to an additional alternative embodiment of the present disclosure is shown. Lift attachment apparatus 1100 may include a frame, the frame including an attachment device 1105. Attachment device 1105 may be configured to attach to a tilting plane of loader 1130. It is contemplated that attachment device 1105 may be a quick attachment device in use with various types of attachments to connect with loaders. It is contemplated that a quick attachment device may be a device which allows a user to attach and detach attachments with a connection without difficult assembly and disassembly. Additionally, a quick attachment device may not require specialized tools which may allow for attachment and detachment of attachments in the field. A pair of wheels 1110 may be coupled to the frame. It is contemplated that a first wheel of the pair of wheels may be located on a first side of the frame and a second wheel of the pair of wheels may be located on a second side of the frame, the first wheel configured to be maintained through structured mechanical configuration near parallel to the second wheel. In an embodiment, each wheel may include a tire. Apparatus 1100 may further include a boom 1115 with a loading point at the end connected to the frame.

Figure 11A:
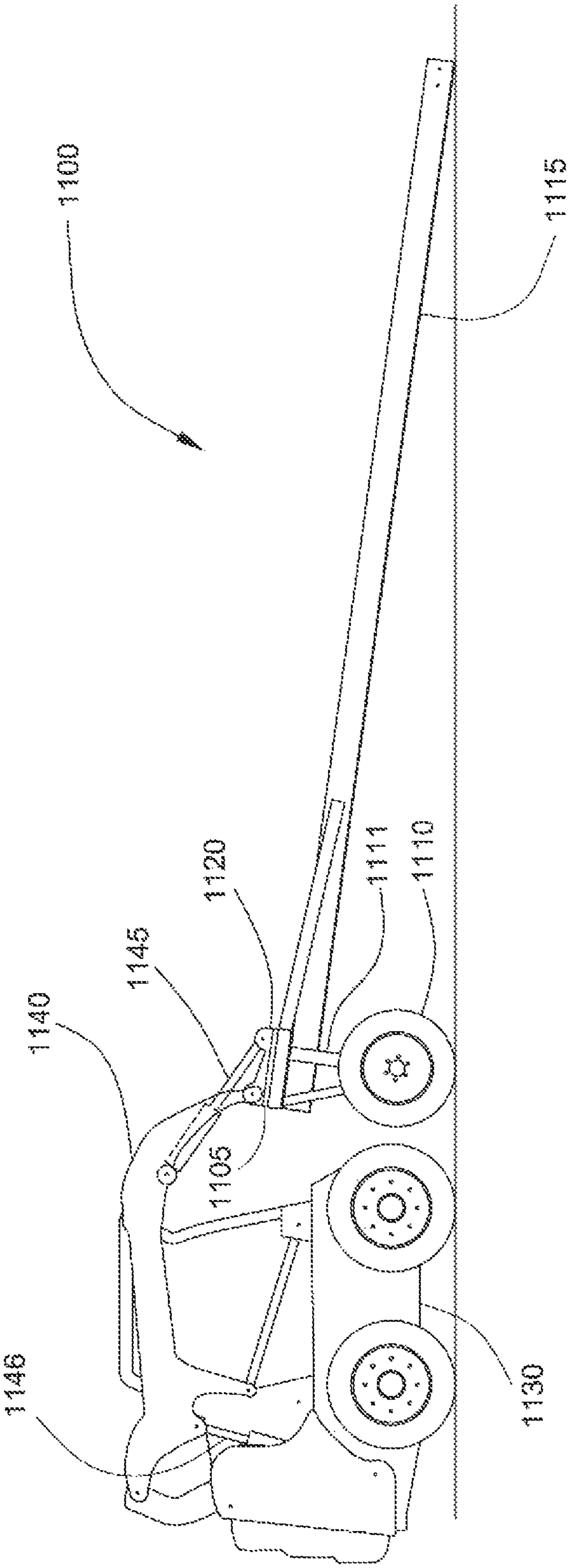
FIGS. 11A-11F depict a lift attachment apparatus with power wheels and a loader with added hydraulic controls in accordance with an embodiment of the present disclosure.
Figure 11B:
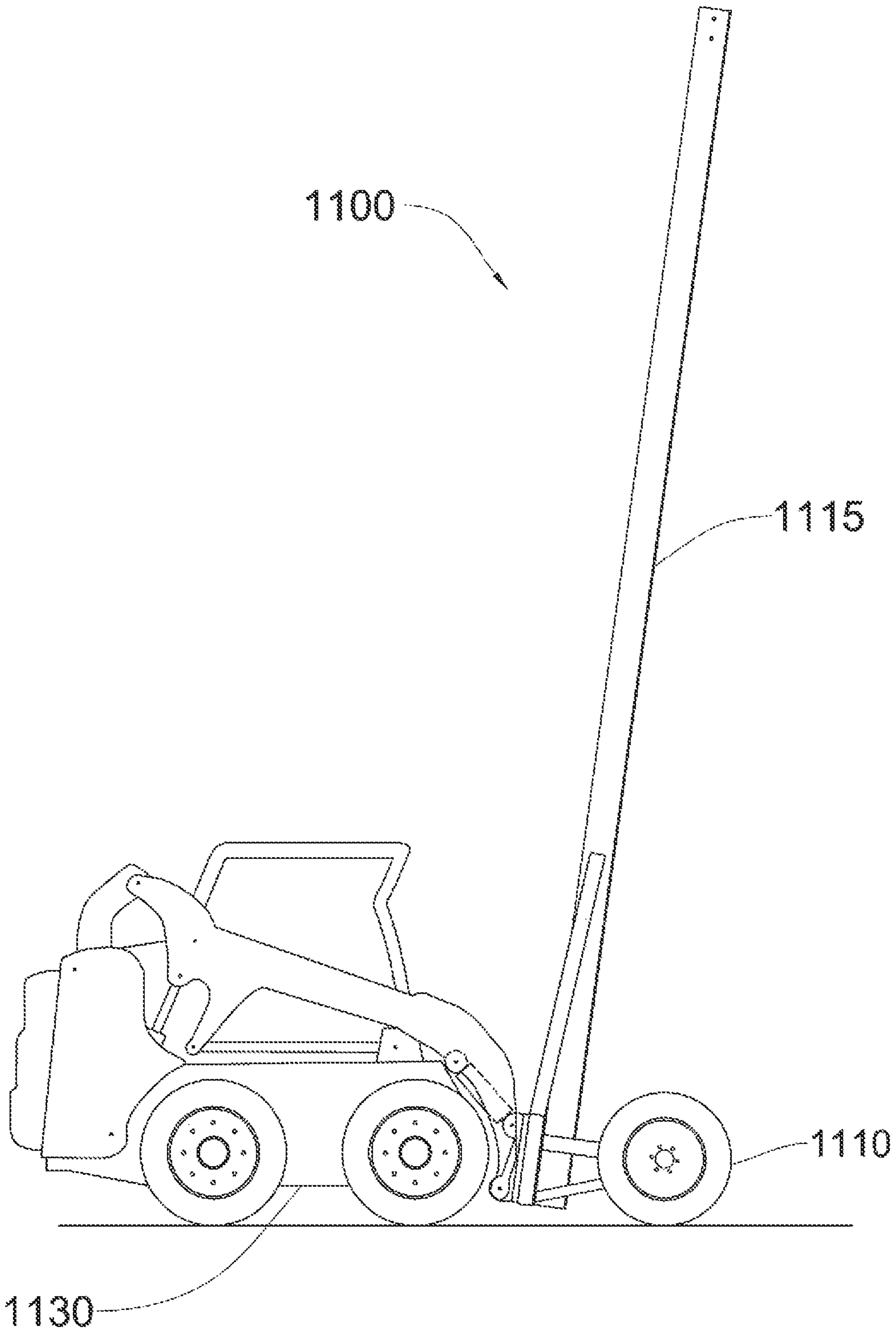

Advantageously, it is contemplated that various items (e.g. a load) may be removably coupled to an end of boom 1115 and may be lifted to a desired location. Lift attachment apparatus 1100 according to present disclosure may be configured to be safely rotated from a position near horizontal to the ground (0 to 10 degrees) as shown in FIG. 11A to a near vertical position (near 80 to 90 degrees to a surface up against wheel 910) as shown in FIG. 11B without risking the load or tipping an attached loader. Attachment device 1105 of frame may be configured to attach to a tilting plane 1120 of a loader 1130 having a forward facing loader arm 1140. It is contemplated that attachment device 1105 may be permanently fixed or incorporated with tilting plane 1120 according to an alternative embodiment of the present disclosure. Boom 1115 may be generally fixed with the attachment device 1105 of the frame. It is contemplated that control of the boom 1115 is provided by application of force to the attachment device 1105 by the forward facing loader arm 1140 in a downward direction to create lift and rotation of the tilting plane 1120 causing rotation of an end of the boom about the first wheel and the second wheel of the pair of wheels 1110. Tilting plane 1120 may be controlled by a hydraulic cylinder 1145 of loader. It is contemplated that boom 1115 may be configured to be tipped up via application of force to the attachment device 1105 in a downward direction and via reverse action of hydraulic cylinder 1146 of the forward facing loader arm 1140 of the loader 1130. Through reverse action, the hydraulic capacity may be reduced, such as by about 44%. This reduction in hydraulic capacity may make it difficult to overload the apparatus 900 attachment if the load is being raised. Since the hydraulic capacities of hydraulic cylinders of many loaders are just over their tipping capacity, the reduction in hydraulic capacity may put the apparatus well below the tipping capacity and higher than the safe operating capacity. Advantageously, hydraulic cylinder 1145 of the loader is not working in a reverse action and gains support towards lifting loads on the end of the boom with pressure applied to wheel 1110 with the downward action of the loader arms 1140 with the retracting action of hydraulic cylinder 1146. In a standard attachment arrangement without support external of the loader such as a standard bucket, the hydraulic cylinders 1145, 1146 may work separately to support the load according to how they are designed to operate. In this arrangement, hydraulic cylinders 1145, 1146 may work together with the support of wheel 1110 which is also carrying the weight of the load.

Power driven lift attachment apparatus 1100, by use of the pair of wheels 1110, operating between the loader 1130 and the load at the end of the boom 1115, may operate as a lever. This configuration and capability to operate as a lever may dramatically improve the lift capacity of the boom 1115 as compared to previous implementations. For example, the use of the pair of wheels 1110 as the fulcrum, may allow an amplification of the input force provided by a loader 1130 when applied to the attachment device 1105 of the lift attachment apparatus 1100 in order to provide a greater output force. It is contemplated that mechanical advantage of the lift attachment apparatus 1100 may be greater when the pair of wheels 910 at the point to where the pair of wheels 1110 come into contact with a surface is located between the attachment device 1105 that is coupled to a tilting plane of a loader 1130 and the load which is located at the end of the boom 1115, as shown in FIG. 11B. Additionally, it is contemplated that a center point of the pair of wheels 1110, (e.g. the point at which the wheels may contact the axle), may also be forward of the attachment device 1105 whereby mechanical advantage of the lift attachment apparatus 1100 may be greater. Use of the lift attachment apparatus 1100 may allow transport of material while the loader is located thirty feet away or greater, which may be particularly valuable in muddy conditions or other conditions in which a surface is not solid.

Referring again to FIGS. 11A-11F, boom 1115 is configured as a long rod or pole. While not shown in FIGS. 11A-11E, but shown in FIGS. 9D & 10J-10K, it is contemplated that boom 915 may include a trolley beam having a riding flange plane 995. Boom 1115 may also include one or more apertures, hooks, connectors, and the like to allow coupling to material for transport. It is contemplated that boom 1115 may be constructed of steel, and may be tubular in nature. However, boom 1115 may be formed of various cross section shapes such as rectangular, round, triangle, roman arch, or gothic arch. Boom 1115 may be constructed as a skeletal body. Boom 1115 may be constructed of other materials instead of or in addition to steel, including aluminum, wood, plastic, carbon fiber, composites thereof and the like.

Loader 1130 may include any type and size of loader. Loader 1130 may be a track skid loader, skid steer loader, all wheel steer loader, wheel loader, teleskid, boom loader, crawler loader or a front end loader. While loader 1130 is described with a single forward facing loader arm 1140, it is contemplated that two or more forward facing loader arms may be employed by a loader 1130 without departing from the scope and intent of the present disclosure. It is also contemplated that loader 1130 may employ added hydraulic controls.

Figure 11C:
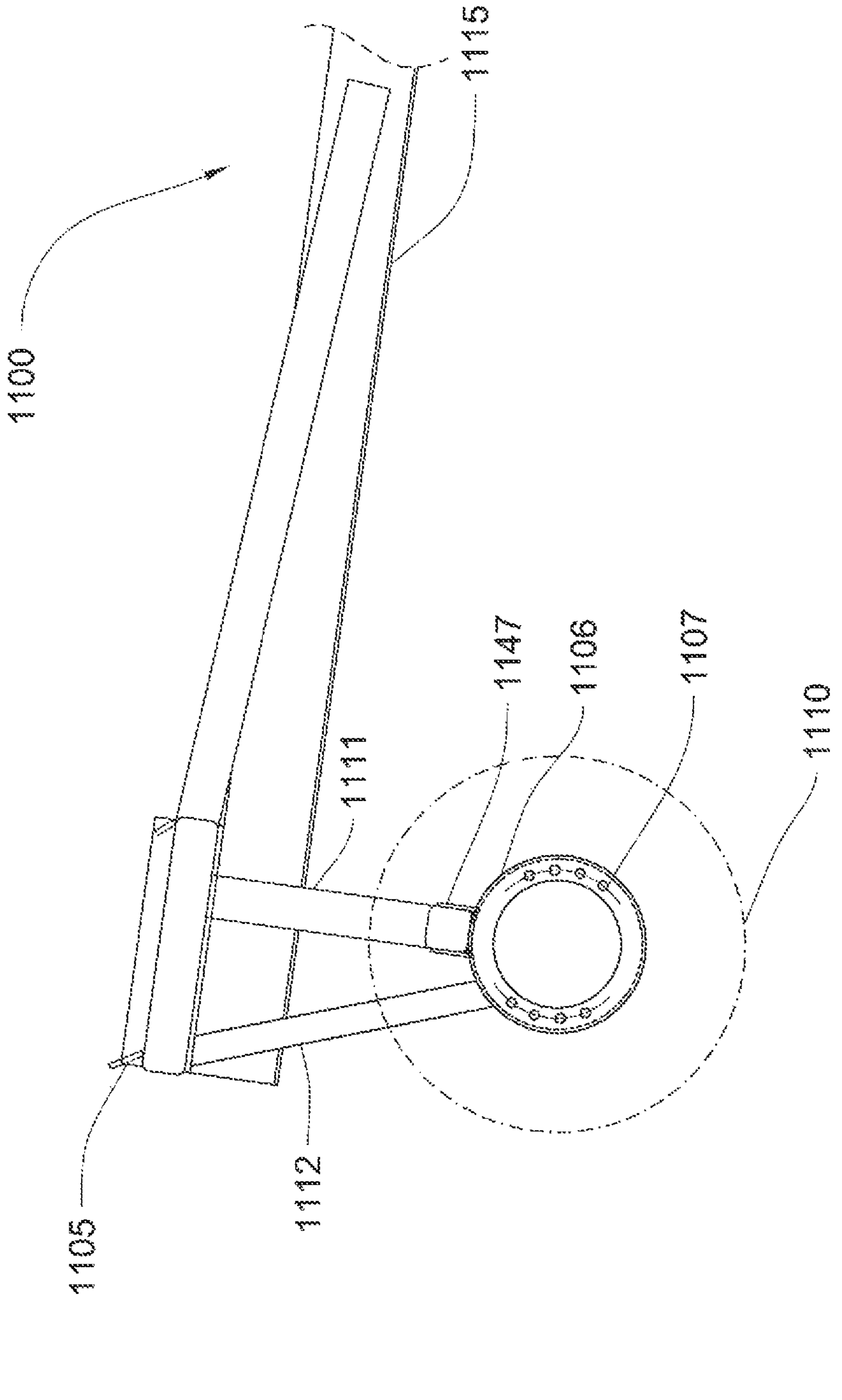

FIG. 11C depicts an exploded detailed side view of the power driven lift attachment apparatus 1100 with associated components, i.e. with the lift attachment apparatus boom 1115, drive rated wheel 1110, attachment device 1105, a perpendicular frame coupler 1111 being a non-swiveling member, an angled frame coupler 1112, vertical hub carrier coupler 1106 being in a state of non-swiveling fixity alignment, a hub carrier mounting plate 1147, hub mounting holes 1107 drilled in the hub carrier to match a hydraulic drive motor. It is contemplated the hub carrier mount could be made of 12" O.D. round steel with a ring welded to the face large enough for a hydraulic motor to be mounted to through the hub mounting holes 1107. It is also contemplated that angled frame coupler 1112 could have a different length that would allow the pitch of the hub carrier 1006 to be changed or for hub carrier mount 1006 to be moved to accommodate different hydraulic motors and configurations.

Figure 11D:
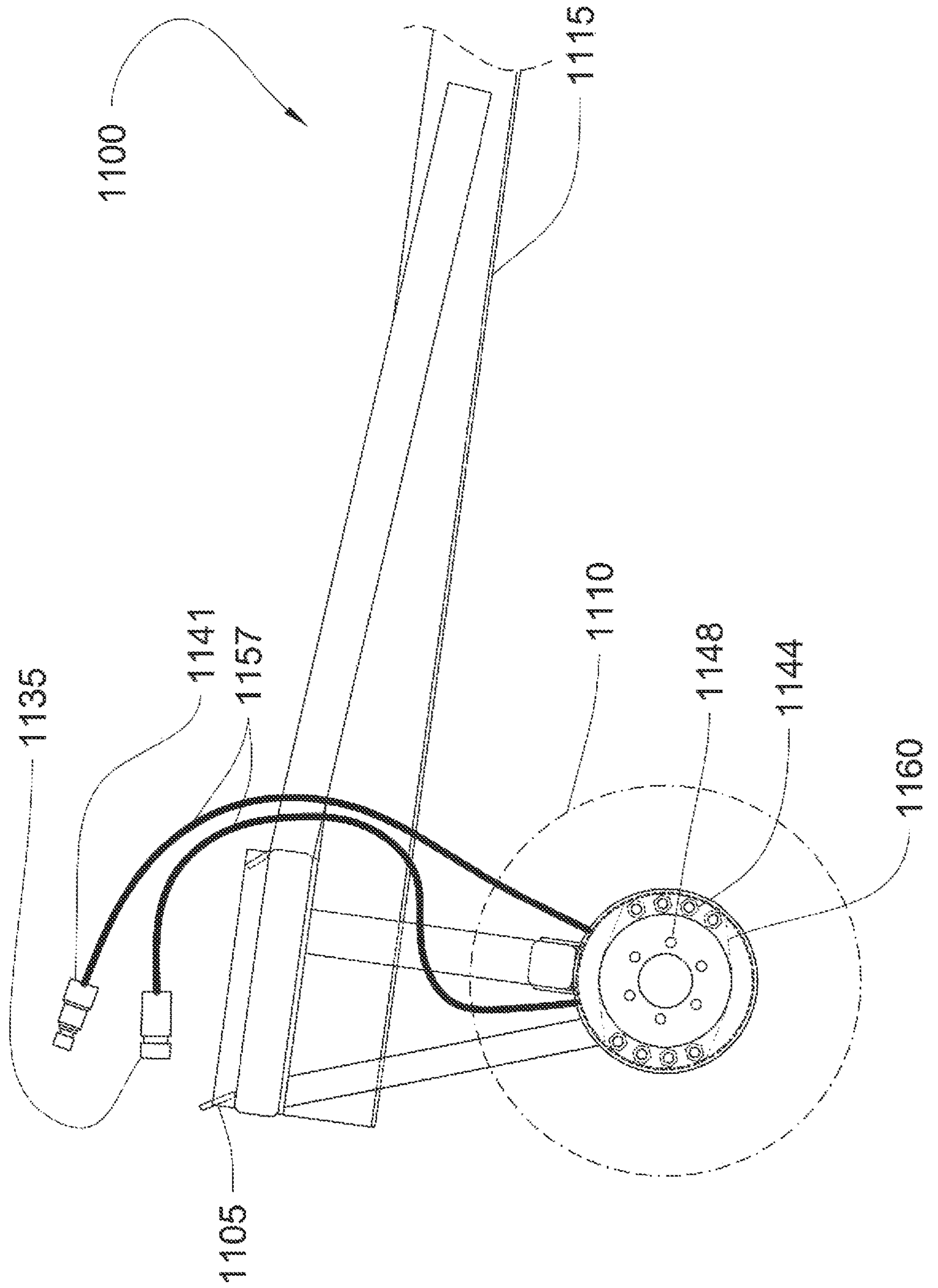

FIG. 11D depicts an exploded detailed side view of the power driven lift attachment apparatus 1100 with associated components, i.e. with the lift attachment apparatus boom 1115, hydraulic drive motor 1160, hydraulic drive motor mounting bolts 1144, drive wheel studs 1148, hydraulic hoses 1157, hydraulic male flat faced quick coupler 1141 receivable of positive hydraulic pressure inflow to drive forward, hydraulic female male flat faced quick coupler 1135 receivable of negative hydraulic pressure outflow to drive forward.

Figure 11E:
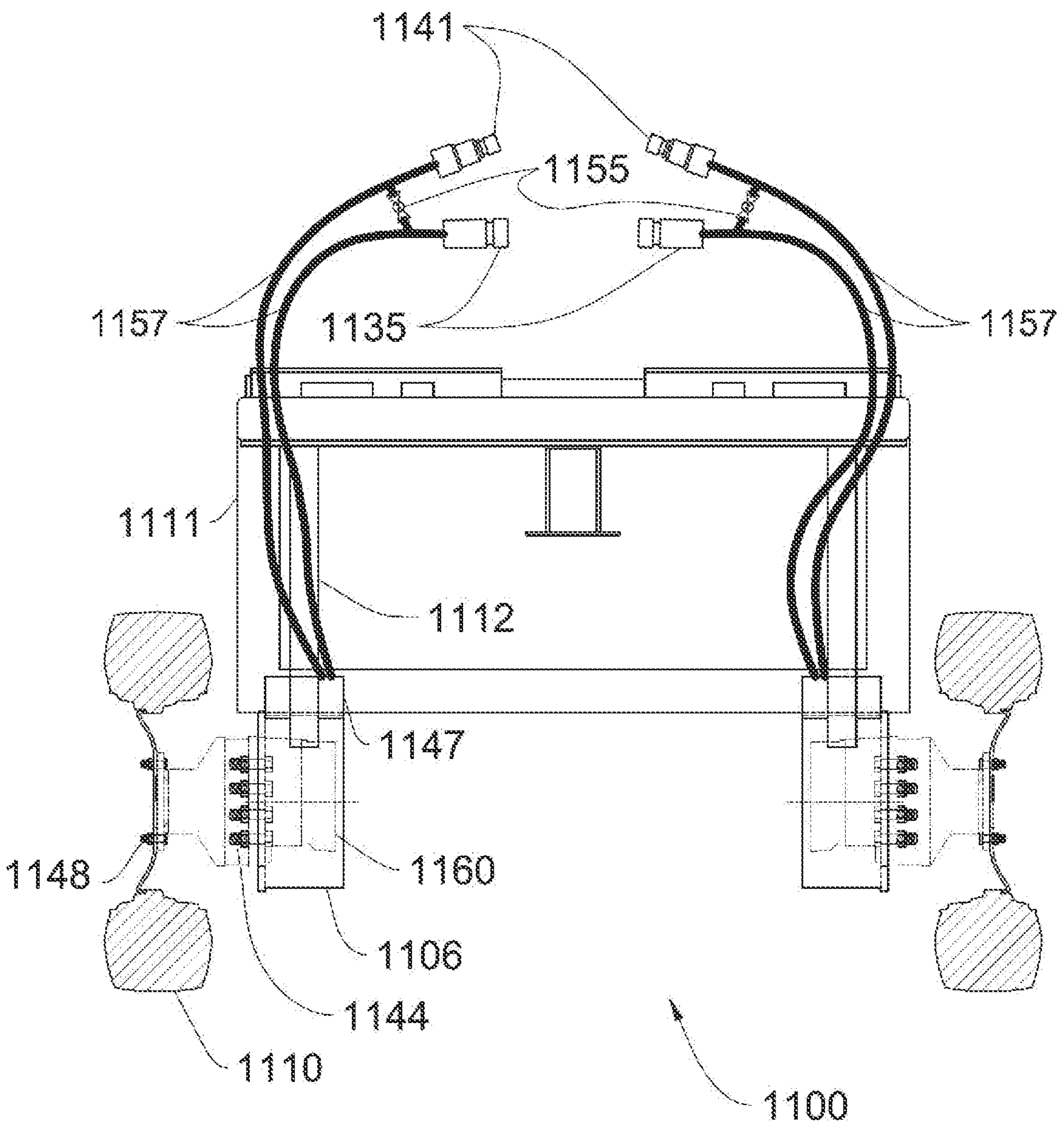
Figure 11F:
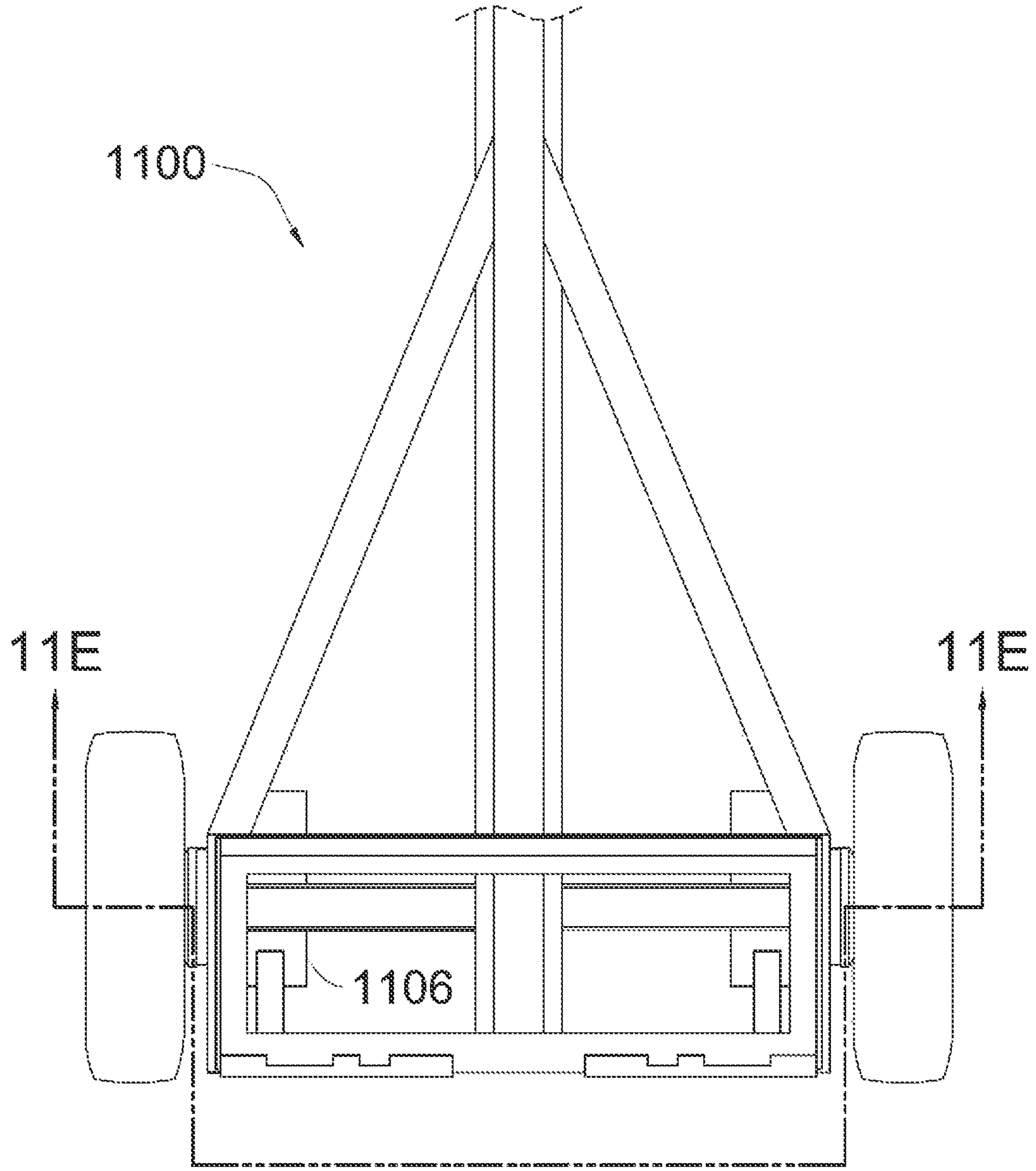

FIG. 11E depicts an exploded detailed rear view, being the view of the operator of lift attachment apparatus 1100 with associated additional components 1155 bypass valves. It is contemplated these valves may be used to loop the hoses to move the attachment when hydraulic power is not available for shortly timed use. It is also contemplated hoses with adapters that "T" out to these fittings or are connected to each fitting can be made to fit a variety of machines, but it may be more advantageous to have the hoses 1157 with the hydraulic male flat faced quick couplers 1141 run together before the male flat faced quick couplers 1141 and hoses 1157 with hydraulic female male flat faced quick couplers 1135 run together before the female male flat faced quick couplers 1135 making 2 quick couplers in total rather than 4.

Referring to FIGS. 11C-11F, it is contemplated that hydraulic drive motor 1160 may be a Poclain MS05-6-2e drive motor. However, a different hydraulic motor may be employed that may have additional features including but not limited to variable brakes, fail-safe brakes, an internal disengaging feature, or an integrated transmission run by gears, chains, belts or pulleys. It is further contemplated that the hydraulic drive motor 1160 may not be within the vertical hub carrier coupler 1106 being a non-swiveling member, but run into an independent hub, transmission, gearbox, brake or engagement device within or between the hydraulic drive motor 1160 and the vertical hub carrier coupler 1106. It is also contemplated that the motor could be powered by other means such as electricity or fuel. It is contemplated these motors will normally be able to be run with the loader with no additional controls on the attachment but a control device may be employed that may be operable with the loader 1130 controls or independent of the loader 1130.

Referring to FIG. 11E, It is contemplated hoses with adapters that "T" out to these fittings or are connected to each fitting can be made to fit a variety of machines, one of those machines being a machine that has quick couplers that are hydraulically charged with valves linked to the control arms of the loader synchronized with the loader wheels that determine flow of positive and negative pressures. It is contemplated that this option may be closed off via a switch accessible to the driver that cuts off all four lines at which time those lines are connected open on their corresponding sides of the loader together to allow the attachment to be in a neutral position and allowing attachment functions to move as freely as possible rather than creating hydraulic lock up or to allow the functions of the attachment to work with the hand controls of the loader rather than be synchronized with the loader wheels.

The lift attachment apparatus 1100 as described and shown in FIGS. 11A-11E provides a number of advantages. It is common that contractors may have access to a loader due to the reduced cost of a loader as compared to lifts and cranes. Additionally, through use of various attachments, loaders may be more likely to be owned due to their multiple functions, usability, and operability without specialized skill. However, previous implementations of booms with loaders are limited due to their low lift capacity, reach, or mobility. It is further contemplated that powered wheels being used with an attachment will allow loader 1130 to move in a more safe and efficient manner and may be a necessity for moving loads on steeply sloped, uneven or muddy ground and may be an advantageous configuration for moving large loads on slightly sloped ground. It is contemplated that in this arrangement, that the wheels 1110 are fixed in their alignment, being stable, and may continually act as a functional fulcrum in moving a load. It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction.

Figure 12A:
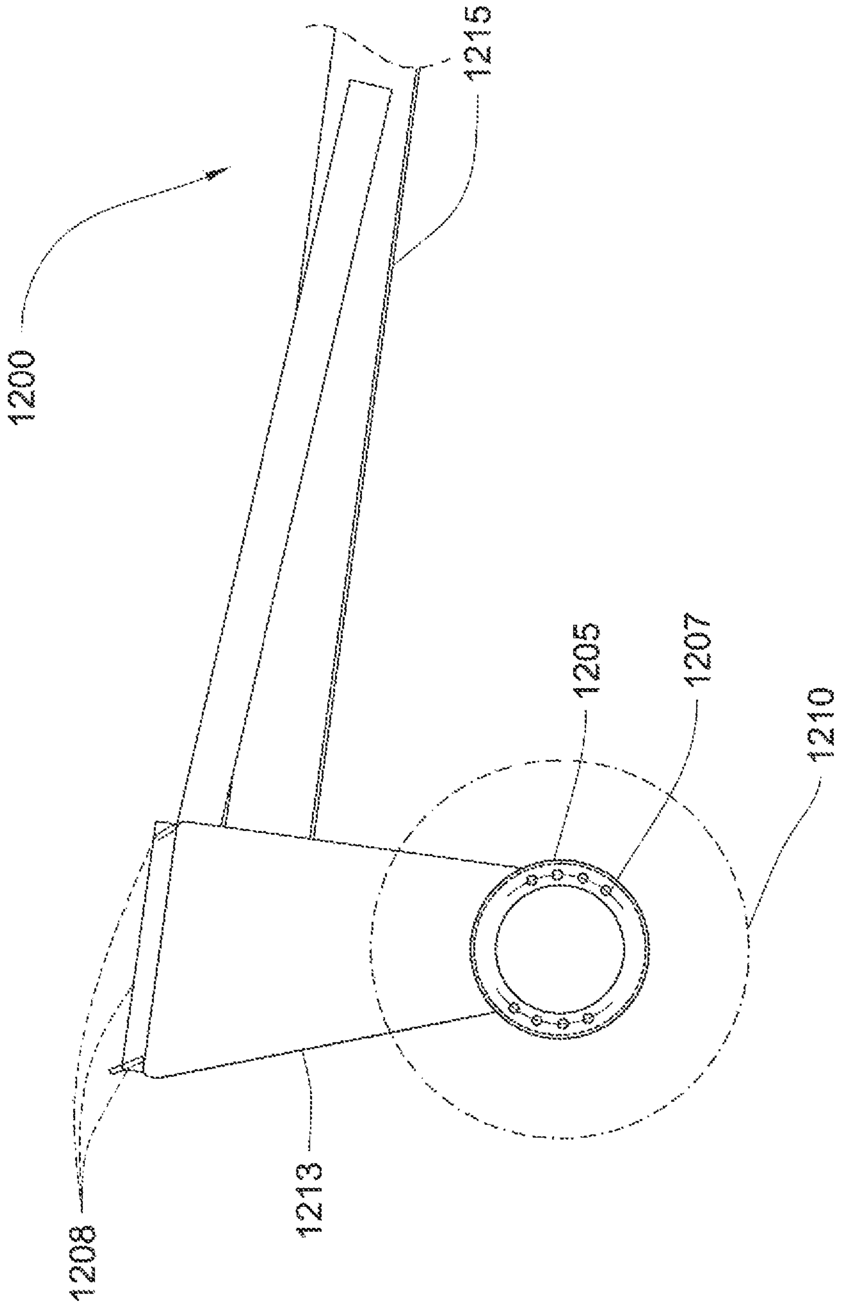
FIG. 12A depicts an exploded side view of a lift attachment apparatus in accordance with an alternative embodiment of the present disclosure.
Figure 12B:
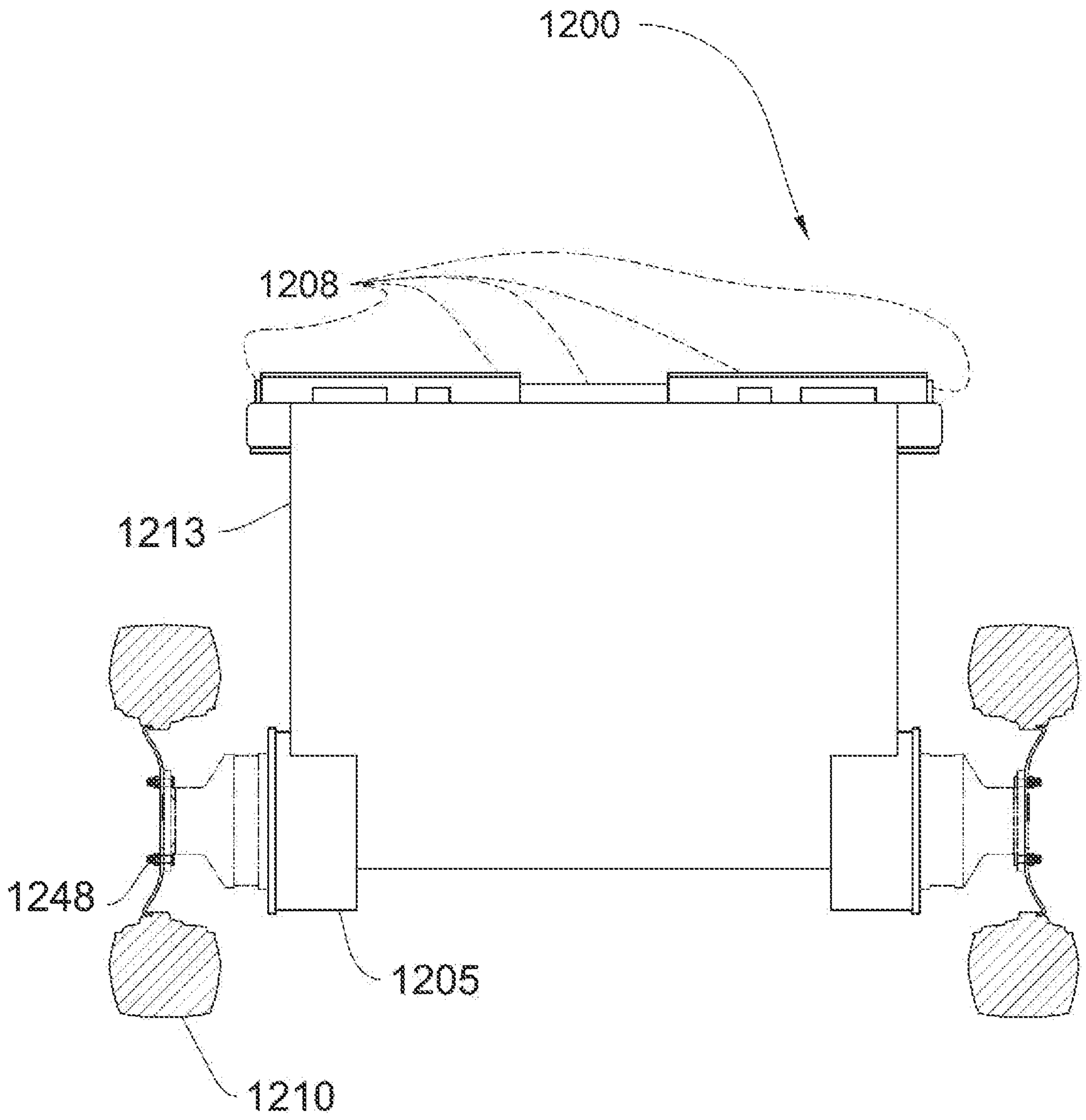
FIG. 12B depicts an exploded rear view of a lift attachment apparatus in accordance with an alternative embodiment of the present disclosure.
Figure 12C:
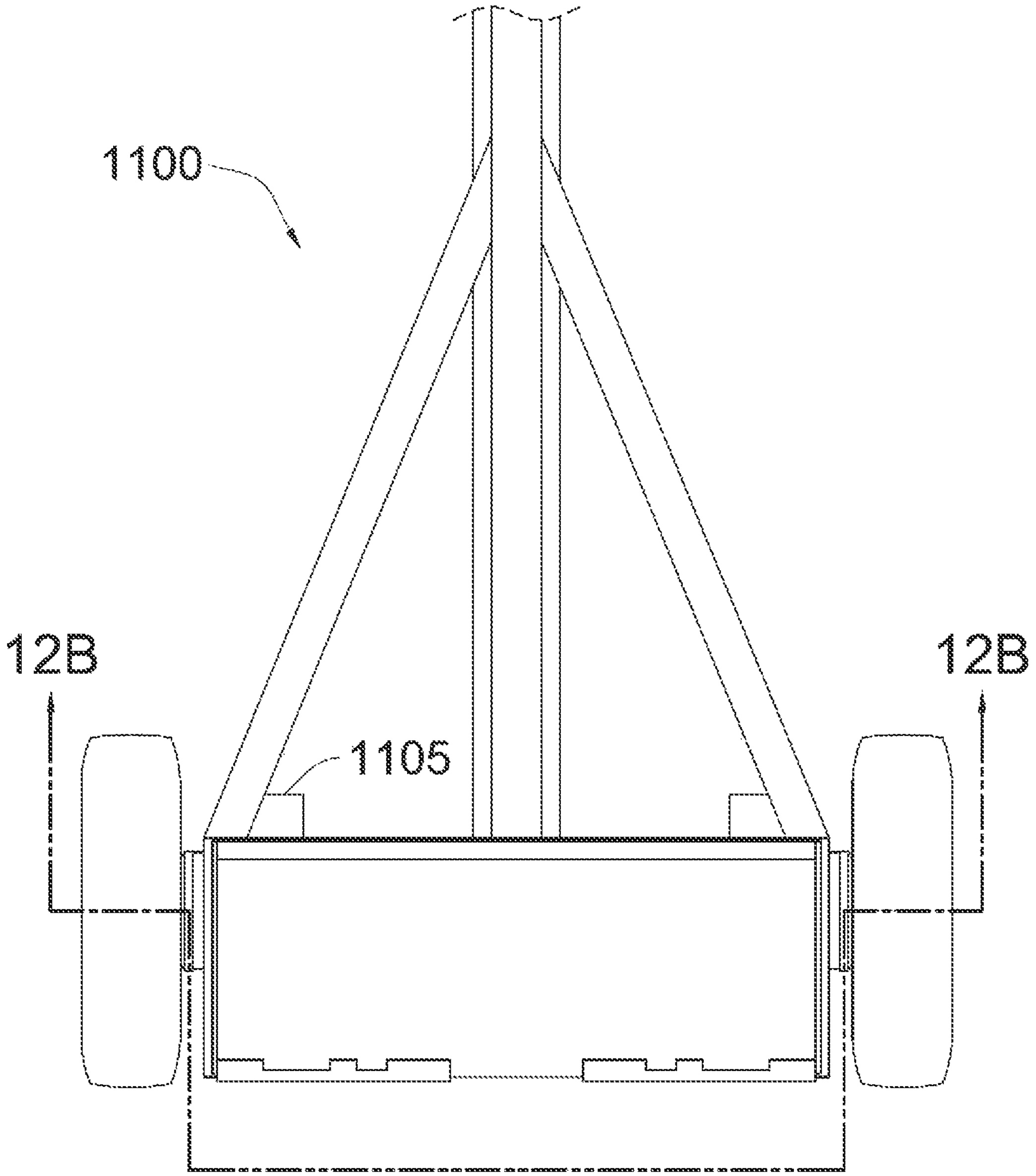
FIG. 12C depicts a top view of a lift attachment apparatus in accordance with an embodiment of the present disclosure.

Referring to FIGS. 12A-12C, a lift attachment apparatus according to an alternative embodiment is shown. Lift attachment apparatus 1200 may provide an enclosed space for devices including but not limited to a hydraulic pump, a motor, gears, a transmission, a battery, a communication system to communicate between lift attachment apparatus 1200 and a loader, solenoids, relays, or other devices related to use of the boom 1215. It is also contemplated that controller device may also include cords, hoses, or fluid storage containers to provide for more efficient operation of lift attachment apparatus 1200. It is contemplated that the frame 1213 may be formed of a generally rectangular box, formed of steel plate and may include 0.25" or thicker steel welded together, including six pieces. It is contemplated that with this configuration, the frame may not include any tubular, square, or cast steel members to reinforce the frame 1213. This configuration may be advantageous in that it would have a completely open space for storage and devices. Although not shown, it is contemplated that frame 1213 may have one or more doors for access, dividers, or mounting brackets. As shown, attachment apparatus fins 1208 may be used to attach a loader attachment plate to lift attachment apparatus 1200 where the top of frame 1213 would include an attachment plate. It is contemplated that non-powered wheels 1210 or powered wheels 1210 may be used if attached to a hub with lug studs 1248 or to vertical hub carrier assembly coupler 1205 with the coupler being in a state of non-swiveling fixity alignment as desired. It is contemplated that in this arrangement, that the wheels 1210 are fixed in their alignment, being stable, and may continually act as a functional fulcrum in moving a load.

Referring to FIGS. 13A-13G, a lift attachment apparatus 1300 in accordance with another alternative embodiment is shown. Lift attachment apparatus 1300 may include a bucket 1367 and may allow lifting of material at a longer and higher distance away from loader 1330 than with a standard bucket attached to a loader 1330. Bucket 1367 is shown as a smooth dirt bucket but it is also contemplated it could also be a snow bucket, a snow blade, push blade, bulldozer type blade, angling scraper blade, dredger bucket, forks, a boom, hook, setting pole or other basic lifting configuration. It is contemplated that additional hydraulic or electric capabilities to run an attached device including but not limited to a grapple, circular saw, chainsaw, block setter, auger, material platform or work platform may be provided. It is contemplated the bucket 1367 may attach to boom attachment apparatus 1321 being a loading point through a corresponding bucket attachment device 1306 being a loading point.

Figure 13A:
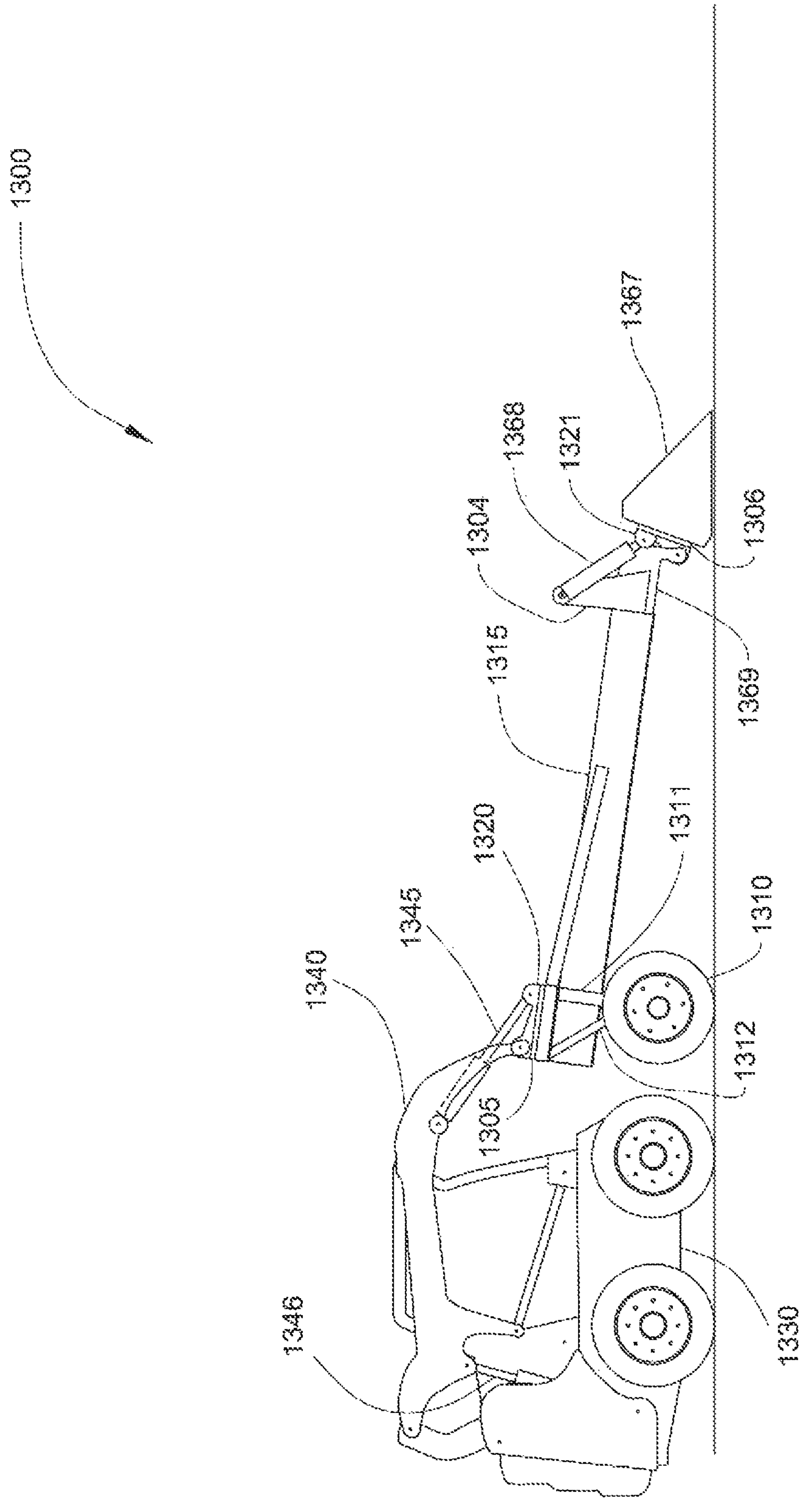
FIGS. 13A-13C depict side views of a lift attachment apparatus in accordance with an embodiment of the present disclosure.
Figure 13B:
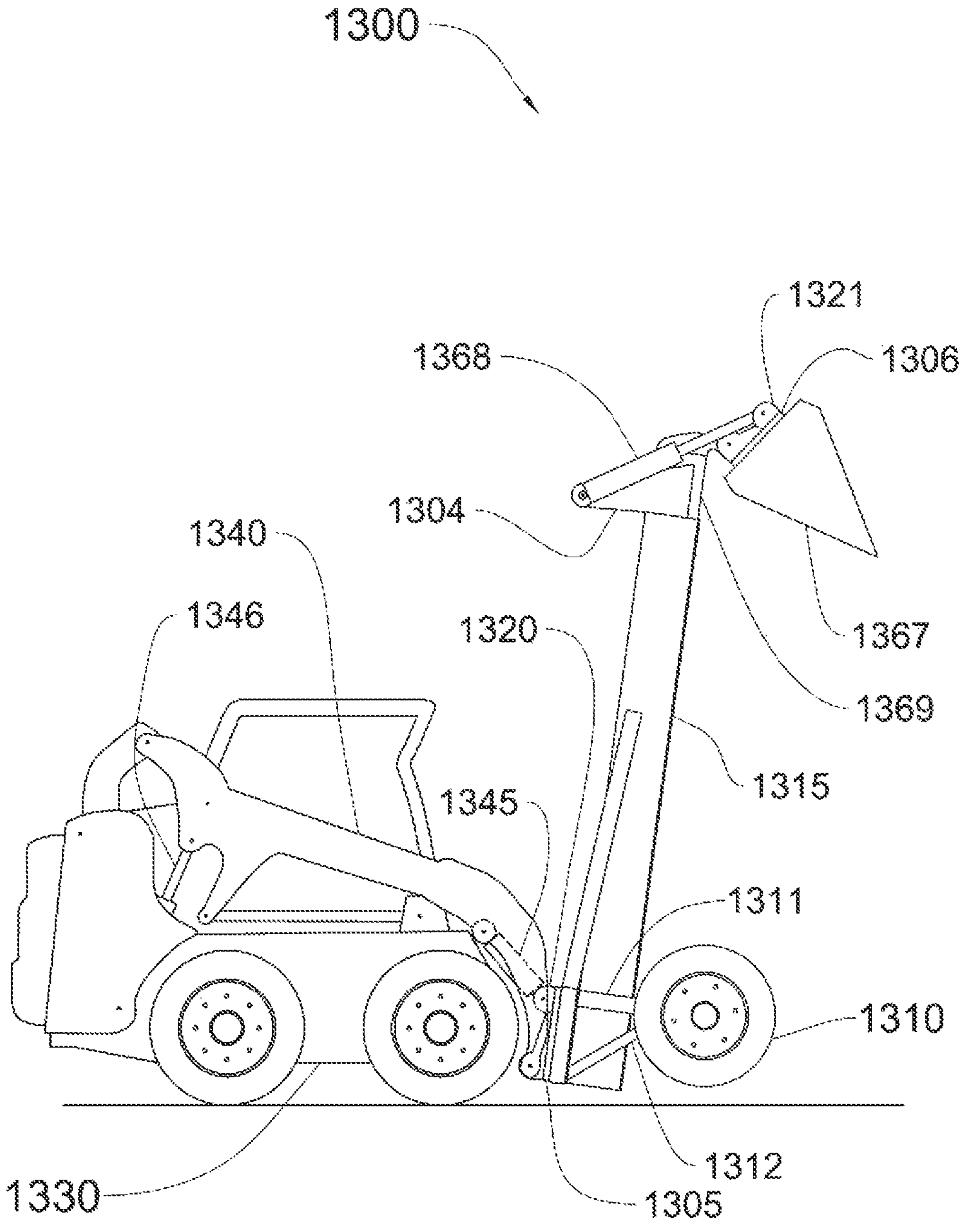
Figure 13C:
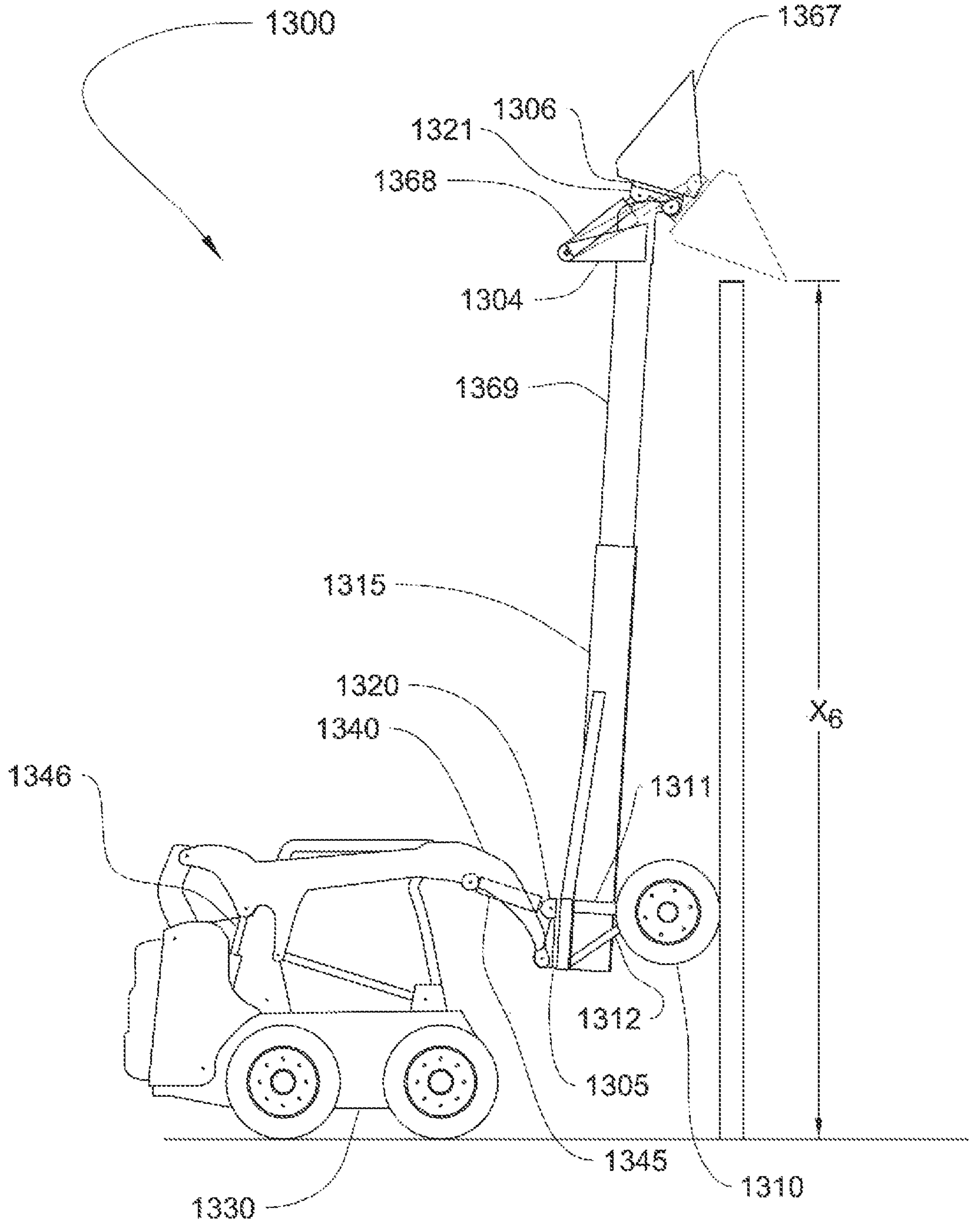

Referring again to FIGS. 13A-13P, it is contemplated that various configurations (e.g. a load) may be removably coupled to an end of boom 1315 and may be lifted to a desired location. Lift attachment apparatus 1300 according to present disclosure may be configured to be safely rotated from a horizontal position as shown in FIG. 13A to a near vertical position (near 80 to 90 degrees to a surface) as shown in FIGS. 13B-13C without risking the load or tipping an attached loader 1330. Attachment device 1305 of frame may be configured to attach to a tilting plane 1320 of a loader 1330 having a forward facing loader arm 1340. It is contemplated that attachment device 1305 may be permanently fixed or incorporated with tilting plane 1320 according to an alternative embodiment of the present disclosure. Boom 1315 may be generally fixed with the attachment device 1305 of the frame. It is contemplated that control of the boom 1315 is provided by application of force to the attachment device 1305 by the forward facing loader arm 1340 in a downward direction to create lift and rotation of the tilting plane 1320 causing rotation of an end of the boom about the first wheel and the second wheel of the pair of wheels 1310. Tilting plane 1320 may be controlled by a hydraulic cylinder 1345 of loader 1330. It is contemplated that boom 1315 may be configured to be tipped up via application of force to the attachment device 1305 in a downward direction and via reverse action of hydraulic cylinder 1346 of the forward facing loader arm 1340 of the loader 1330. Through reverse action, the hydraulic capacity may be reduced, such as by about 44%. This reduction in hydraulic capacity may make it difficult to overload the lift attachment apparatus 1300 if the load is being raised. Since the hydraulic capacities of hydraulic cylinders of many loaders are just over their tipping capacity, the reduction in hydraulic capacity may put the apparatus well below the tipping capacity and higher than the safe operating capacity. Advantageously, hydraulic cylinder 1345 of the loader is not working in a reverse action and gains support towards lifting loads on the end of the boom with pressure applied to wheel 1310 with the downward action of the loader arms 1340 with the retracting action of hydraulic cylinder 1346. In a standard attachment arrangement without support external of the loader such as a standard bucket the hydraulic cylinders 1345, 1346 work separately to support the load according to how they are designed to operate. In this arrangement, these hydraulic cylinders 1345, 1346 work together with wheel 1310 which is also carrying the weight of the load.

Figure 13D:
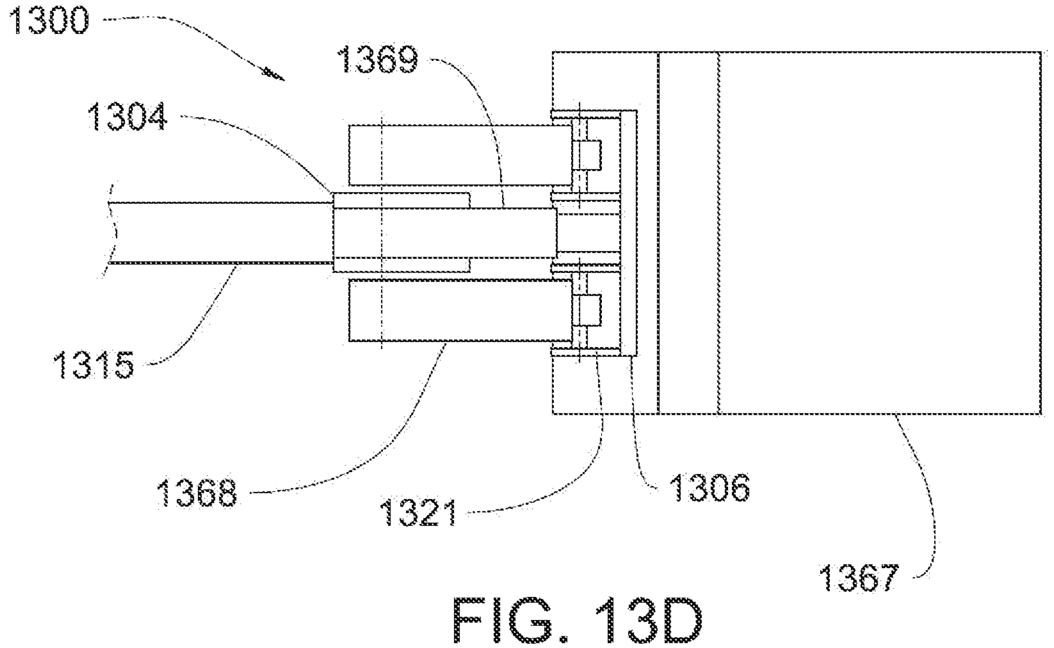
FIG. 13D depicts an exploded top view of a lift attachment apparatus in accordance with another alternative embodiment of the present disclosure.
Figure 13E:
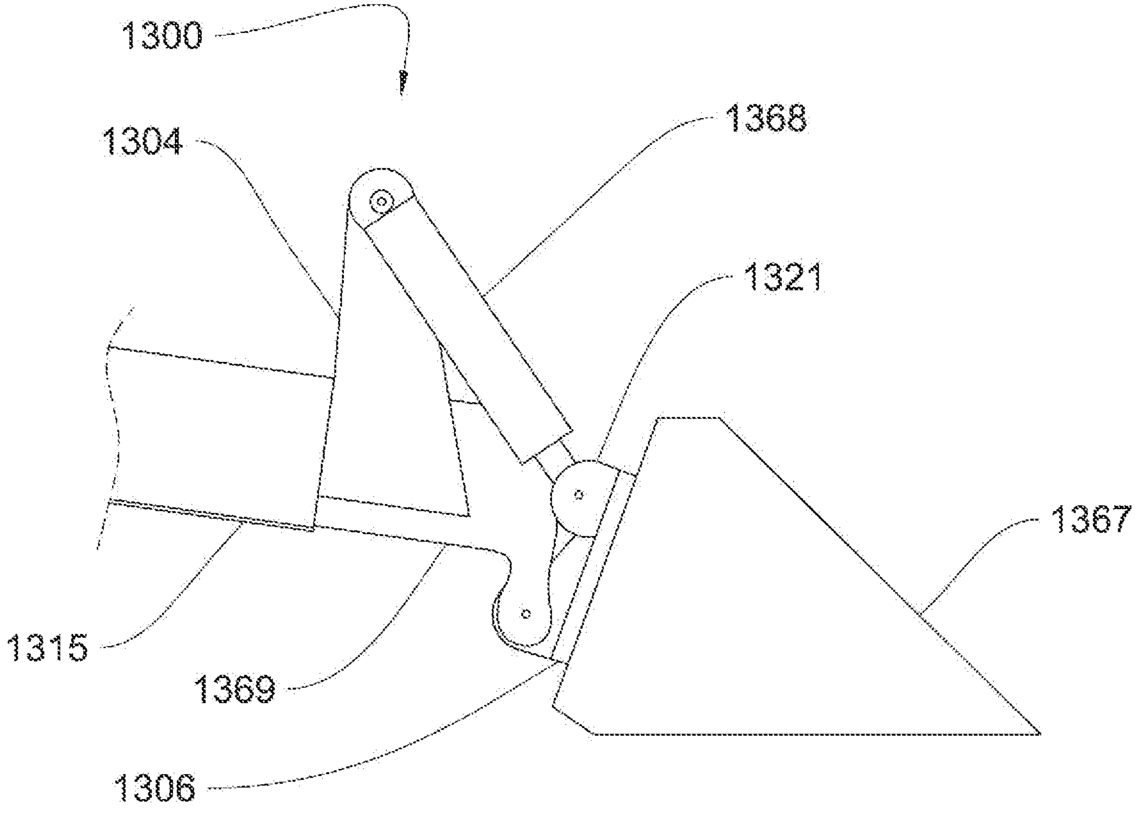
FIG. 13E depicts an exploded side view of a lift attachment apparatus in accordance with another alternative embodiment of the present disclosure.

Referring to FIG. 13C, a lift attachment apparatus 1300 which further includes an additional extension rod with carrier hinge 1369 in accordance with an embodiment of the present disclosure is shown. It is contemplated that boom 1315 may further include a hollow interior sized to accommodate extension rod with carrier hinge 1369 as shown in FIGS. 13D-13E to be extended as shown in FIG. 13C to be extended manually and set with pins like a truck hitch or by electric or hydraulic force. Extension rod with carrier hinge 1369 may extend out of boom 1315 and connect to boom attachment apparatus 1321 with a hinge pin to attach to bucket attachment device 1306 on bucket 1367 to increase the height capacity and range of the lift apparatus 1300 to exemplary heights such as $X_6$ shown at 18' high in FIG. 13C but may be able to reach heights of 22' or more in this configuration. It is contemplated that the extension rod with carrier hinge 1369 having a bucket 1367 on the end with the support of wheel 1310 may have the advantageous capability of operating in straighter or controlled paths than a bucket on a boom without strait attachment wheels. It is further contemplated that if an articulated arrangement such as on FIG. 8X, but with a boom or a power steering arrangement such as FIG. 11E, that the extension rod with carrier hinge 1369 having a bucket 1367 on the end with the support of wheel 1310, may have the advantageous capability of operating in straighter and curved paths than a bucket on a boom without articulated or power steered attachment wheels.

It is contemplated that extension rod with carrier hinge 1369, boom attachment apparatus 1321, bucket attachment device 1306, and bucket 1367 may be of different configurations to accommodate a different bucket such as a snow bucket, snow blade, a push blade, bulldozer type blade, angling scraper blade, dredger bucket, combination bucket, forks, a boom, hook, setting pole or other basic lifting configuration or may employ additional hydraulic capabilities or electric capabilities to run an attached device including but not limited to a grapple, circular saw, chainsaw, block setter, auger, material platform or work platform. Additionally, extension rod with carrier hinge 1369 may have adjustable angles at the end and also may range from 0 to a 180 degree return. As shown in FIG. 13C, lift attachment apparatus 1300 may be supported against a vertical wall in order to increase vertical range of the lift attachment apparatus 1300. It is further contemplated that lift attachment apparatus 1300 may be supported against a generally horizontal surface on a different horizontal elevation than the loader 1330 to increase vertical range and horizontal range. Surfaces to be rested against may include but are not limited to a material dump box of a truck or trailer, a vertical cliff, an upward or downward slope, or a tight strap may be attached on non-swiveling members frame coupler 1311 to the opposing side frame coupler 1311, on frame coupler 1312 to the opposing side frame coupler 1312, axle 1313A to axle 1313B, and axle 1313C to axle 1313D, shown on FIGS. 13F-13G to rest against a pole or a tree.

Referring again to FIGS. 13A-13P, it is contemplated that bucket 1367 may be tipped with hydraulic cylinders 1368 connected to mast 1304 with a pin which is attached to the side of extension rod with carrier hinge 1369 as shown in FIGS. 13C-13E.

Figure 13F:
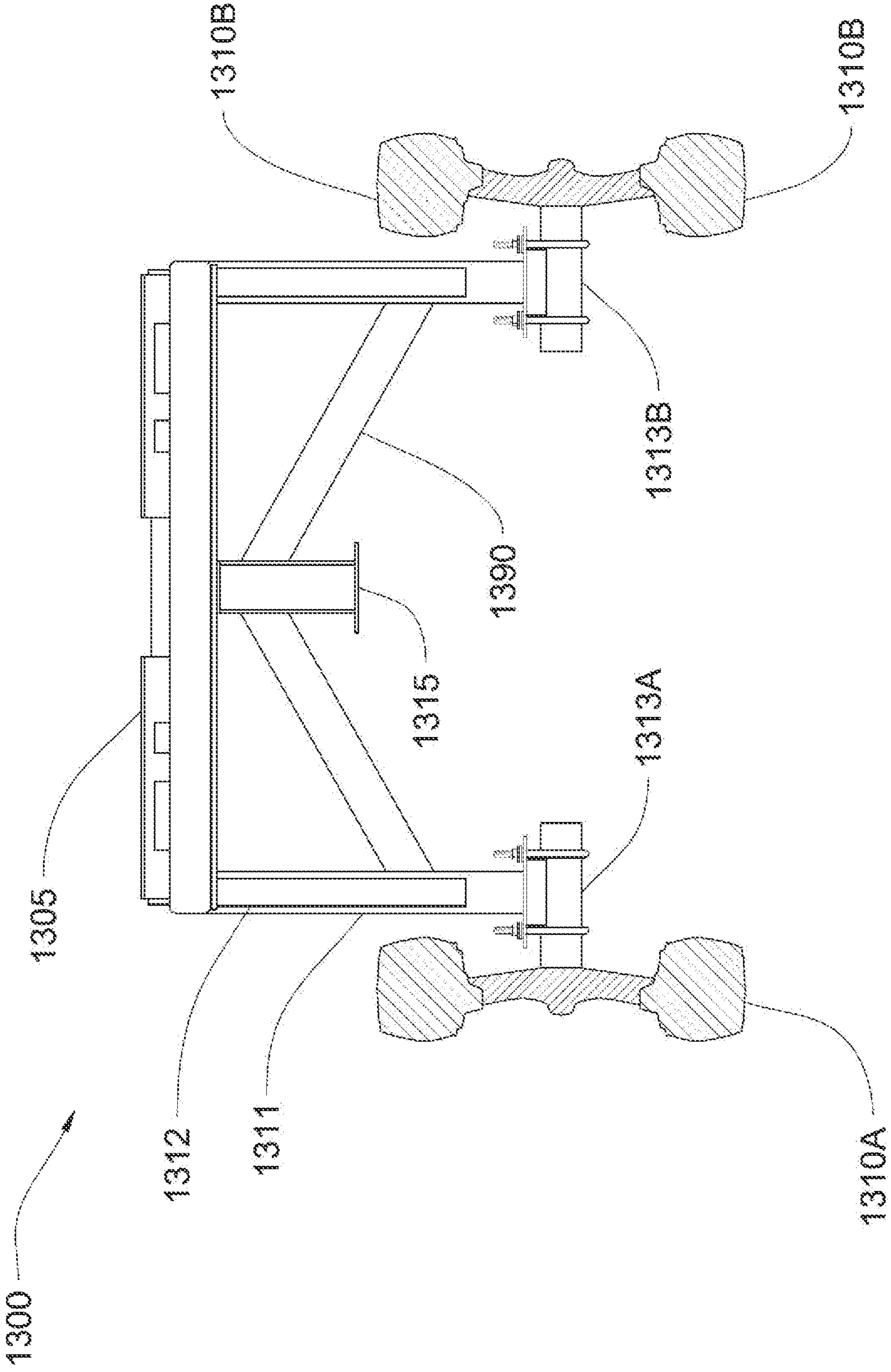
FIGS. 13F-13G depict exploded rear view of a lift attachment apparatus in accordance with another alternative embodiment of the present disclosure.
Figure 13G:
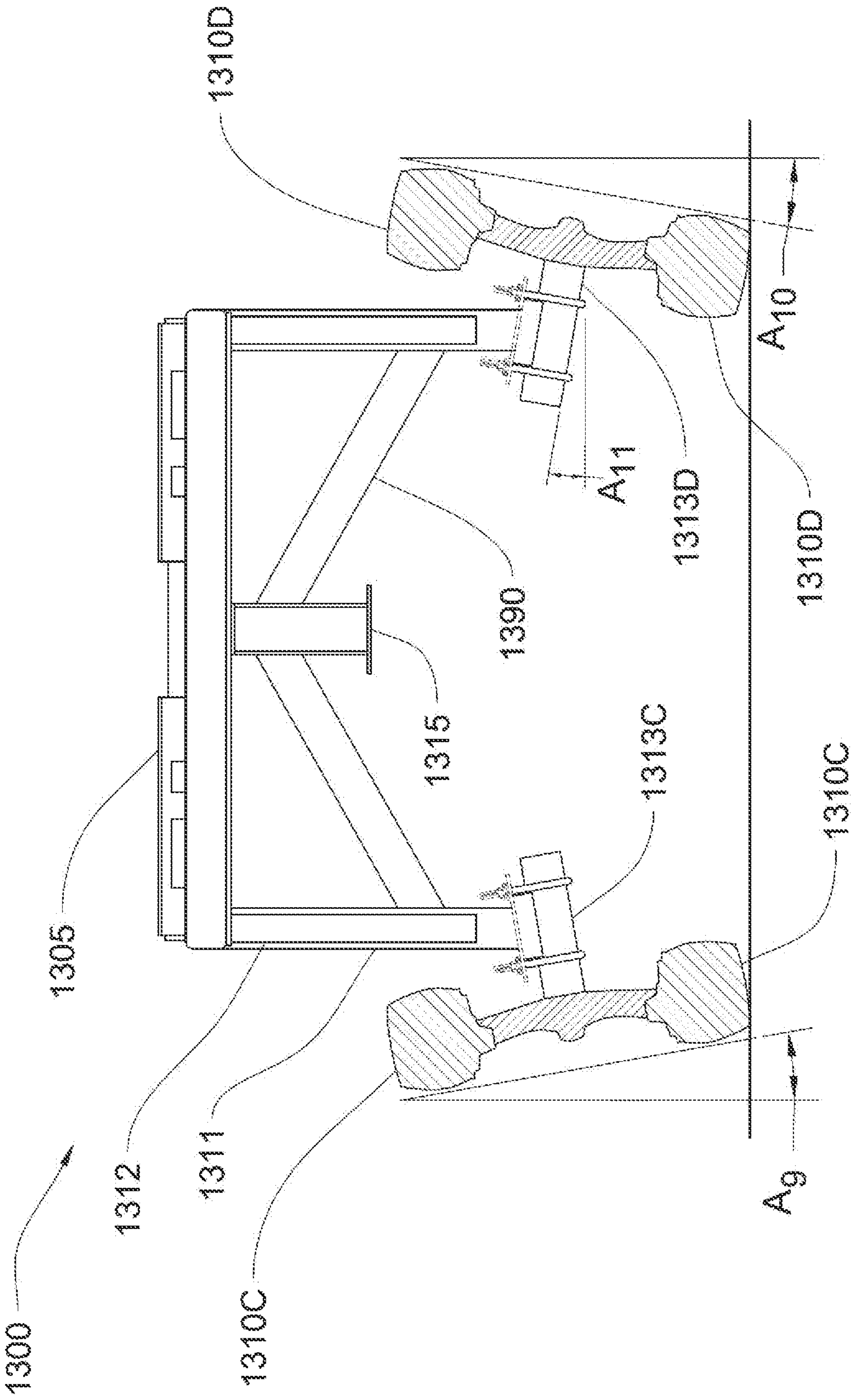
Figure 13H:
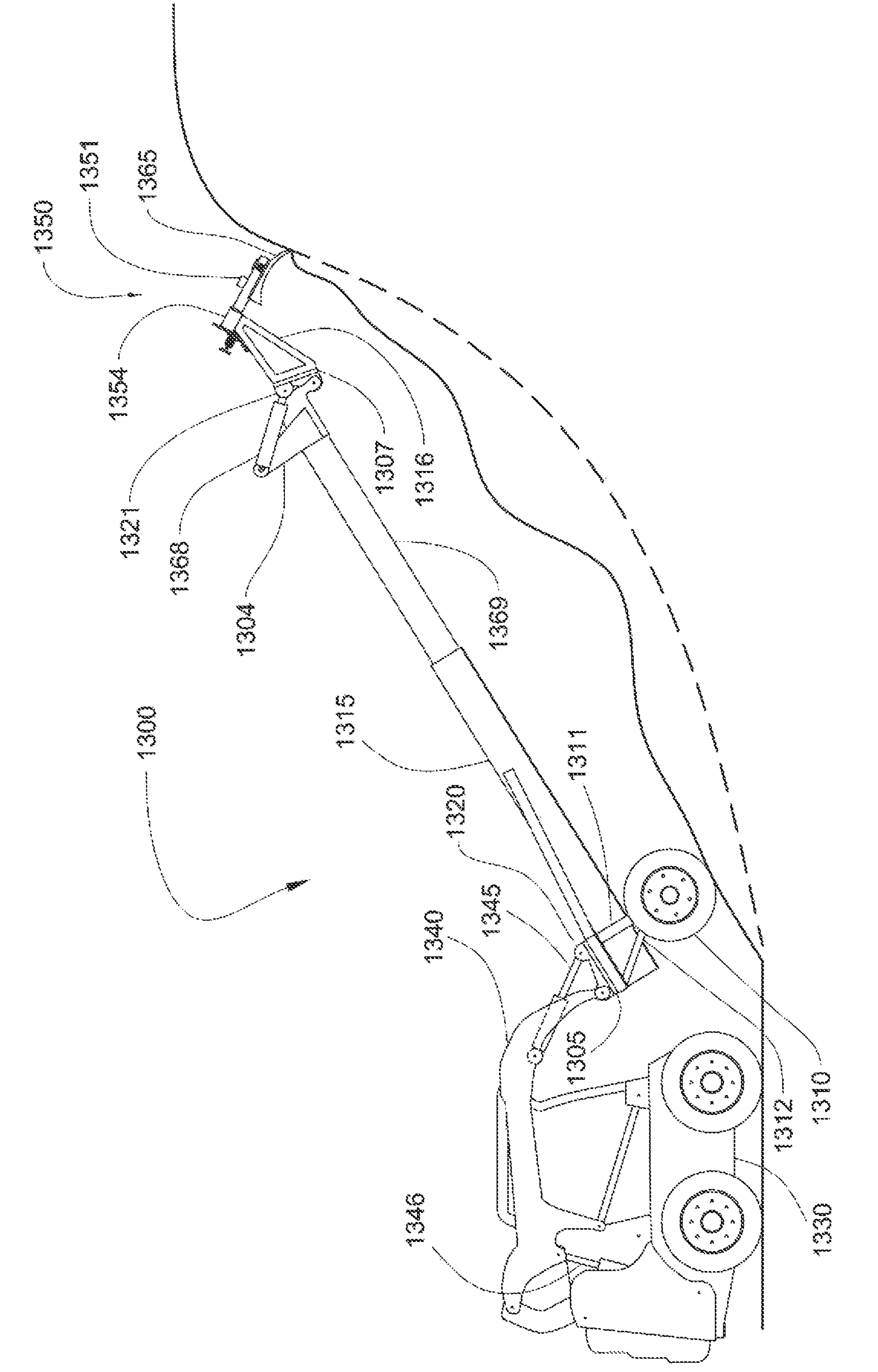
FIG. 13H depicts a side view of a lift attachment apparatus according to an additional alternative embodiment of the present disclosure.
Figure 13I:
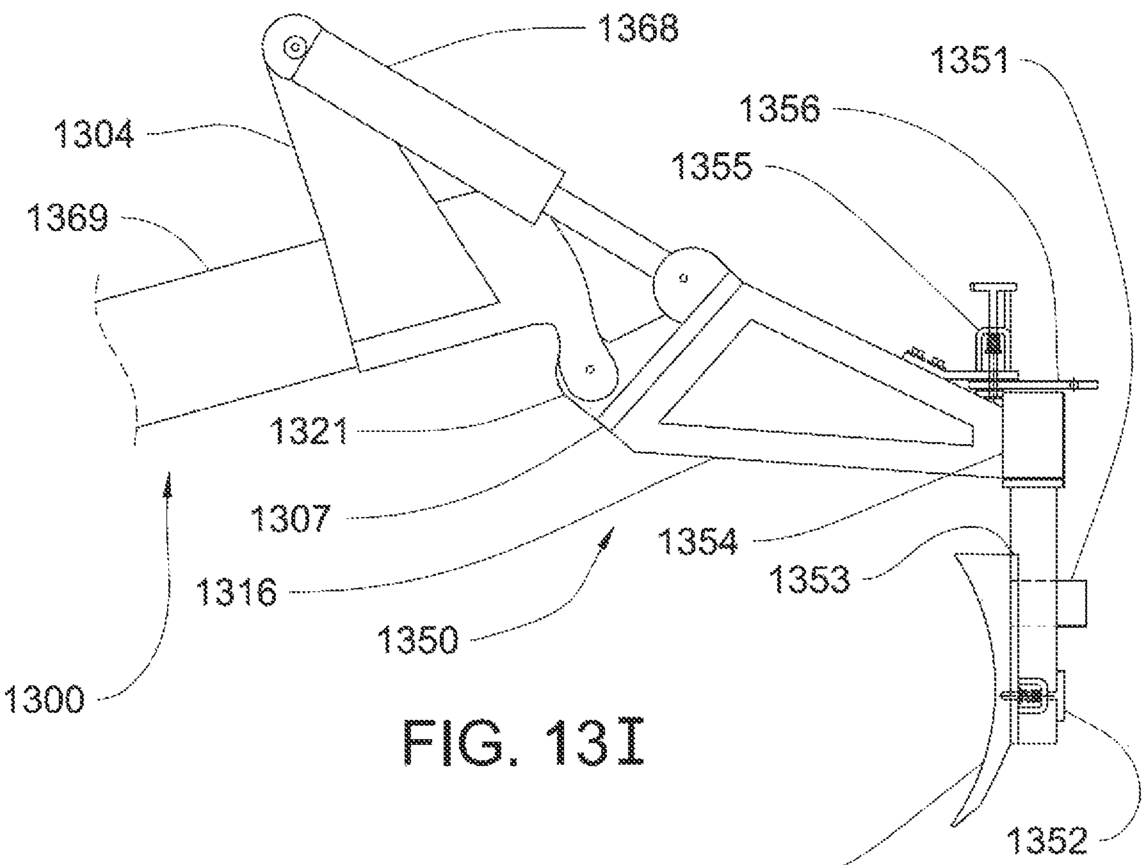
FIG. 13I depicts an exploded side view of a lift attachment apparatus according to an additional alternative embodiment of the present disclosure.
Figure 13J:
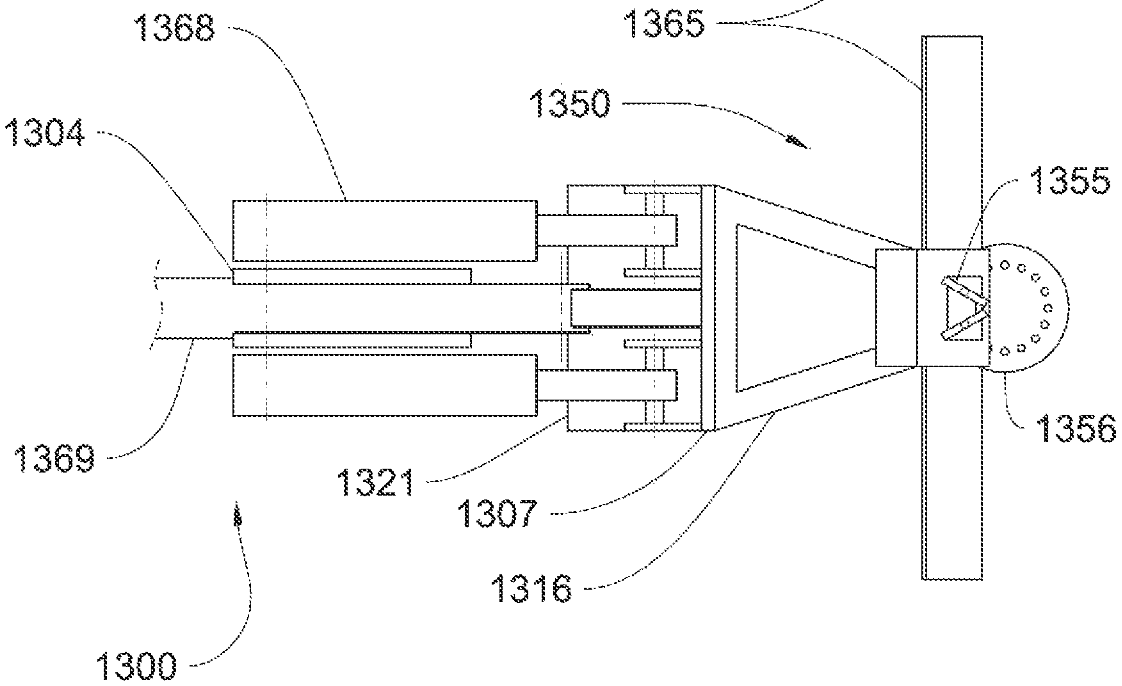
FIGS. 13J-13N and 13P depict detailed exploded views of a lift attachment apparatus according to an additional alternative embodiment of the present disclosure.
Figure 13K:
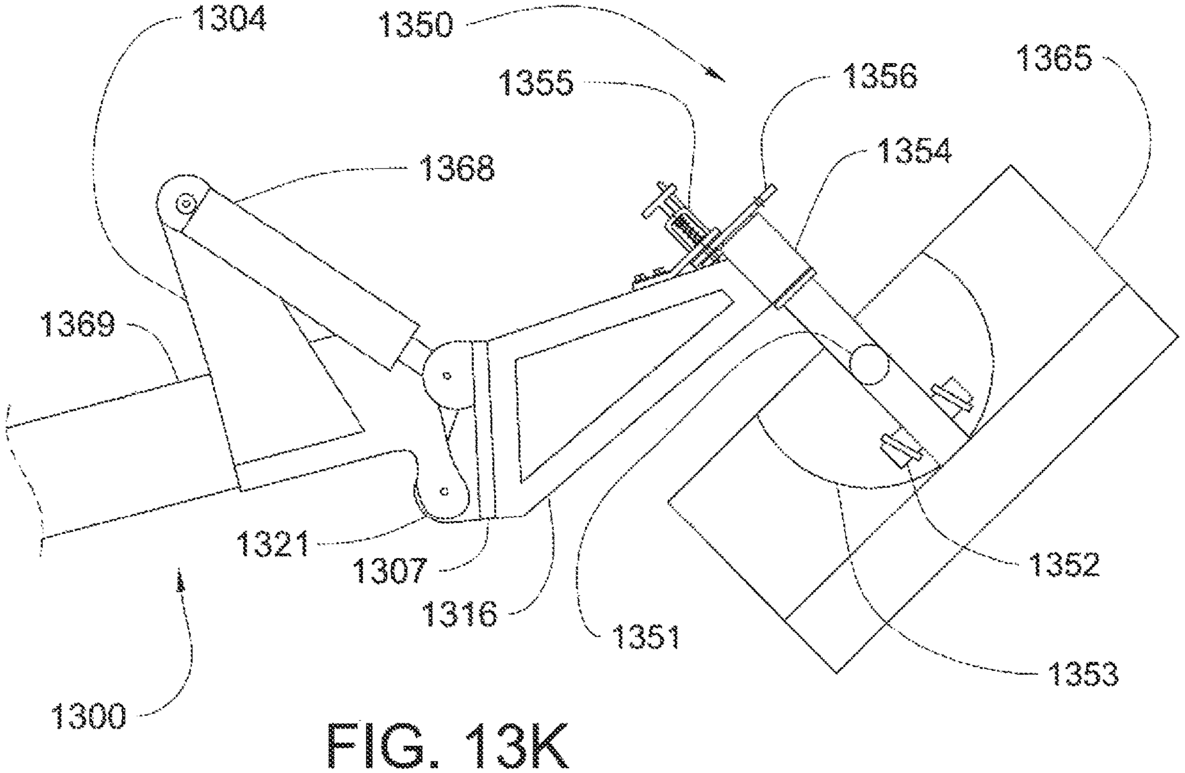
Figure 13L:
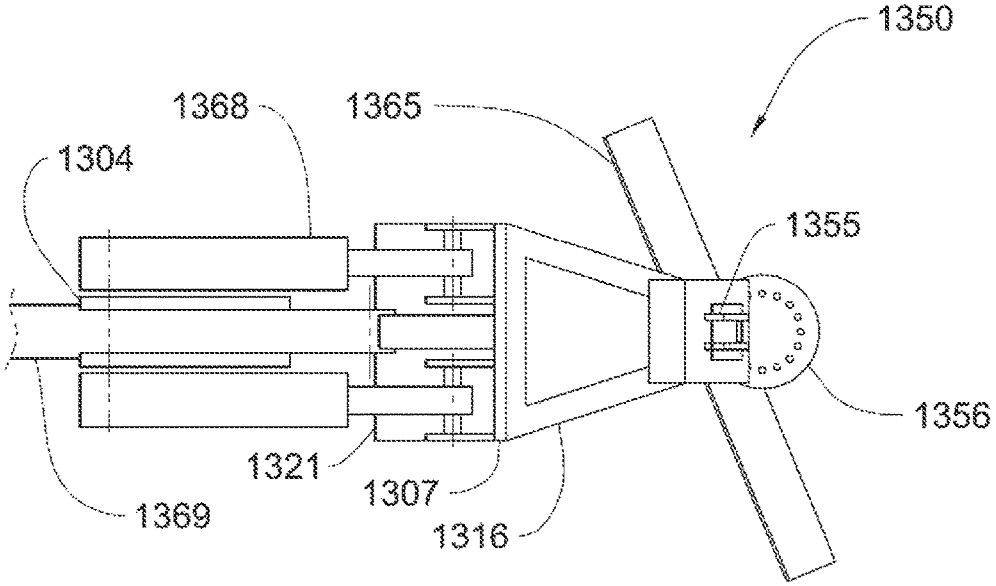
Figure 13M:
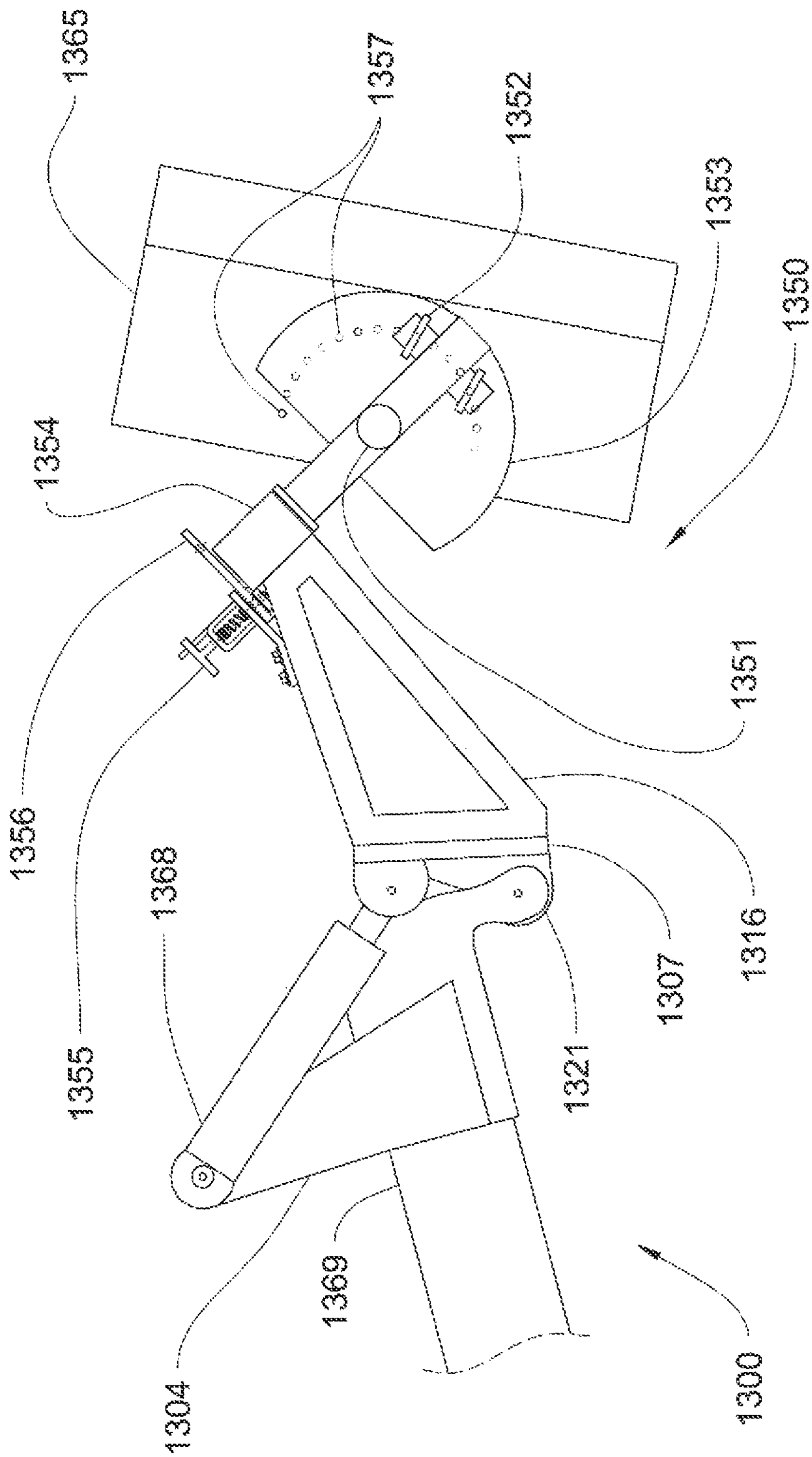
Figure 13N:
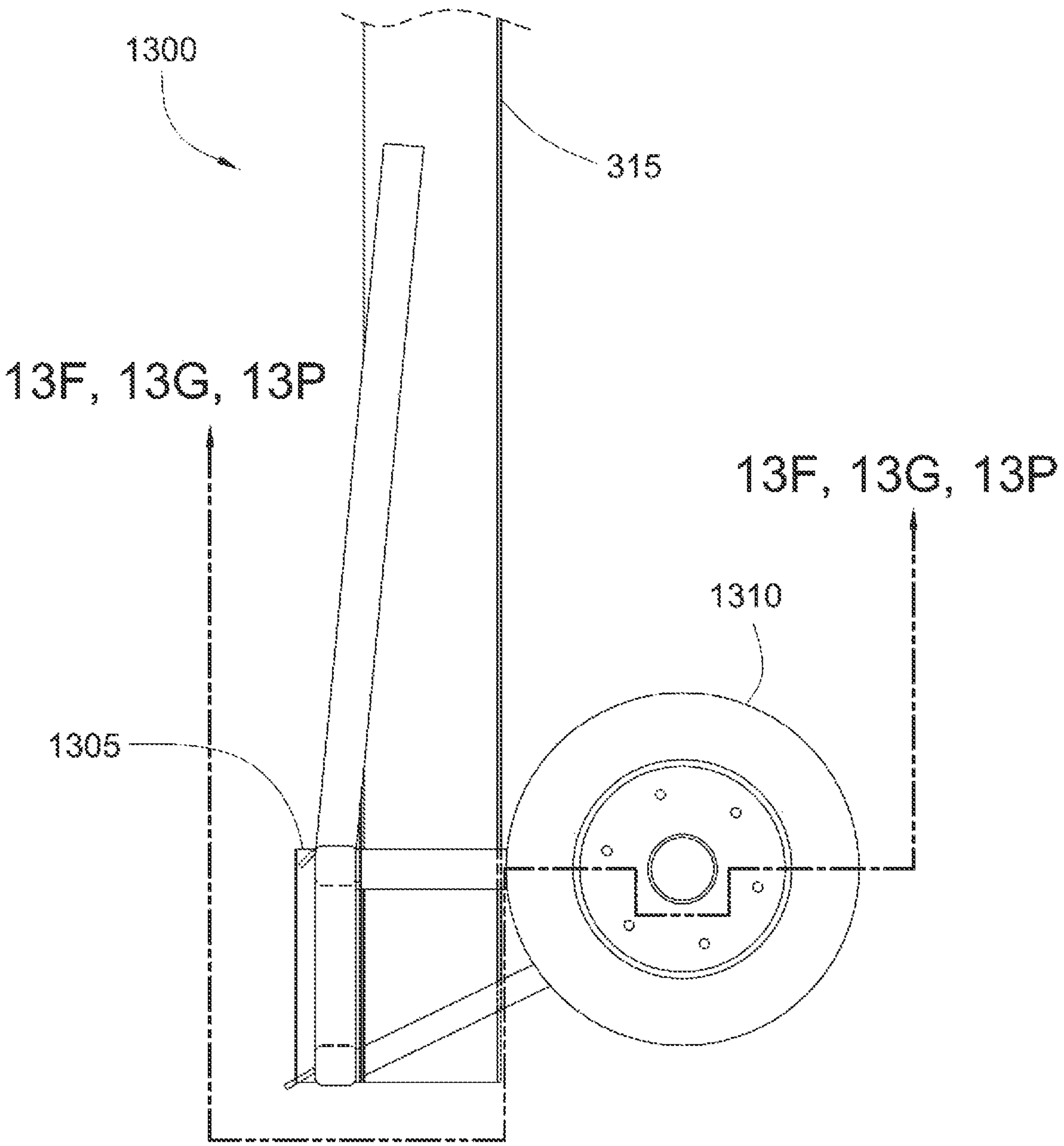
Figure 13P:
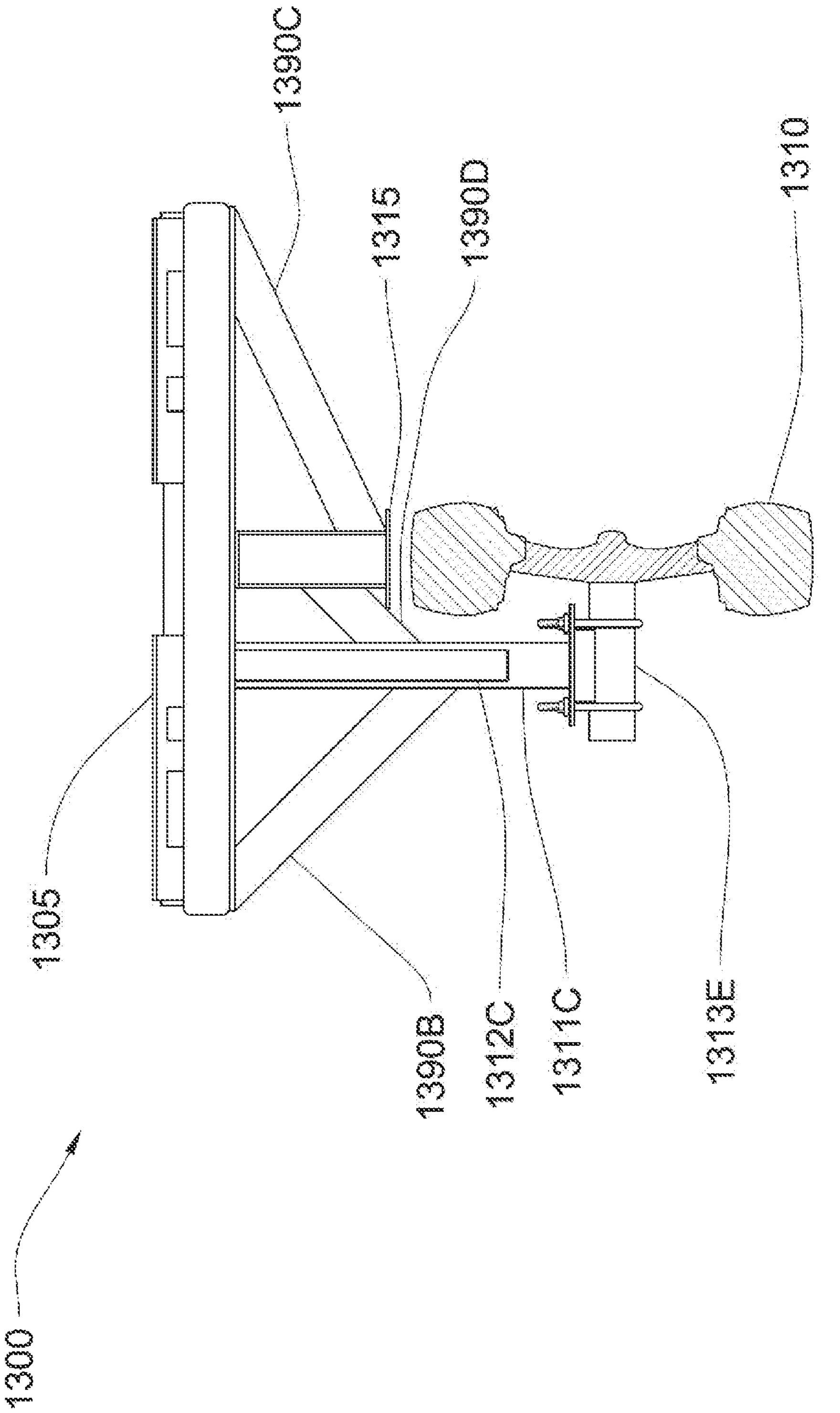

Referring to FIGS. 13F-13P, several different wheel aligning configurations may be employed for different applications. Referring to FIG. 13F, the first wheel may be generally parallel with the second wheel. This configuration may be advantageous for flat driving surfaces where turning and stability is less of an issue than other surfaces and there are intermittent obstructions such as plants or a fire hydrant. It is contemplated that when the use for this attachment is driving straight with parallel wheels it may be advantageous if an individual wants the tires or wheel 1310 to last as long as possible. Referring to FIG. 13G, a first wheel may be coupled to a first axle and a second wheel may be coupled to a second axle, whereby the first axle is connected to a first side of the frame and the second axle is connected to a second side of the frame. It may be advantageous to have the wheels be in a positive camber arrangement at angles $A_9$, $A_{10}$, or $A_{11}$ as shown. This wheel, 1310A-1310D may have a positive camber of 10 degrees as shown or have different angles together all being the same or different. It is common for tractors and other agricultural equipment to have positive camber and this may stiffen the wheel bearings in one direction and facilitate a higher level of slip angle on the tires of wheel 1310 allowing the wheels to be more stable but also allowing the wheels to turn at further ease than with a cambered wheel 1310A-1310B with 0 camber. It is further contemplated that if the wheels 1310 were placed in a negative camber where the wheels were turned out at the bottom that the wheel bearings would stiffen up in one direction but the slip angle of the tire of wheel 1310 may be reduced and make lift attachment apparatus 1300 be driven in a straight line with greater ease. Referring to FIG. 13P, a single wheel may be generally parallel with the boom. This configuration may be advantageous for paved driving surfaces or in a trench where stability is less of an issue than other surfaces and an individual wants the tire or wheel 1310 to fit into or on a space 2 wheels on either side of a frame will not or on extremely rough terrain where an operator may struggle keeping 2 attachment wheels on the ground at all times. It is contemplated that attachment device 1305 may be a quick attachment device in use with various types of attachments to connect with loaders. It is contemplated that a quick attachment device may be a device which allows a user to attach and detach attachments with a connection without difficult assembly and disassembly. Additionally, a quick attachment device may not require specialized tools which may allow for attachment and detachment of attachments in the field. A wheel or pair of wheels 1310 may be coupled to the frame through axle 1313E. It is contemplated that a wheel may be located on the frame, the wheel configured to be maintained in alignment through structured mechanical configuration near parallel to the boom. It is further contemplated that a single wheel be located below the center of the frame, the single wheel configured to be maintained through a structured mechanical configuration in a directly controlled relationship as it relates to alignment to the boom. In an embodiment, the wheel may include a tire. Lift attachment apparatus 1300 may further include a boom 1315 connected to the frame. It is further contemplated that as a single wheel 1310, the wheel's angle may be fixed in relationship to the boom, a set of forks or the loader 1330 and the wheel 1310 be in a state of fixity alignment of direction controlled through articulation, steering as a primary function or held in a tightly regulated angle as it serves for the wheel to be a fulcrum as a use to maintain mechanical advantage in all necessary tipped angles of operation.

Advantageously, it is contemplated that various items (e.g. a load) may be removably coupled to an end of boom 1315 and may be lifted to a desired location. Lift attachment apparatus 1300 according to present disclosure may be configured to be safely rotated from a position near horizontal to the ground (0 to 10 degrees) as shown in FIG. 13A to a near vertical position (near 80 to 90 degrees to a surface up against wheel 1310) as shown in FIG. 13B without risking the load or tipping an attached loader. Attachment device 1305 of the frame may be configured to attach to a tilting plane 1320 of a loader 1330 having a forward facing loader arm 1340. It is contemplated that attachment device 1305 may be permanently fixed or incorporated with tilting plane 1320 according to an alternative embodiment of the present disclosure. Boom 1315 may be generally fixed with the attachment device 1305 of the frame. It is contemplated that control of the boom 1315 is provided by application of force to the attachment device 1305 by the forward facing loader arm 1340 in a downward direction to create lift and rotation of the tilting plane 1320 causing rotation of an end of the boom about the first wheel and the second wheel of the pair of wheels 1310. Tilting plane 1320 may be controlled by a hydraulic cylinder 1345 of loader. It is contemplated that boom 1315 may be configured to be tipped up via application of force to the attachment device 1305 in a downward direction and via reverse action of hydraulic cylinder 1346 of the forward facing loader arm 1340 of the loader 1330. Through reverse action, the hydraulic capacity may be reduced, such as by about 44% for the hydraulic cylinder 1346 of the forward facing loader arms. This reduction in hydraulic capacity may make it difficult to overload the lift attachment apparatus 1300 if the load is being raised. Since the hydraulic capacities of hydraulic cylinders of many loaders are just over their tipping capacity, the reduction in hydraulic capacity may put the apparatus 1300 well below the tipping capacity and higher than the safe operating capacity. Advantageously, hydraulic cylinder 1345 of the loader may not be working in a reverse action and gains support towards lifting loads on the end of the boom with pressure applied to wheel 1310 with the downward action of the loader arms 1340 with the retracting action of hydraulic cylinder 1346. In a standard attachment arrangement without support external of the loader such as a standard bucket, the hydraulic cylinders 1345, 1346 work separately to support the load according to how they are designed to operate. In this arrangement, these hydraulic cylinders 1345, 1346 work together with the support of wheels 1310 which are also carrying the weight of the load. Again referring to FIGS. 13A-13P, it is contemplated this attachment apparatus as described may be exemplary when configured in an arrangement as it relates from back to front parallel with the ground, the ground generally being a horizontal plane, in the following order; a forward facing loader attachment device having its center behind the center base point of an attachment wheel(s) that does not freely swivel in its placement, as to function as a stable fulcrum being behind a loading point(s) where it is advantageous that the center base point of the said wheel(s) not be in the space of the loading point(s) as it relates from the rear to the front of the attachment in all generally functional tipped positions; this configured arrangement having the physical properties of acting as a lever where the attachment device is moved in a vertical direction using the wheel(s) as a fulcrum to move the loading point in a vertical direction.

It is contemplated that a grader blade that could be put on soil slopes or loose material slopes out of the reach of an available loader with forward facing arms in its standard configuration may be advantageous. Those with a loader may not want to use their time, money or other resources in gaining access to much larger and expensive equipment for a provided task their loader cannot reach. Compact, light equipment may be useful to farmers, residential contractors and those with less access to resources, but may also be of advantageous use for road development and maintenance professionals such as highway contractors or government employed maintenance personnel, as smaller equipment can be on any given site in less time and at a lower cost than oversized equipment. It is also contemplated that using equipment that is larger than necessary may disturb the existing surfaces at a greater amount or may require special equipment, licensing or permits to transport on public roads. This may be especially true for parks departments, camp grounds maintenance personnel and for those in the forestry industry that have work that is in areas that eliminate the possibility to make use of large equipment. What may be a set of principles to consider are that the wheel angle of these newer attachments have component aligned steering angles, have component determined wheel track distance, and may have component determined steering alignment affecting wheel angle while wheel cornering force and tire sidewall slip angle may be of interest to mechanically be unable to affect steering alignment. On the contrary, it may be with other attachments with wheels that are behind a load, the steering of those attachments is completely dependent on wheel cornering force and sidewall slip in determining the wheels' angle. With previous embodiments, they essentially may put an attachment's wheels at different, uncontrollable and dangerous angles when driving along the side of a slope, on surfaces with ruts, on surfaces with potholes, when going over an uneven obstacle such as a curb or in windy conditions where the load may be off center causing more pressure to be put on one side. It may be this is such a considerable difference in arrangement and functionality that an operator in the field trained in all the arrangements of loader attachments upon using one of these newer lift attachment apparatuses would quickly realize these differences with little explanation, and recognize and appreciate the advantages.

Lift attachment apparatus 1300 may dig, lift and dump dirt, gravel and other like materials at exemplary heights for those with access to loaders as demonstrated in the aforementioned text and drawings. It is further contemplated the extension rod with carrier hinge 1369 may be turned 180 degrees inside of boom 1315 making it capable of working upside down when compared to side view FIG. 13A & side view FIG. 13H. It is contemplated that boom 1315 or any other boom described in this application could be more than one boom or in multiple configurations. It is also further contemplated that a grader blade 1365 may move soil, snow or other soft or workable material in different, desirable ways. Although a combination bucket may be useful on the end of lift attachment apparatus 1300 that would split from a bucket to a bulldozer style blade (with or without hydraulics), a bucket of this nature may be too heavy or have a lack of manipulation by the operator of the loader. Referring to FIGS. 13H-13N and 13P, a lift attachment apparatus 1300 that further includes an adjustable grader blade assembly 1350 may grade with a better quality and efficiency than bucket 1367 shown in FIGS. 13A-13E or that of a similar shaped splitting combination bucket. A lift attachment apparatus 1300 with boom 1315 may further include extension rod with carrier hinge 1369 that may extend out of boom 1315 and connect to lift attachment apparatus 1300 with a hinge pin to attach to grader attachment device 1307 on jib frame 1316. This configuration may increase the height capacity and range of the lift apparatus 1300 to exemplary distances to grade soil and the like such as shown extended 21' from the loader in FIG. 13H, but may be able to reach higher if tipped up with the loader or downhill at further distance out if tipped down from the position shown in this example. The side view of FIG. 13H may demonstrate how the soil represented with the solid spline may be manipulated to grade the soil down to the profile represented with the dark dashed spline with attachment apparatus 1300, where loader 1330 may not have access to perform the work in this shown example with a standard factory bucket or any other currently available attachment. Loader 1330 using lift attachment apparatus 1300 may move dirt leaving a smooth surface by moving in a rearward direction while lowering the wheel 1310 keeping contact with the ground with loader arm 1340 using hydraulic cylinder 1346 and tipping down the tipping plane 1320 of the loader using hydraulic cylinder 1345 to maintain grader blade 1365 against the surface at a pressure of an appropriate level. The boom 1315 of the attachment may have a hollow interior or have a hinge on the end to pull extension rod with carrier hinge 1369 in towards the operator using hydraulic or electric power to bring grader blade 1365 down the slope without moving the wheels of loader 1330. Jib frame 1316 may be rotated down when attached with grader blade attachment 1307 to boom attachment apparatus 1321 by the extraction of hydraulic cylinder 1368 against mast 1304 with pins. The rotation of jib frame 1316 may cause grader blade 1365 to be pressed against the soil in an advantageous manner as it is dragged. Grader blade 1365 may be oscillated around bearing 1351 from the position shown on exploded side view FIG. 13K and be set in place into the position shown on exploded side view FIG. 13M by means of the setting pin 1352 with a handle, spring cage and stop washer being set in holes 1357 in back plate 1353 to slope the soil from left to right as seen from an operator's perspective if at bearing 1354 the blade was in a rotation as shown on FIG. 13H, 13J or 13L. Grader blade 1365 may be pivoted to a desired angle to push or pull dirt to one or both sides by turning it on bearing 1354 after pulling out pin 1355 as shown on exploded side view FIG. 13I and exploded top view FIG. 13J. The angle of the blade 1365 may turned as shown on exploded top view FIG. 13L and be set by inserting set pin 1355 into blade angle selector dial 1356 as shown in FIGS. 13K-13M. It is further contemplated the movement and setting of these parts may be manually done by hand or configured to work with hydraulic, electric or another powered source. The quantity of pins and bearings may be added or removed as is necessary for optimal operation. Once the blade is turned so the concave side is facing in an outwardly direction from the loader it is contemplated that grader blade 1365 may be pushed with the loader 1330 or the means by which extension rod with carrier hinge 1369 is pushed out of hollow boom 1315. It is further contemplated that extension rod with carrier hinge 1369 may be mechanically moved in or out by a variety of use of power sources and drive sources and channeled in a variety of ways. The configurations of hoses, cords, cables, chains, gears, teeth, belts, pulleys, screw drives, motors, pumps, tracks, channels, raceways and bearings may be internal or external all being in a configuration to be determined by the conditions the end user of this device may require. It is contemplated that in this arrangement, that the wheels 1310 are fixed in their alignment, being stable, and may continually act as a functional fulcrum in moving a load.

Referring to FIGS. 14A-14L, a lift attachment apparatus 1400 according to an additional alternative embodiment of the present disclosure is shown. Lift attachment apparatus 1400 may be configured as a boom attachment for a loader. Lift attachment apparatus 1400 may include an attachment device 1405. Attachment device 1405 may be configured to attach to a tilting plane of a loader. It is contemplated that attachment device 1405 may be a quick attachment device in use with various types of attachments to connect with loaders with forward facing loader arms. Lift attachment apparatus 1400 may include a boom 1415 having a loading point at the end which may include at least one flange being a loading point(s) for a beam trolley being a loading point. Additionally, lift attachment apparatus 1400 may include a hydraulic cylinder 1455 shown on side view FIG. 14B & exploded side view FIG. 14D to control steering of the lift attachment apparatus 1400. It is contemplated that the lift attachment apparatus 1400 may utilize at least one auxiliary hydraulic controller of the loader 1430 to control operation of the at least one hydraulic cylinder 1455 for steering. It is contemplated that the lift attachment apparatus 1400 may utilize at least one auxiliary hydraulic or electric controller of the loader to control operation of the at least one hydraulic cylinder for the operation of steering or at least one actuated device activated by the operator which may be a single acting hydraulic cylinder, a double acting hydraulic cylinder, gears, chains or in combination, and may be powered by electrical power. Additionally if there be two hydraulic cylinders 1455 and they have the base side facing the loader 1430 as shown on FIG. 14D and like that on FIGS. 8S-8T & 10G-10H, the cylinders may advantageously have hydraulic binding when not activated because of the difference in effective cross-sectional bore area between the base side and rod side of the cylinder. It is contemplated that a brake may be added to lock in the steering as necessary to keep the steering from wandering from any and all attachment configurations within this document. It is contemplated that force applied by at least one forward facing loader arm in a downward motion along with upward lift of a tipping mechanism of the loader 1430 may cause force that creates upward leverage with the wheels of the lift attachment apparatus 1400. Lift attachment apparatus 1400 may be configured to increase safe operating capacity far beyond a tipping capacity of a loader using the loader's arms with the tipping function.

Lift attachment apparatus 1400 may not include wheels centered on the load which may cause the load to bob back and forth while in motion at an amount determined by the play in the lifting components of the loader. Lift attachment apparatus 1400 may include brakes. It is contemplated that when in the upright position the tipping capacity of lift attachment apparatus 1400 may be 90,000 lbs. as shown at a loading point W2 on side view FIG. 14C with exploded side views with a load held out at 9' from the center of the attachment wheels 1410, being dual wheels with loader 1430, which may be a Caterpillar 966H Wheel Loader. Other loaders may be suitable to carry such a load in proportion to their weight and size if they are of a similar specification of those of loader 1430 as previously described. Wheels of the attachment 1400 may be mounted in a forward location of the moving parts of the attachment steering components but may be behind the majority of the boom when in any position. It is further contemplated that it may be the case that with a boom, as opposed to a set of forks like shown on FIG. 8X, where the load is closer to the loader and the attachment has to be tilted more than a set of forks for functional operation, that a boom attachment with oscillation may require for the wheels of the attachment 1400 may be mounted in a forward location of the moving parts of the attachment steering components and the base of the boom. It is further contemplated 3 or more wheels may be on each side of attachment apparatus 1400 and an outrigger as necessary for additional stability. It is further contemplated that all configurations as shown on FIGS. 1A-14M may include an outrigger or multiple outriggers as necessary for additional stability.

Figure 14A:
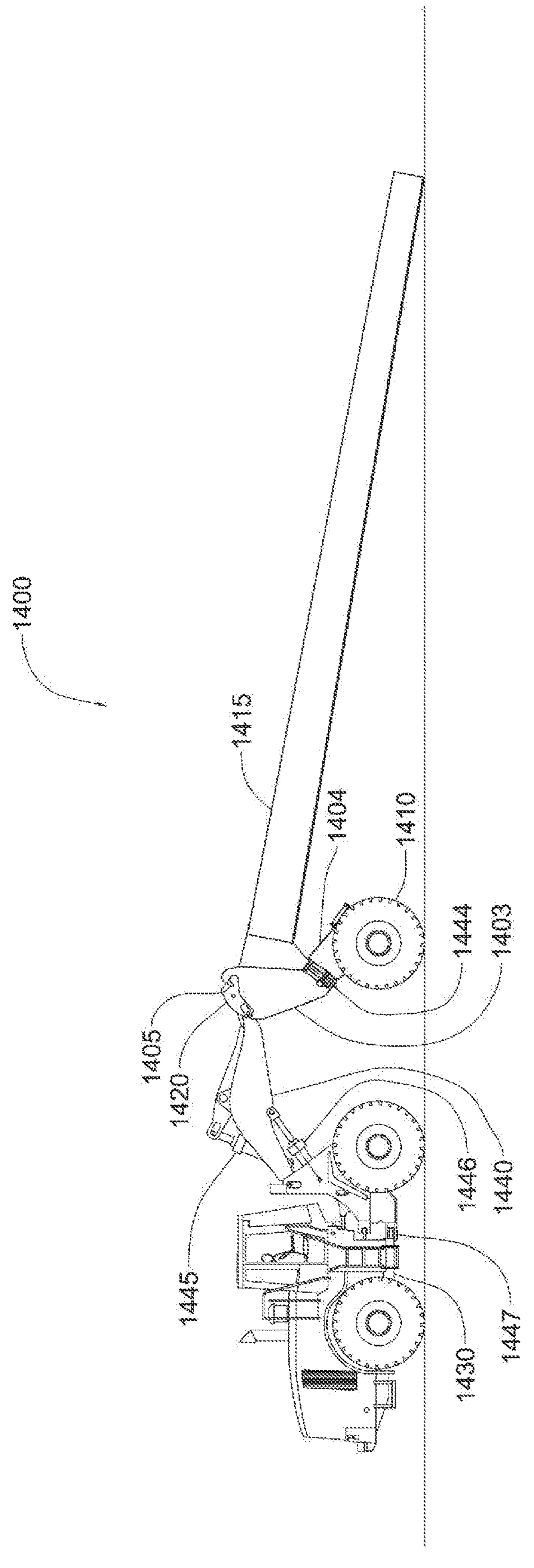
FIGS. 14A-14B depict side views of a lift attachment apparatus according to an additional alternative embodiment of the present disclosure.
Figure 14B:
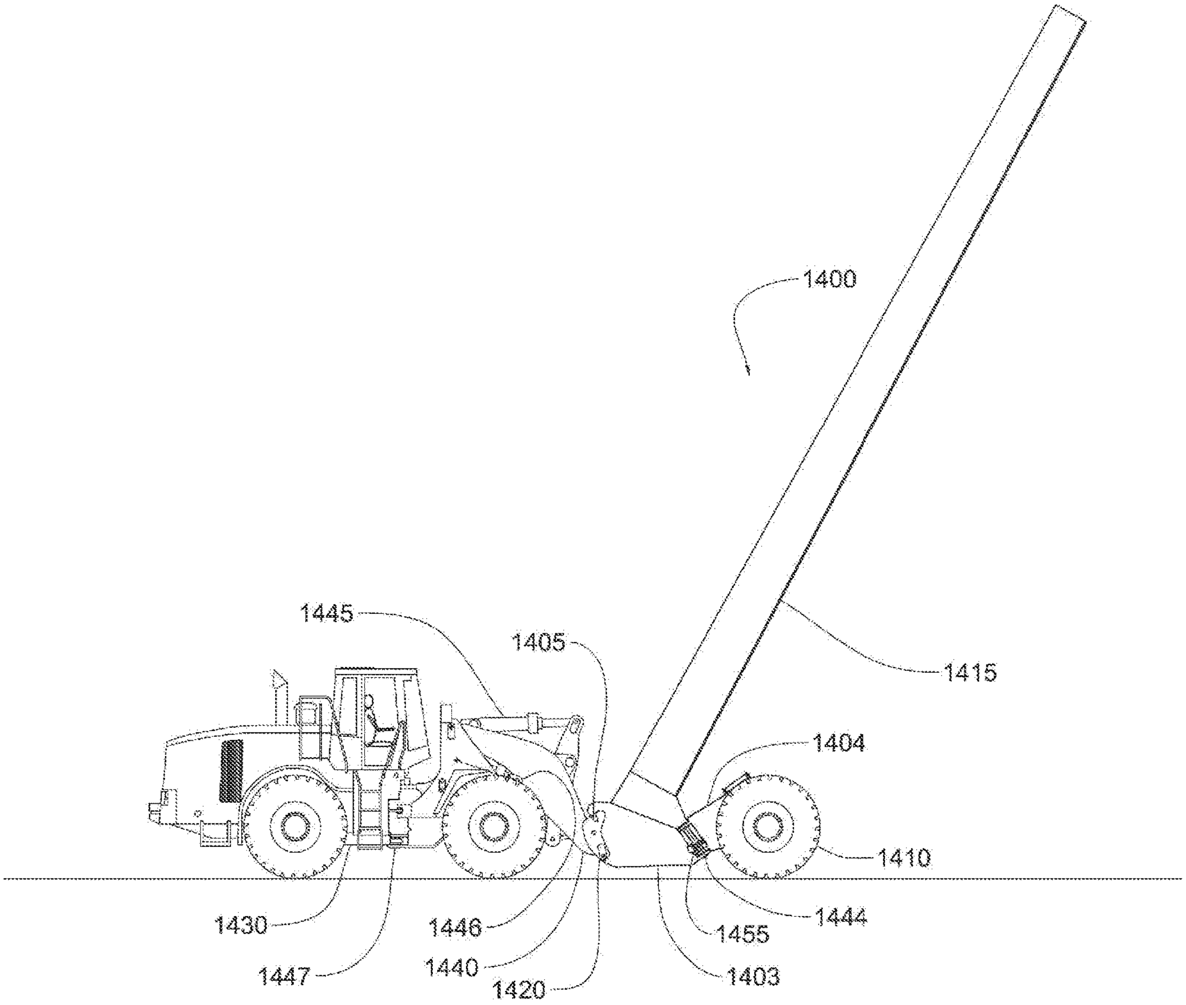
Figure 14C:
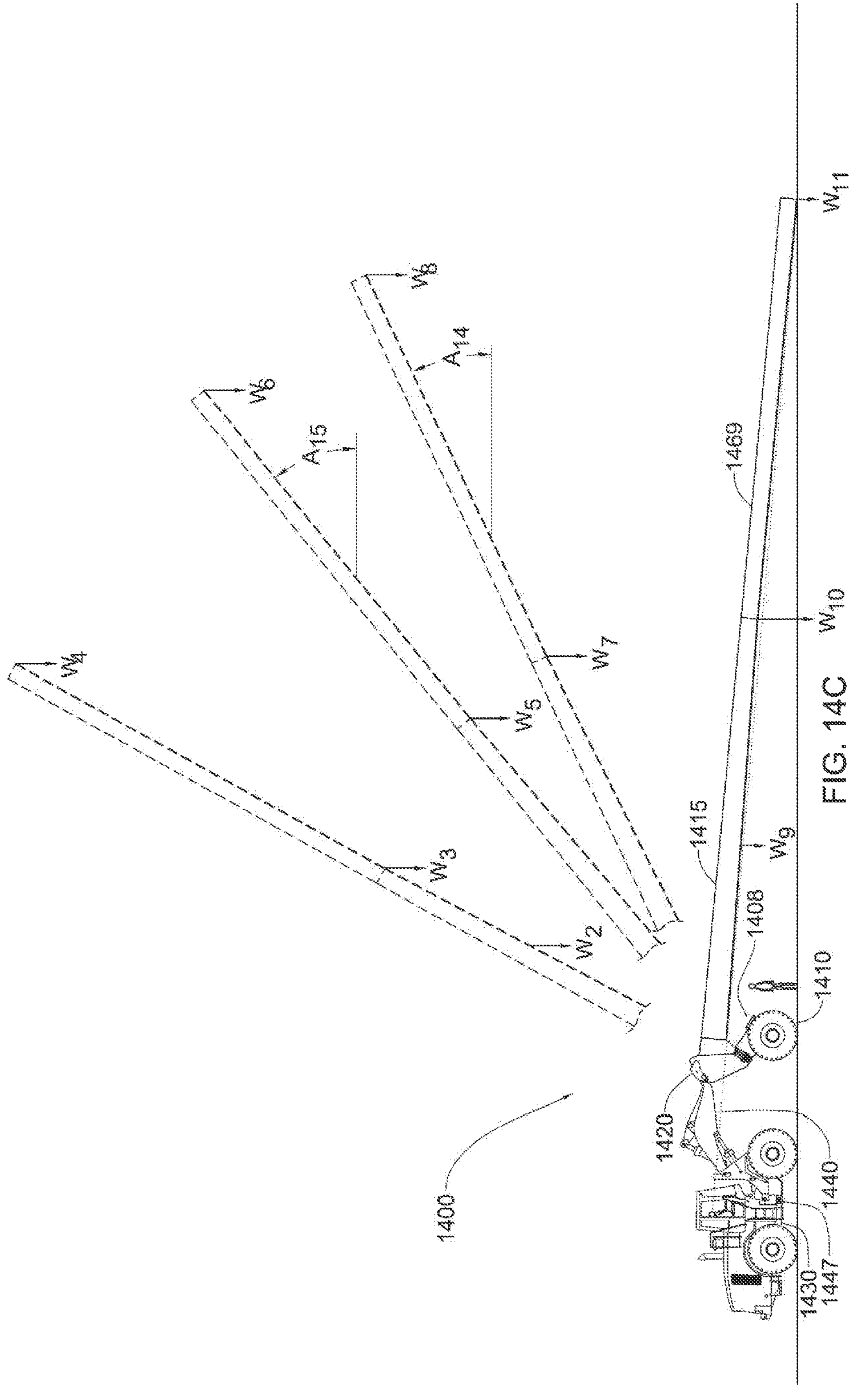
FIG. 14C depict exemplary angles and scale of a lift attachment apparatus which further includes an additional extension rod according to an additional alternative embodiment of the present disclosure.
Figure 14D:
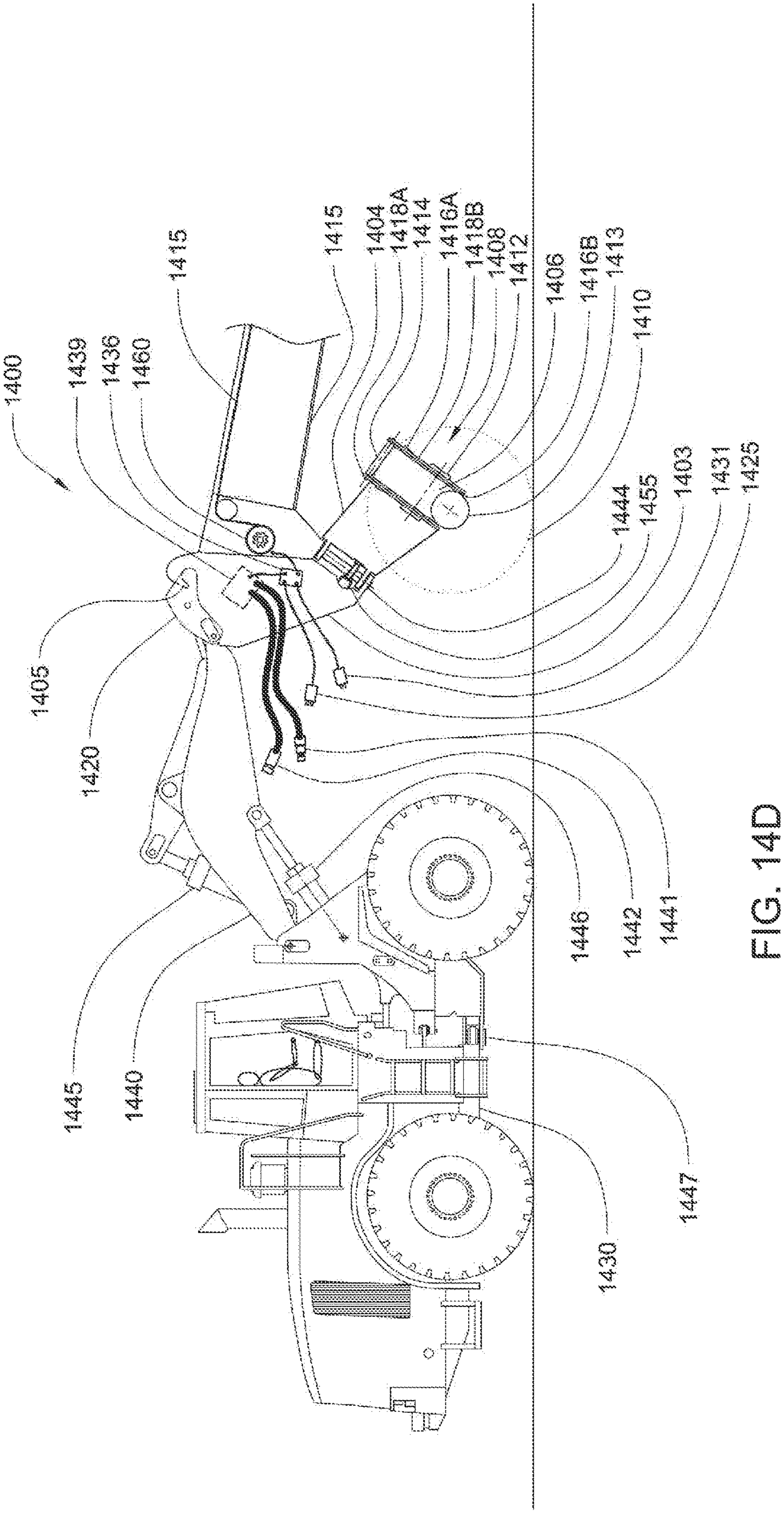
FIG. 14D-14E depict detailed exploded views of a lift attachment apparatus according to an additional alternative embodiment of the present disclosure.

Referring to side view FIGS. 14A & 14D, it is contemplated that lift apparatus 1400 may be configured as a boom attachment for a loader. Lift apparatus 1400 may include an attachment device 1405. Attachment device 1405 may be configured to attach to a tilting plane 1420 of a loader 1430. It is contemplated that attachment device 1405 may be a quick attachment device in use with various types of attachments to connect with loaders. It is contemplated that a quick attachment device may be a device which allows a user to attach and detach attachments with a connection without difficult assembly and disassembly such as a Caterpillar Fusion Coupler System. Additionally, a quick attachment device may not require specialized tools which may allow for attachment and detachment of attachments in the field. A set of wheels 1410 may be coupled to axle 1413 as shown on FIG. 14D, exploded front view FIG. 14E & three-dimensional views of FIGS. 14H-14L to the front frame 1404 through a rocking hub carrier assembly coupler 1408 consisting of an axle oscillation hub 1406 connected to oscillation hub mount 1418. It is contemplated that a first wheel of the pair of wheels may be located on a first side of the frame 1404 and a second wheel of the pair of wheels may be located on a second side of the frame 1404, the first wheel configured to be maintained parallel to the second wheel. It is further contemplated as shown on FIGS. 14E-14F & 14H-14L that two wheels 1410 may be on each side of the axle 1413 for advantageous capacity and stability. This set of wheels may be in a row parallel to each set in every way or may be configured to be cambered or turned from each other in a rigid body or in a fashion that can be consistently forcibly maintained by the use of the loader's controls or controls within the cab of the loader. In an embodiment, each wheel may include a tire. Apparatus 1400 may further include a boom 1415 connected to the frame 1403 as shown in FIGS. 14A-14B, 14D-14E, exploded top view FIG. 14F & side view FIG. 14G. It may be a benefit that from a plan view as shown in FIG. 14F, boom 1415 as configured stays in line with the front frame 1404 and loader arms 1440 rather than turned with the rear of loader 1430 or the operators cabin the as shown in FIGS. 14A & 14F. It is contemplated that in an alternative embodiment that boom 1415 may be attached to the front of oscillation hub mount 1418B.

Advantageously, it is contemplated that various items (e.g. a load) may be removably coupled to an end of boom 1415 or lift attachment apparatus extension rod 1469 and may be lifted to a desired location. It is further contemplated that lift attachment apparatus extension rod 1469 may be made to fit inside of boom 1415 so it may be telescopically extended out to a desired distance or may be several 1469 extension rods within each other projecting out in tiers so further reach may be possible or that boom 1415 may be of a shorter length with lift attachment apparatus having the same overall reach. It is further contemplated that extension rod 1469 may be constructed of steel, and may be tubular in nature. However, extension rod 1469 may be formed of various cross section shapes such as rectangular, round, triangle or an arch. Extension rod 1469 may be constructed as a skeletal body. Extension rod 1469 may be constructed of other materials instead of or in addition to steel, including aluminum, wood, plastic, carbon fiber, composites thereof and the like. Extension rod 1469 may be connected to boom 1415 in a variety of ways with straight connectors or connectors of different angles as described in previously disclosed arrangements of other configurations of this device within this and other corresponding applications. Lift attachment apparatus 1400 according to present disclosure may be configured to be safely rotated from a horizontal position resting on a flat plane as shown in FIG. 14A to an upright position as shown in FIGS. 14B & 14F-14G without risking the load or tipping an attached loader with various angles shown on FIG. 14C. FIG. 14C may show the capacities at various angles of boom 1415 with the tipping capacity based on the full turn of loader 1430 as shown on FIG. 14F being 37 degrees. Those tipping capacities with the boom weight on FIG. 14C in values of "K" being equivalent to increments to 1,000 lbs. may at loading point(s) $W_2$ be 90K, at $W_3$ be 46K and at $W_4$ be 20K when in the upright position. In the same scenario, but with the angle position of boom 1415 at $A_{15}$ being 40 degrees from a plane parallel with the bottom of the loader's wheels, the tipping capacity may at $W_5$ be 27K and at We be 13K. In the same scenario, but with the angle position of boom 1415 at $A_{14}$ being 25 degrees from a plane parallel with the bottom of the loader's wheels, the tipping capacity may at $W_7$ be 22K and at $W_8$ be 10K. In the same scenario, but with the angle position of boom 1415 at $A_{15}$ being lowered down to touching a plane parallel with the bottom of the loader's wheels when extension rod 1469 is attached, the tipping capacity may at $W_9$ be 35K, at $W_{10}$ be 16K and at $W_{11}$ be 8K. It is contemplated that actual capacity will be less than these ratings when the boom weight is not included and the hydraulic capacity is factored in rather than tipping capacity. As previously described within this application, this difference may make the loader 1430 and lift attachment apparatus difficult to tip over in a forward direction, which may be an advantageously safer arrangement than a loader in a standard configuration.

Referring to FIGS. 14A-14B & 14D-14F, Attachment device 1405 of frame may be configured to attach to a tilting plane 1420 of a loader 1430 having a forward facing loader arm 1440. It is contemplated that attachment device 1405 may be permanently fixed or incorporated with tilting plane 1420 according to an alternative embodiment of the present disclosure. Boom 1415 may be generally fixed with the attachment device 1405 of the frame. It is contemplated that control of the boom 1415 is provided by application of force to the attachment device 1405 by the forward facing loader arm 1440 in a downward direction to create lift and rotation of the tilting plane 1420 causing rotation of an end of the boom about the first wheel and the second wheel of the pair of wheels 1410. Tilting plane 1420 may be controlled by a hydraulic cylinder 1445 of loader. It is contemplated that boom 1415 may be configured to be tipped up via application of force to the attachment device 1405 in a downward direction and via reverse action of hydraulic cylinder 1446 of the forward facing loader arm 1440 of the loader 1430. Through reverse action, the hydraulic capacity may be reduced, such as by about 30% for the hydraulic cylinder 1446 of the forward facing loader arm. This reduction in hydraulic capacity may make it difficult to overload the apparatus 1400 attachment if the load is being raised. Since the hydraulic capacities of hydraulic cylinders of many loaders are marginally over their tipping capacity, the reduction in hydraulic capacity may put the apparatus well below the tipping capacity and higher than the safe operating capacity all while not adding additional wear to the loader.

Referring to FIGS. 14A-14G & 141-14L, boom 1415 is configured as a long rod or pole. It is contemplated that boom 1415 may include a trolley beam such as shown on FIGS. 10J-10K riding on flange plane 995 being a loading point(s). The trolley beam may be configured to accept a number of trolley devices of different use and means of connections. It is contemplated there may be redundant contact points, trolley directing devices, trolley channel devices, trolley driving devices and trolley restricting devices. Boom 1415 may also include one or more of an aperture, hook, connectors and the like to allow coupling to material for transport. It is contemplated that boom 1415 may be constructed of steel, and may be tubular in nature. However, boom 1415 may be formed of various cross section shapes such as rectangular, round, triangle or an arch. Boom 1415 may be constructed as a skeletal body. Boom 1415 may be constructed of other materials instead of or in addition to steel, including aluminum, wood, plastic, carbon fiber, composites thereof and the like.

Loader 1430 may include any type and size of loader. Loader 1430 may be a heavy wheel loader, track skid loader, skid steer loader, all wheel steer loader, wheel loader, teleskid, boom loader, crawler loader or a front end loader. While loader 1430 is described with a single forward facing loader arm 1440, it is contemplated that two or more forward facing loader arms may be employed by a loader 1430 without departing from the scope and intent of the present disclosure. It is further contemplated the loader 1430 or other loaders within this document may be a telehandler, compact articulated loader or a MOOREND style 4-Track Articulated Telehandler and with any of the configurations of lift attachment apparatuses within this document they may have tracks in lieu of wheels causing rotation of an end of the loading side of the attachment about a rotary mounting position of the track system to the attachment.

Figure 14E:
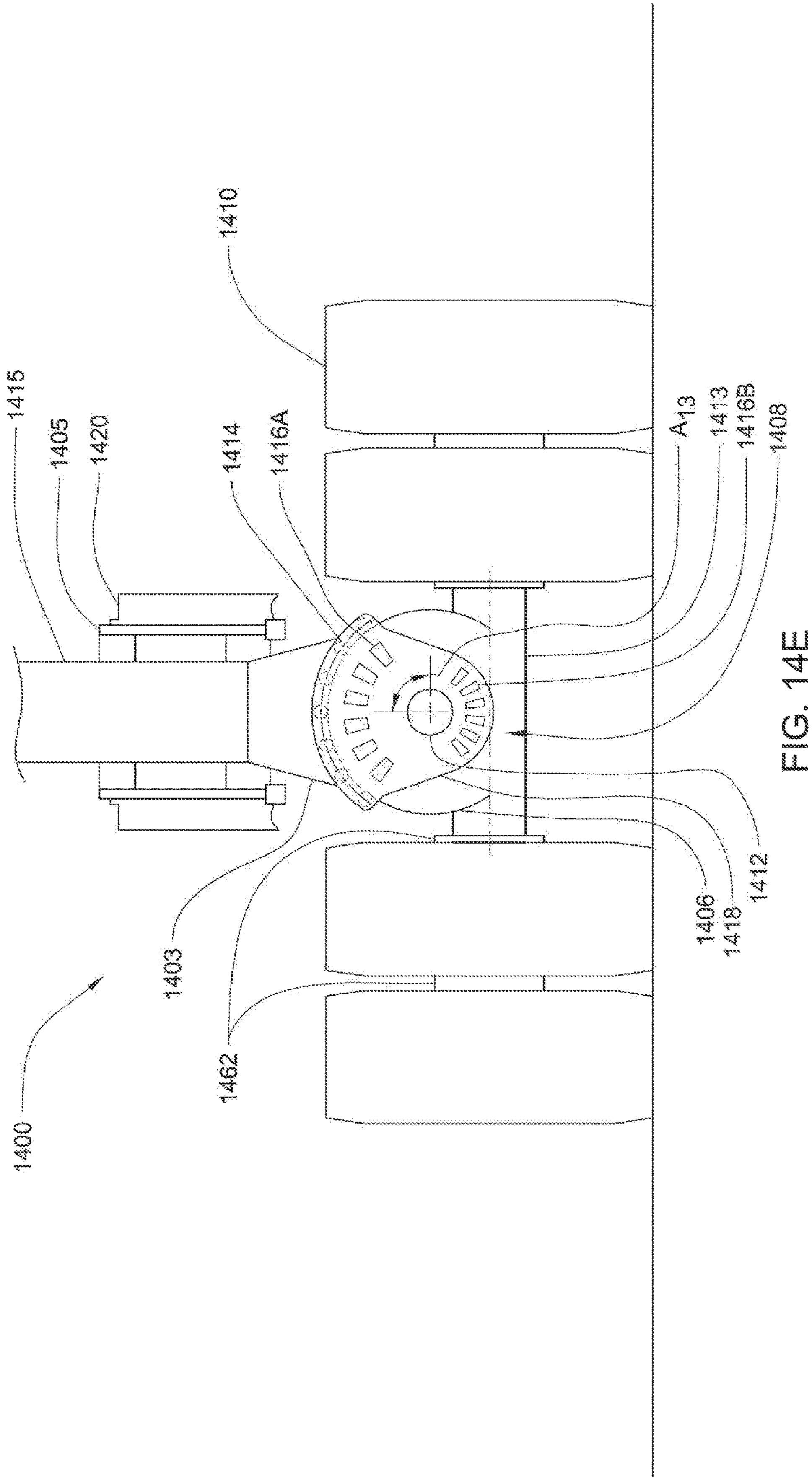
Figure 14F:
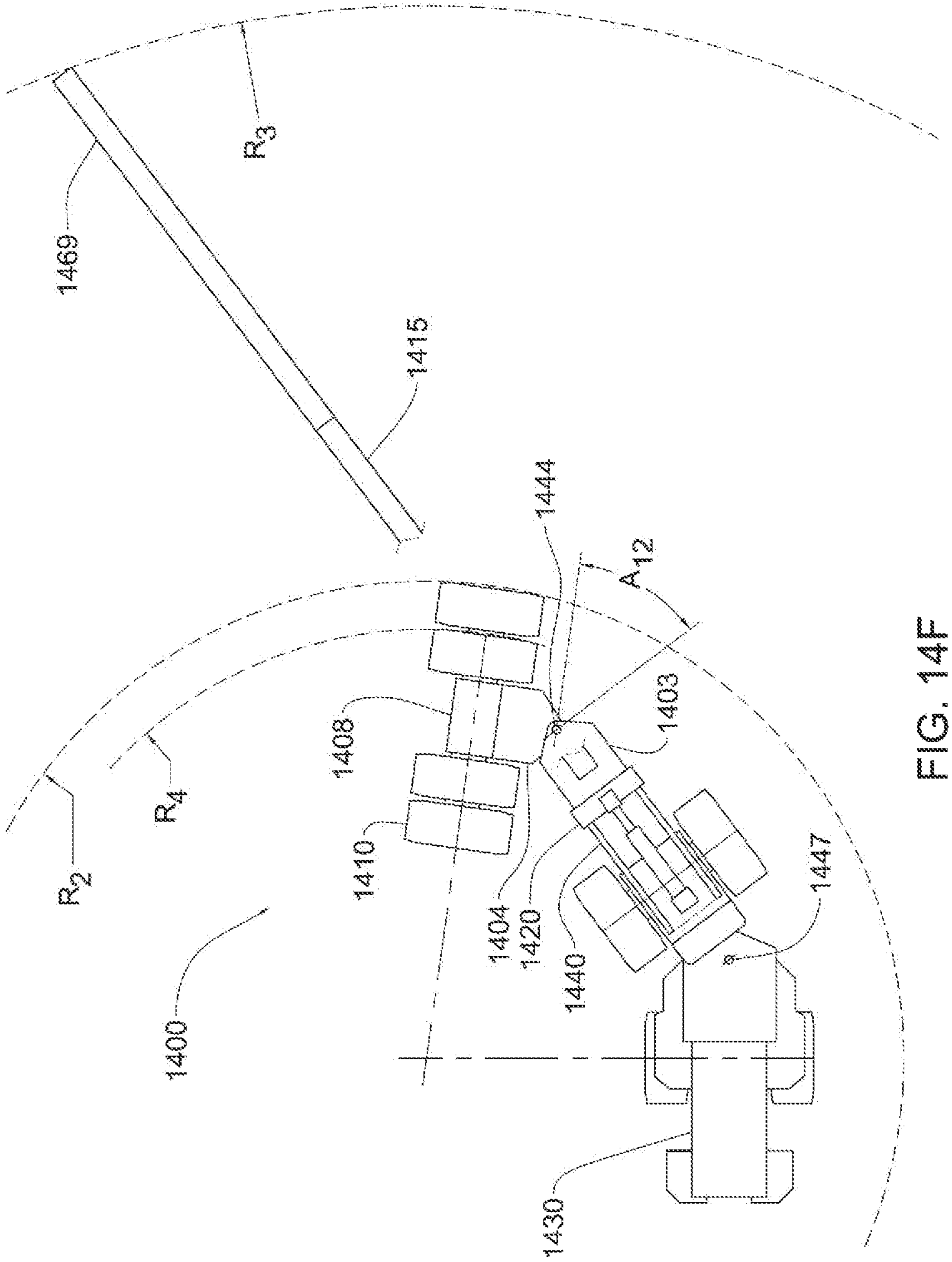
FIG. 14F depicts an exploded top view of a lift attachment apparatus according to an additional alternative embodiment of the present disclosure.
Figure 14G:
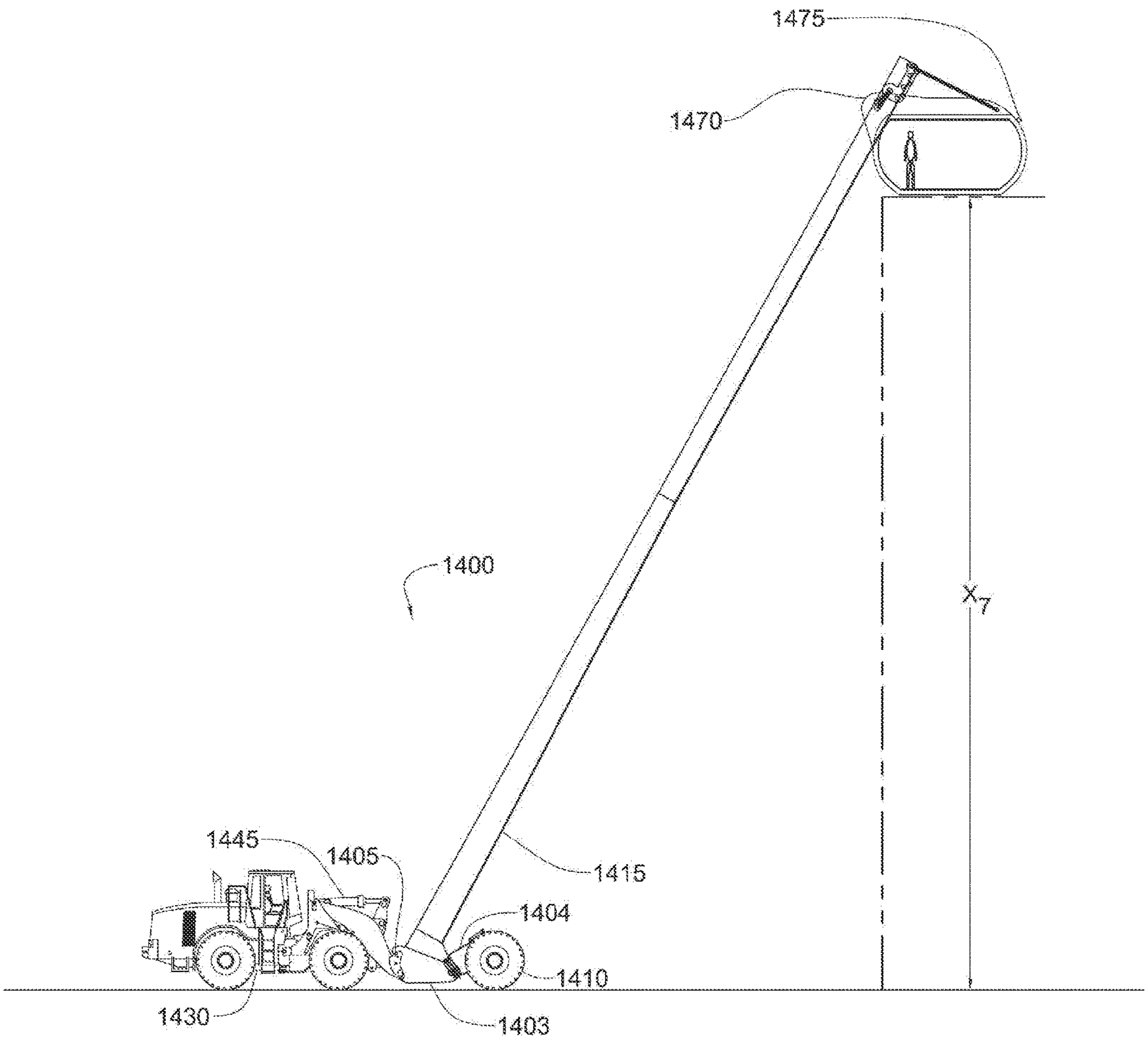
FIG. 14G depicts an exemplary side view of a lift attachment apparatus with a trolley car according to an additional alternative embodiment of the present disclosure.

Referring to FIG. 14D, an exploded side view of lift attachment apparatus 1400 and FIG. 14E, an exploded front view of a lift attachment apparatus 1400 in accordance with an embodiment of the present disclosure is shown. It is contemplated that a pair of wheels 1410 represented by a dotted line in FIG. 14D may be coupled to the frame via an axle 1413 through a rocking hub carrier assembly coupler 1408 consisting of an axle oscillation hub 1406 between oscillation hub mounts 1418A and 1418B. The frame may also include a hinge point for steering 1444 to hinge much like the loader hinge point 1447 of the loader 1430 as shown on FIGS. 14A-14D, 14F, 14I & 14K-14L. Referring to FIG. 14F, it is contemplated when attachment apparatus 1400 front frame 1404 (being the side of the frame the attachment wheels are on) is articulated around the rear frame 1403 (being the side the attachment device is on) at pin 1444 (being the articulation hinge pin of the attachment), the wheels 1410 will stay in the same base plane as the loader 1430 when on a continuous plane, even if hydraulic cylinder 1445 or hydraulic cylinder 1446 shown on FIGS. 14A-14B is used to rotate boom 1415 up or down from the position of an $A_{15}$ value as shown on FIG. 14C and on the mid-upright exploded front view of FIG. 14E to the position on FIG. 14A or FIG. 14B. Upon any oscillation of the axle 1413 out of a parallel with frame 1403 and 1404 it is contemplated that the boom 1415 will maintain optimal stability when it is tipped up or down from a plane at the base of the loader's 1430 wheels or when the attachment frames of 1403 & 1404 are articulated from 0 degrees shown on FIG. 14I to a value of $A_{12}$ degrees of 45 degrees as shown on FIG. 14F provided that all of the wheels are making contact with a stable, relatively flat surface.

Figure 14H:
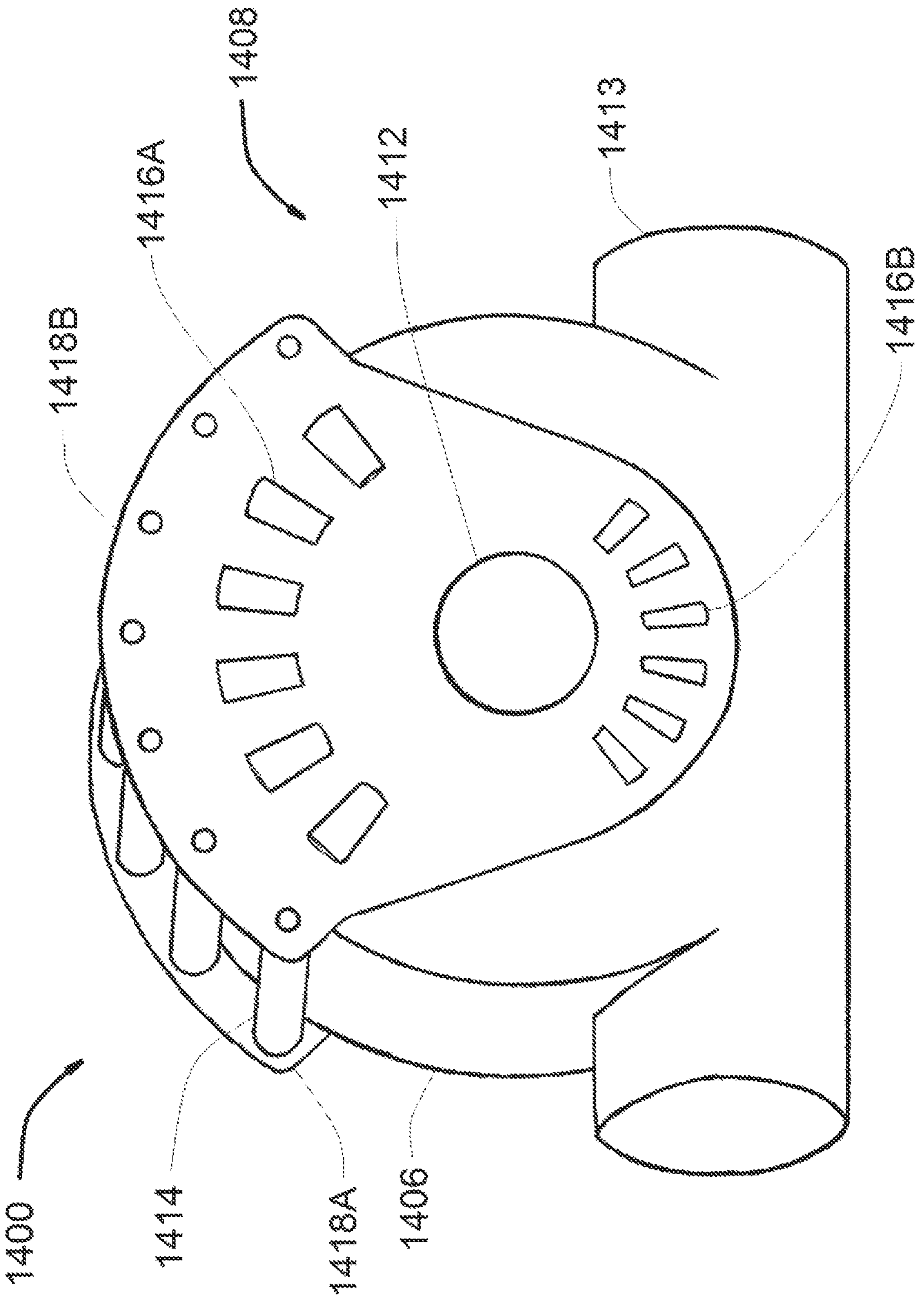
FIG. 14H-L depict detailed exploded three-dimensional views of a lift attachment apparatus according to an additional alternative embodiment of the present disclosure.
Figure 14I:
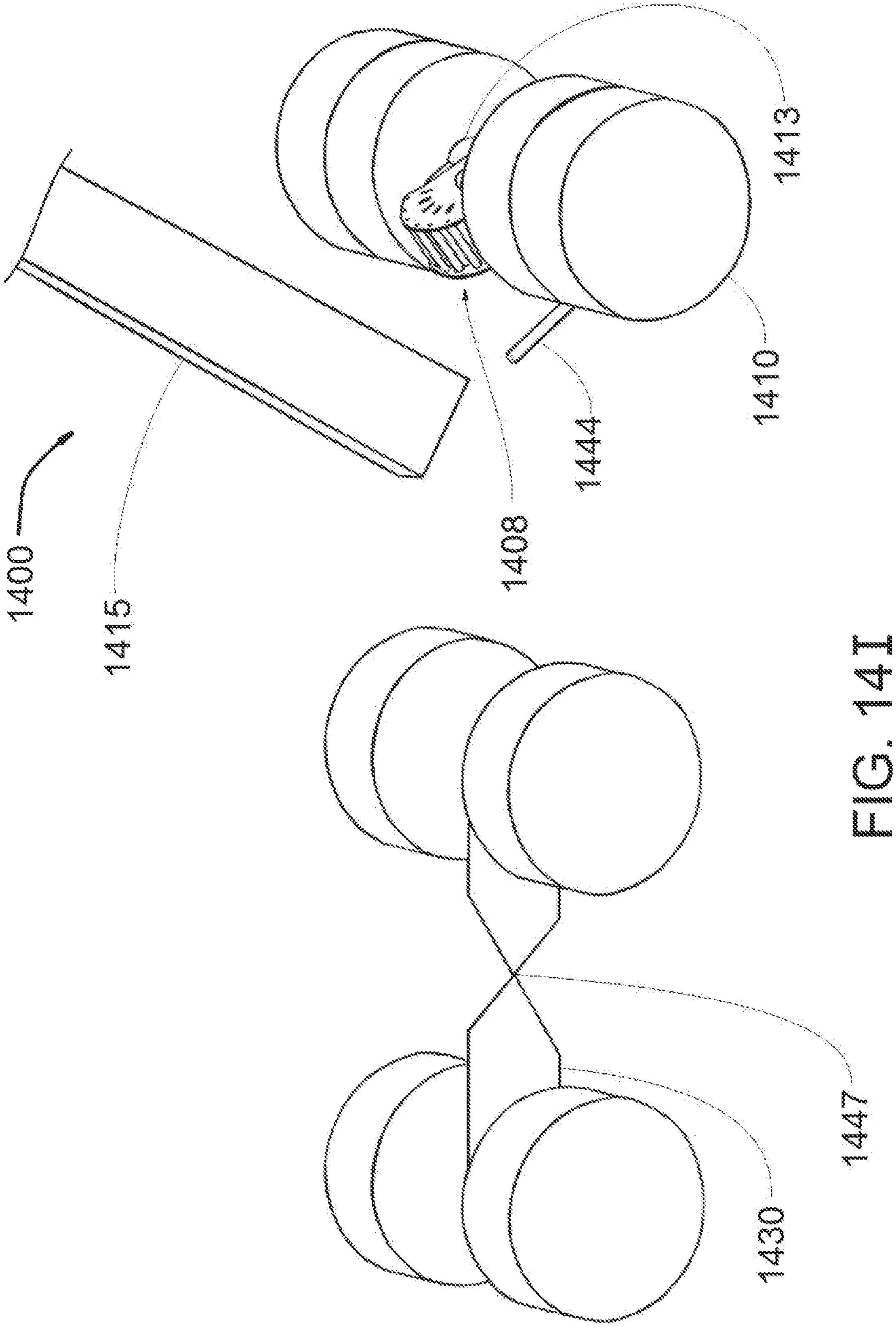
Figure 14J:
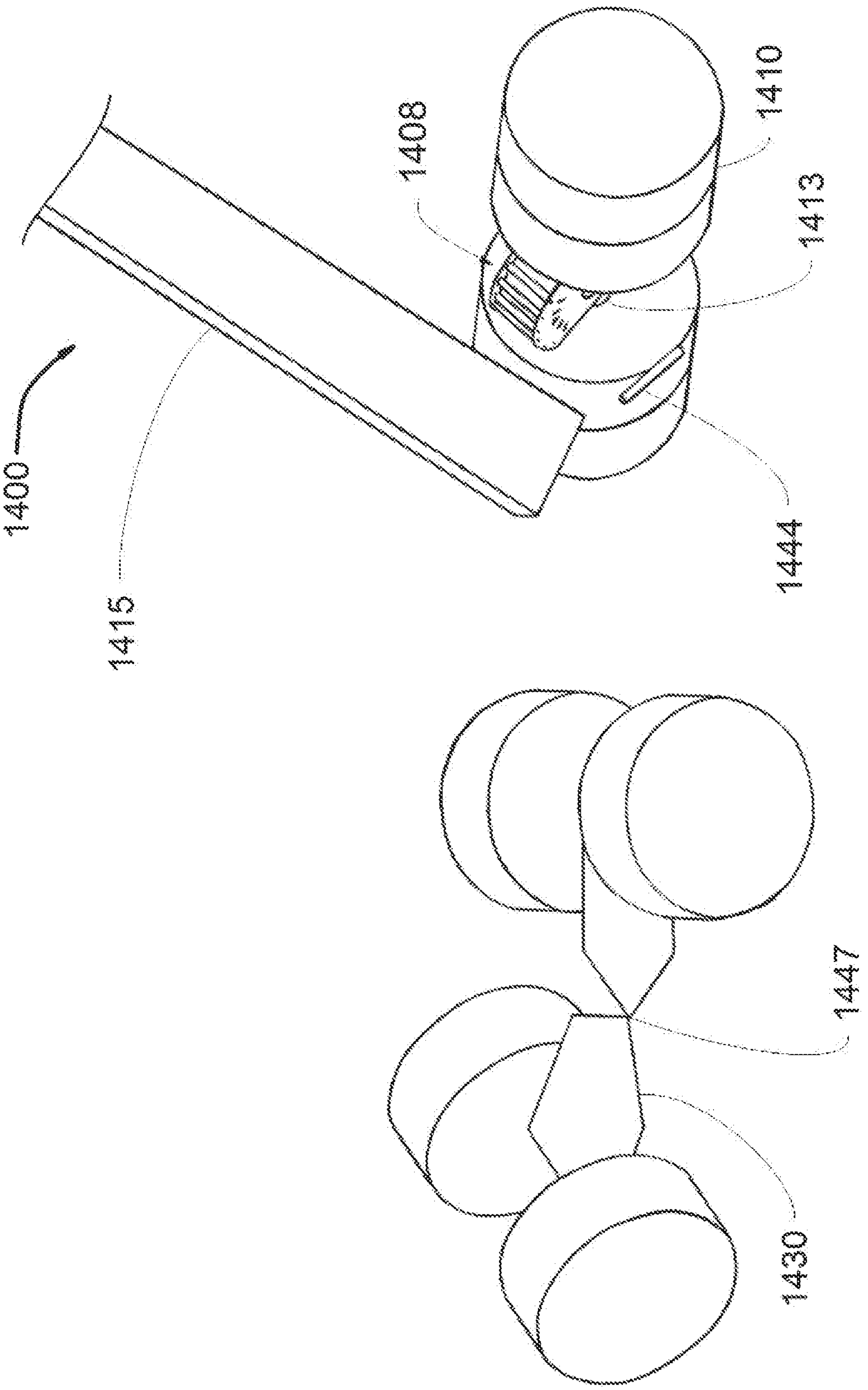
Figure 14K:
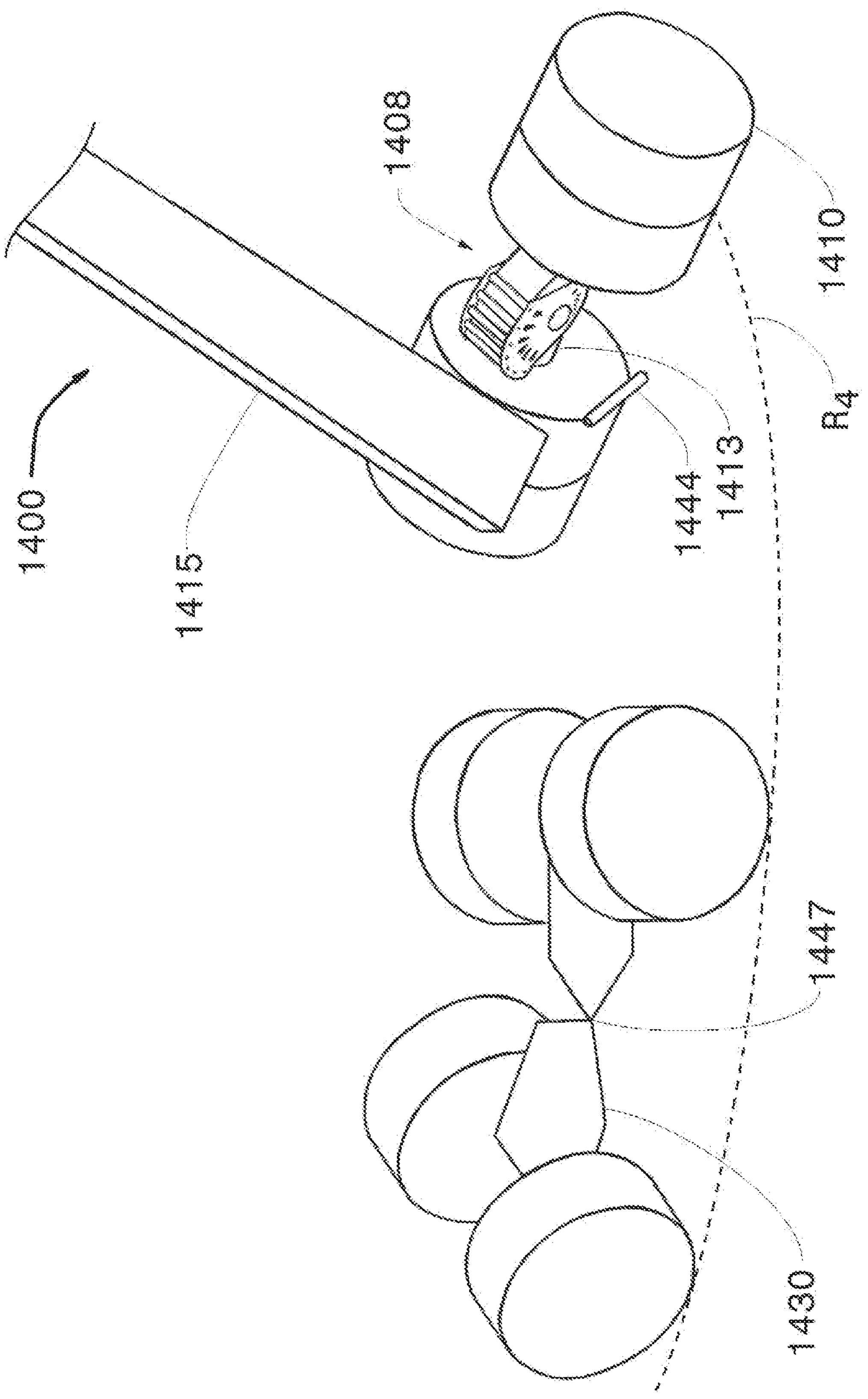
Figure 14L:
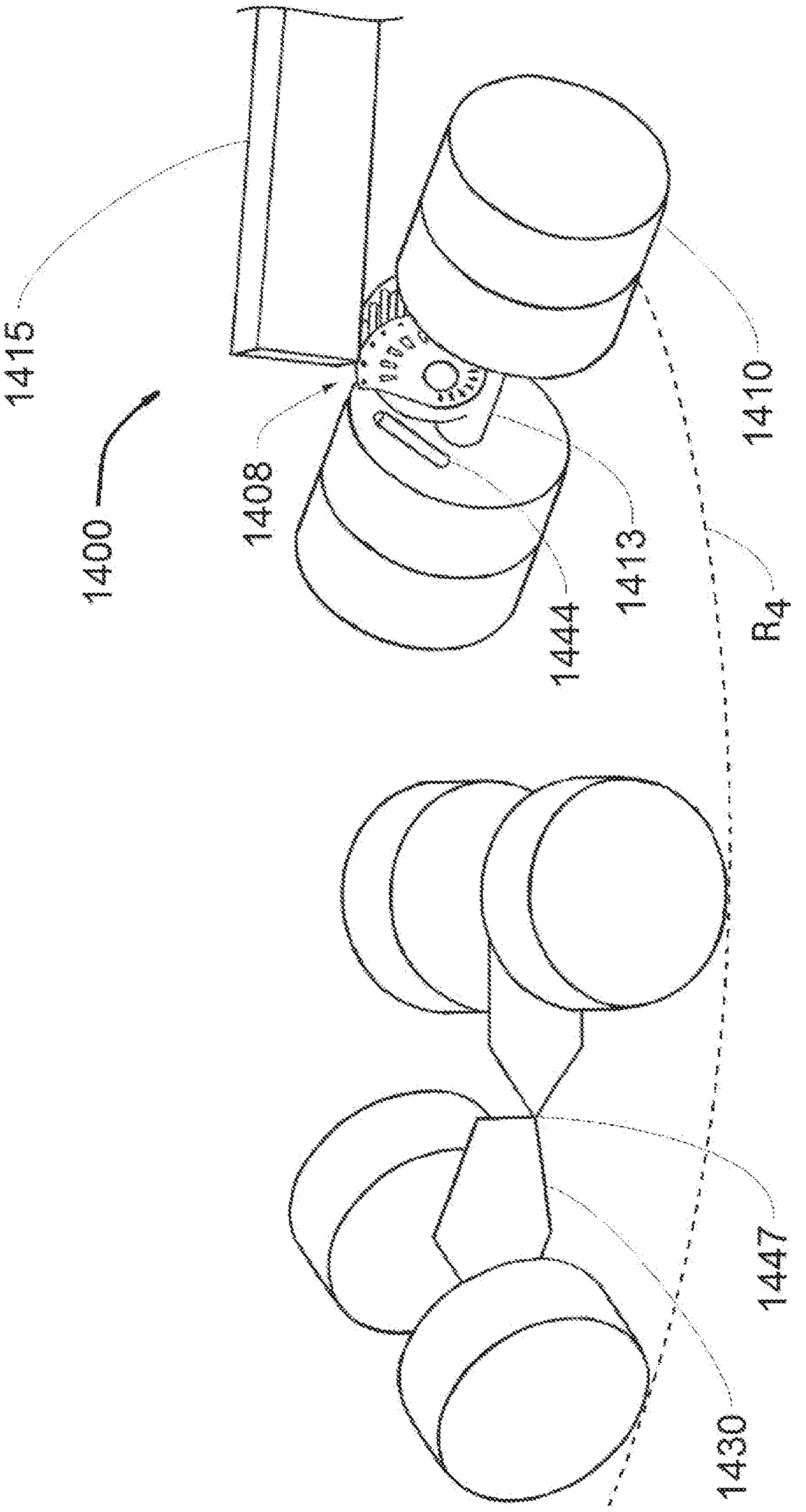

As shown in FIGS. 14K-14L, the wheels set along dashed spline next to the loader 1430 and going under lift attachment apparatus 1400 may be exemplary wheel placement when turning. Referring to FIGS. 14H-14L, three-dimensional exploded views of a lift attachment apparatus 1400 with loader 1430 in a straight position and turned positions are provided. These drawings have many parts not shown and other parts drawn in rudimentary forms for clarity as necessary for readers discerning the necessity of the shown parts being configured as disclosed. It is contemplated that if lift attachment apparatus 1400 was turned as it is in FIG. 14K and the boom 1415 was tilted forward using the hydraulic cylinders of the loader 1430 to a position as shown on 14L, the wheel 1410 on the far right side from the operator's perspective would lower at a faster rate than wheel 1410 on the opposite side of lift attachment apparatus 1400 if a rocking hub carrier assembly coupler 1408 or a similar acting device was not installed. This may illustrate the benefit of a rocking hub carrier assembly coupler 1408 as shown.

Referring to FIGS. 14E & 14H-14L, it is contemplated that if the axle 1413 was not mechanically configured to oscillate as it is in lift attachment apparatus 1400, when the attachment was articulated, the base of the wheels 1410 may go into separate planes from the base of the front wheels of loader 1430 even when the driving surface is in one constant plane as shown on FIG. 14J with critical consequences. When going over rough terrain the position of FIG. 14J may be of an advantageously stable arrangement if multiple planes were within the area of the loader 1430 and lift attachment apparatus 1400 and all of the shown wheels were resting on the ground, but with a rocking hub carrier assembly coupler 1408 this would be as a result of the axles angle placement adjusting to a surface angle rather than being fixed at an angle corresponding with the position of the boom 1415 or the plane that loader's wheels are placed. Referring to FIGS. 14B & 14J, it is further contemplated that if the axle 1413 was not mechanically configured to oscillate when the front frame 1404 is articulated around the rear frame 1403 at hinge pins 1444 in an inward motion as shown on FIG. 14I to the articulated position shown on FIG. 14J and if the hinge point for steering 1444 was not perpendicular to the plane at the base of the loader's 1430 wheels using the hydraulic cylinder 1445 or hydraulic cylinder 1446 to move boom 1415 in an upward motion, that the wheel 1410 furthest towards the outside of the turn will be raised to a higher elevation than that of the innermost wheel 1410 of the turn. If lift attachment apparatus was articulated from a straight position as shown on FIG. 14I the axle oscillation may be necessary if multiple planes are encountered even if the hinge point for steering 1444 was in a plane perpendicular to a plane at the base of the loader's 1430 wheels. Referring to FIGS. 14A & 14K-14L, it is also contemplated that if the axle 1413 was not mechanically configured to oscillate and the boom 1415 was lowered in a downward motion using the hydraulic cylinder 1445 or hydraulic cylinder 1446 so that the hinge point for steering 1444 was not perpendicular to the plane of the base of the loader's 1430 wheels while the attachment is articulated, then wheel 1410 on the outermost outside of the turn may be lowered below that of wheel 1410 on the innermost inside of the turn. As disclosed, if axle 1413 is configured to oscillate using a rocking hub carrier assembly coupler 1408, it is contemplated that the wheels 1410 may be in the same plane as the surface they are rolling on or in the same plane as the wheels of the loader 1430 for lift attachment apparatus 1400 to be functional where the loader 1430 may tip the boom 1415 without using any of the hydraulic cylinders or motors on lift attachment apparatus 1400. It is contemplated that the boom 1415 may be rotated to any position on FIG. 14C while articulated in a straight position as in FIG. 14I to the maximum articulated position with a value of 37 degrees within the loader to what may be a mechanically corresponding degree value of $A_{12}$ labeled on FIG. 14F to 40 degrees as shown on FIGS. 14K-14L. As shown as turning radius arc $R_4$ being 24' 8" on FIGS. 14K-14L the wheels of loader 1430 and wheels 1410 may be in an arrangement to not resist each other in a turn whether or not articulation hinge 1444 and a rocking hub carrier assembly coupler 1408 are in the angle shown on FIGS. 14K or 14L. The wheels of the loader 1430 and all of the wheels 1410 of the lift attachment apparatus attachment may be advantageously in one plane for stability. If the terrain was to have fluctuating planes the back wheels of the loader 1430 may be in one plane, the front wheels of loader 1430 may be in another plane and the wheels 1410 may be in an entirely different plane and the system as a whole may be advantageously maintained in a stable arrangement. It is contemplated that the wheels 1410 through axle 1413 mounted to the rocking hub carrier assembly coupler 1408 which includes axle oscillation hub 1406 that may be rotated within oscillation hub mount 1418A and 1418B around bearing 1412 as shown in FIGS. 14D, 14E & 14H-14L. As shown on FIG. 14H a set of roller bushings 1414 may be mounted to oscillation hub mount 1418 and ride against a race on top of oscillation hub 1406 to provide additional support. As shown on FIG. 14E it is further contemplated that the oscillation hub 1406 may limit angle of $A_{13}$, being configured with a maximum allowable tilt of 45 degrees to the oscillation hub mount 1418 from a position where axle 1413 is parallel with the front axle of the loader. FIGS. 14K & 14L may show this described oscillation hub 1406 angle of $A_{13}$ shown on FIG. 14E tilt at 22 to 28 degrees as drawn on FIGS. 14K & 14L. Referring to FIGS. 14D, 14E & 14H, added support to keep the oscillation hub mount 1418 in an advantageous arrangement may be provided by tapered roller bushings 1416 integrated into hub mount 1418 and set to roll against the axle oscillation hub 1406 and it is further contemplated that roller bushings of any type may be mounted in an adjustable configuration to be in a position against the oscillation hub 1406 for longevity of functionality and stability. It is contemplated that many modes of resistance to friction and wear may be introduced (such as the bushing as described may be adjustable bearings set in cages rolling against replaceable races), but with functional stability may be provided by the rocking hub carrier assembly coupler 1408. Referring to FIG. 14H, it is also contemplated rocking hub carrier assembly coupler 1408 may rotate with the support of less moving parts such as eliminating all bearings except for bearing 1412 which may be a ball bearing, a tapered bearing, a double row ball bearing, a double row tapered bearing, a sheave bearing, a turret bearing, a slewing bearing, a turntable bearing or another type of bearing. Bearing 1412 may also be 2 or more center aligned bearings on either face or internally of rocking hub carrier assembly coupler 1408.

Referring to FIG. 14D, it is contemplated controls of different kinds may be employed to control lift attachment apparatus 1400 with loader 1430. It is contemplated a winch 1460 to control the raising and lowering of cables hanging from the end of the boom or moving a trolley device along boom 1415 or lift attachment apparatus extension rod 1469 may be advantageously installed. A 7-pin plug 1431 or other plug may be used to fit in the electric output receptacle of loader 1430 and a power cord 1425 may be employed if a higher amperage of power is desired for operation. Power cord 1425 may be wired directly into the loader 1430 or an aftermarket receptacle if an adequate one is not provided on loader 1430. It is contemplated that hydraulic power may be provided to run the hydraulics of lift attachment apparatus 1400 through the hydraulic quick connect couplers of loader 1430. It is contemplated that male flat faced quick coupler with hydraulic hose 1441 could be mounted into the female output of loader 1430 and that female flat faced quick coupler with hydraulic hose 1442 could be mounted into the male input of loader 1430. Additional hoses may be equipped as needed for hydraulic overage relief or additional controlled operations. A controller device 1436 may be provided to operate the various parts of lift attachment apparatus 1400 utilizing the controls of loader 1430. Controller device 1436 may include an electric actuating device for running electric or hydraulic controls within the hydraulic actuation control box 1439. The hydraulic actuation control box 1439 may include an additional hydraulic pump or motor, it may include a battery or communication devices to communicate between the loader 1430 and lift attachment apparatus 1400 and it may include solenoids, relays, fuses, breakers, motors or other devices. It is also contemplated that controller device 1436 may also include cords, hoses, or fluid storage containers. The hydraulic actuation control box 1439 may include hydraulic splitters, hydraulic manifolds, solenoids, actuators, valves, relays, relief valves, overflow devices, a fluid return device, bypass valves, transducers and the like. It is further contemplated that lift attachment apparatus 1400 may include hydraulic, electric, fuel or other powered motor 1462 within the wheel hubs of wheels 1410 as shown on FIG. 14E. The wheels 1410 may also be power driven by other means utilizing area of frame 1403, 1404 or the loader 1430.

Frame 1403 and frame 1404 may refer to at least one body that connects pair of wheels 1410, via the axle 1413, to the attachment device 1405. In an embodiment of the disclosure, Frame 1403 may be generally incorporated into the attachment device 1405 and connected directly to boom 1415. Frame 1403 and 1404 may be combined into one rigid frame and wheels may be configured drawn and previously described for other arrangements within this application. It is contemplated that these configurations could be arranged without departing from the scope and intent of the present disclosure and may include a suspension device, solid cover (e.g. formed as a box), oriented at angles, wheels with controlled steering and the like according to various embodiments of the present disclosure.

Referring to FIGS. 14F & 14K-L, a plan view and three-dimensional views of lift attachment apparatus 1400 in accordance with an embodiment of the present disclosure. These views may be shown where the loader 1430 is in an articulated position of 37 degrees around hinge pin 1447. As shown on FIG. 14F when the frame 1404 is rotated on hinge 1444 around frame 1403 at a value of $A_{12}$ being 45 degrees and if the front wheels of the loader 1430 are slightly skidded in a turn, the outside curb to curb turning radius of lift attachment apparatus 1400 attached to a loader 1430 being a Caterpillar 966H is R2, which may be 27' 6". If the same scenario and equipment were implemented, but if wheels 1410 consisted of two total wheels with one being on each side, the curb to curb turning radius is shown as $R_4$, which as shown in FIG. 14F may be 24' 8" if $A_{12}$ remains 45 degrees. Again, referring to FIGS. 14F &14K-14L, if $A_{12}$ was moved to 40 degrees, all of the wheels of loader 1430 and attachment apparatus 1400 may be turning on arcs of one radius point cutting down on wear, but may increase the turning radius $R_4$ to 25' 5". FIG. 14F shows that with 100' of boom length accomplished by a combination of a boom 1415 and 1469 lift attachment apparatus extension rod that with a full turn of lift attachment apparatus 1400 that the tip of lift attachment apparatus extension rod 1469 may have an outside turn radius $R_3$, which may be 60' 6" when at a height of 92' 7" vertically from the ground at a position of angle shown on FIG. 14B. The following description is to clarify how these turning radii relate to US roads. Manual Notice 2018-1 with an effective date of Apr. 26, 2018 for the "Roadway Design Manual updates to provide vertical clearance guidance for roadways on the Texas Highway Freight Network" states, "Radii of 30 ft [9 m] or more at major cross streets should be provided where feasible so that an occasional truck can turn without too much encroachment" and also "For arterial-arterial urban intersections, turning radii of 75 ft [23 m] or more are desirable if frequent use is anticipated". Under this same guide the Texas DOT rates a single unit delivery truck of 8' wide by 30' long having a turning radius of 42' and additionally states, "For turning roadway widths to be reasonable in width, a design radius of 75 ft [23 m] or more is required." Provided that these recommendations by the Texas Department of Transportation are followed, it may be that lift attachment apparatus 1400 attached to a loader 1430 such as a Caterpillar 966H will easily maneuver on a city street that is designed to accommodate light commercial trucks including but not limited to delivery trucks that frequently pass through residential areas.

Referring to FIGS. 14A-14C, 14G & 14M, side views of a lift attachment apparatus in accordance with an embodiment of the present disclosure are shown. As shown, boom 1415 may be implemented as a rod or pole. FIG. 14G may depict an exemplary use of a lift attachment apparatus 1400 in accordance with an embodiment of the present disclosure wherein it may be utilized like a portable, armored crow's nest. While exact dimensions are not shown, the human figures of 5' 10" in height on 14C, 14G & 14M may be seen as a scale in assessing dimensions and it is contemplated that the dimensions may be adjusted without departing from the scope and intent of the present disclosure. It is contemplated that the maximum lifting weight in this configuration would be near 90,000 lbs. provided that the loader 1430 in this example has a weight rating of approximately half this weight with 2 front wheels and the attachment is contemplated to have double that value in having 4 wheels total in a line all ideally making positive contact with the ground with even distribution. It is contemplated that with a distance of $W_2$ being 9' horizontally from the center of the wheels 1410 that the tipping load of $W_2$ shown on FIG. 14C may be 90,000 lbs. and that for the operating load to reach this amount the load may need to be closer such as 7' horizontally from the center of wheels 1410. It is further contemplated that at the end of 100' of boom length accomplished by a combination of a boom 1415 and 1469 lift attachment apparatus extension rod that the tipping capacity and hydraulic capacity of 15,000 lbs. on a full turn with the boom in the full upright position may be possible. It is contemplated that with a total of two wheels 1410 on lift attachment apparatus 1400, it would easily facilitate 45,000 lbs. if the wheels 1410 were of a similar specification as a Caterpillar 966H Loader and if the structural components within lift attachment apparatus 1400 were sufficiently robust to not bend or break. Because of this, it is contemplated the arrangement of lift attachment apparatus 1400 may have 2 total wheels 1410 to lift trolley car 1470 being a loading point(s) over the exemplary height of $X_7$ being 80' as shown on FIG. 14G, to be able to turn with a curb to curb radius of around 25' as shown as $R_4$ on FIG. 14F and be able to drive and lift into spaces under 10' wide. It is further contemplated that if trolley car 1470 was near the base of boom 1415, the loader with the lift attachment apparatus 1400 may be able to go at a speed near 27 MPH if that loader is a Caterpillar 966H. Trolley car 1470 may be made of a variety of materials and be arranged for use in many applications. It is contemplated that trolley car 1470 may be advantageously much more robust and stable than a helicopter. For every pound of weight that is added to a helicopter that does not add stability, speed or longevity of flight, it may be a pound that works against its purpose. For this reason, helicopters may not be considered armored in the sense an armored car, truck, tank, or military style Caterpillar 966H is. With loader 1430 being an armored Caterpillar 966H as currently may be used by the armed forces, combined with an appropriately robust lift attachment apparatus 1400 and a protective trolley car 1470, military personnel and first responders may be able to respond to unfolding events through a more direct path to where action is needed. It is contemplated that trolley car 1470 may include a camera 1475 like shown on FIG. 14G to use when the operator or other individuals cannot see from their position what conditions are like in front of the trolley car 1470, the boom 1415, the extension rod 1469, other parts connected to the attachment apparatus 1400 or if the distance is too great. It is further contemplated cameras may be mounted to any of the attachments within this document wherever necessary when the view is obstructed or too far from the operator or other individuals. Unlike cranes, fire trucks, helicopters and most roadworthy vehicles, loaders may by nature be designed to slam into soil and natural material in their everyday functions for digging and grading. If loaders were not designed as described, they may have failed quickly and were redesigned accordingly. So loaders may have been exhaustively tested for decades resulting in the elimination of older and newer design flaws with much expense in warranty work to the manufacturer. It is contemplated that individuals within trolley car 1470 may be equipped with heavier lifesaving equipment being many times more protective when compared to currently used equipment, but would be overly burdensome to carry up stairs or a ladder. It is contemplated that medical equipment, fire suppression chemicals, products, supplies and people may be drawn to or from trolley car 1470 while on the move or in place. Trolley car 1470 may have medical, fire suppression, assault and defensive devices along with persons all within a protected area that can be unloaded from doors and windows of trolley car 1470. It is contemplated that trolley car 1470 may be used as a mini-staging area directly next to, over or in an area where tasks will be performed. Trolley car 1470 may have devices that can protrude from it for multiple uses. It is contemplated the boom 1415 or extension rod 1469 may be of rugged design to directly or indirectly penetrate walls, floors and ceilings of structures for demolition or as a means to gain further access as needed. It is further contemplated that trolley car 1470 may have multiple points of connection to boom 1415 or rod 1469 so as to be leveled out or to be of a different angle than boom 1415. Trolley car 1470 may be fixed to boom 1415, multiple booms 1415, frame 1403 or a power-driven extendable version of extension rod 1469 in a configuration that is of larger size or weight or that may be utilized with a smaller loader such as a skid loader or track loader. These configurations may include, but not be limited to configurations similar to FIGS. 1B, 7, 8H, 10C, 11E, 12B, 13C, 13F & 13G.

Figure 14M:
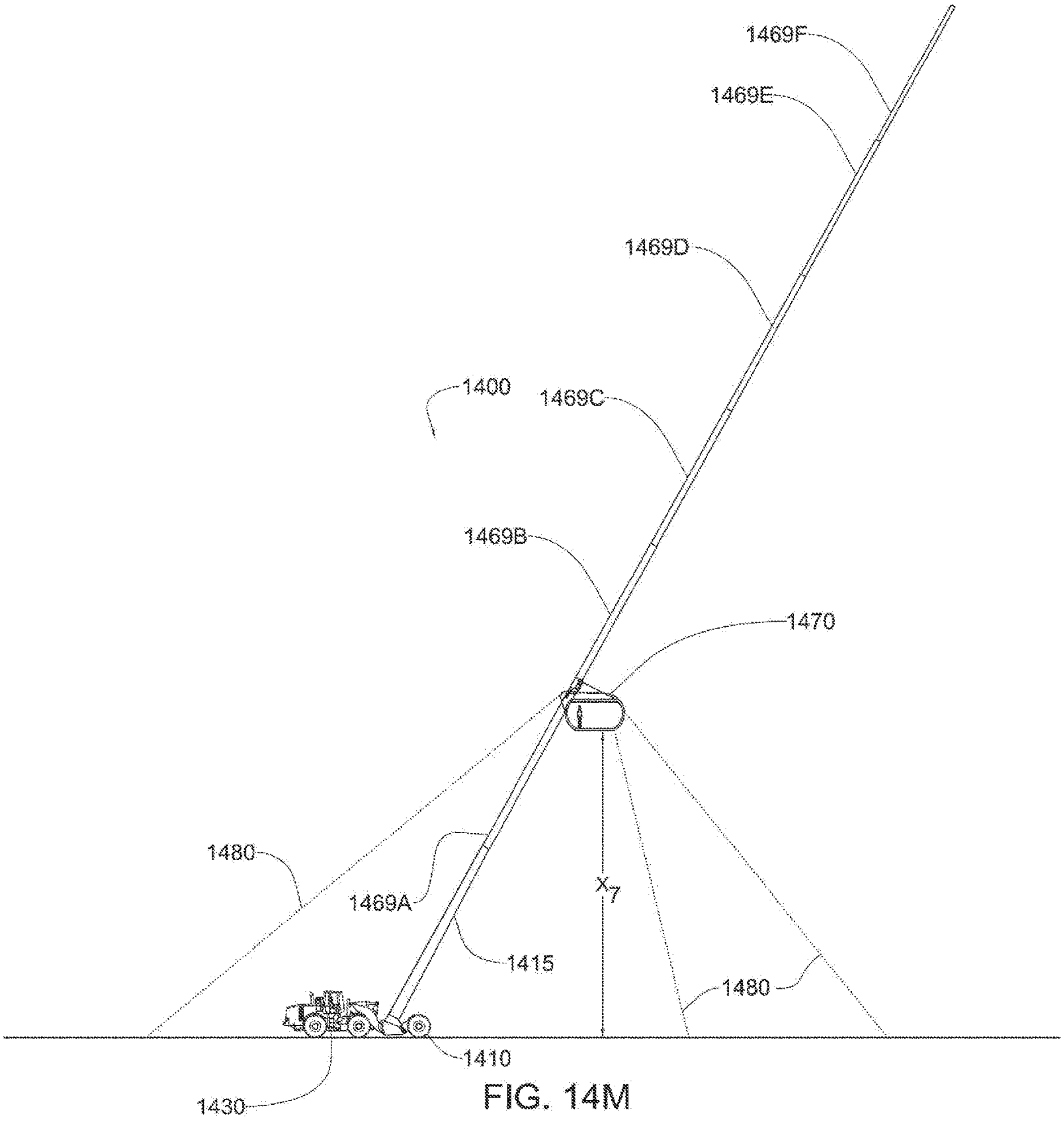
FIG. 14M depicts an exemplary side view of a lift attachment apparatus with a trolley car with additional reach according to an additional alternative embodiment of the present disclosure.

Referring to FIG. 14M, it is contemplated that additional extension rods 1469B-1469F with a loading point at the end may be within boom 1415 and 1469A to be telescopically extended to lengths of 300' or more to be used for mounting cameras, satellites, antennas, telecommunication equipment, defensive equipment, fire suppression devices and the like as well as a mode to transport individuals or material to greater extents. It is contemplated cables 1480 may need to be installed mounted to trolley car 1470, boom 1415 or extension rod 1469 to the ground, other stable point or vehicle for stability or as an alternative mode for materials or individuals to be moved up or down into various positions. As drawn in FIG. 14M the trolley car 1470 is above $X_7$ being 80' and the combination of the boom 1415 and extension rods 1469A-1469F are over 300' long.

The lift attachment apparatus 1400 as described and shown in FIGS. 14A-14L provides a number of advantages. It is common that contractors having access to a loader may forego the cost of owning an unwarranted quantity of specialized lifts and multiple cranes. It may be commonplace to witness many cranes in a row along a highway project or large construction site where the lift attachment apparatus 1400 may be quicker and of less expense to mobilize under some conditions where the mechanical advantages of a large crane are not warranted. It is contemplated that the lift attachment apparatus 1400 will not fulfill most of the current uses of cranes and the like, but may be an advantageously additional mobile and less expensive alternative. Additionally, through use of various attachments, loaders may be more likely to be owned due to their multiple functions, usability, and operability with less specialized skill than single task-oriented equipment. Previous implementations of booms on loaders may be limited due to their low lift capacities, reach, mobility and deficits in safety in ways that lift attachment apparatus 1400 may not.

Lift attachment apparatus 1400, by use of the pair of wheels 1410, operating between the loader 1430 and the load at the end of the boom 1415, may operate as a lever. This configuration and capability to operate as a lever may dramatically improve the lift capacity of the boom 1415 as compared to previous implementations. For example, the use of the pair of wheels 1410 as the fulcrum, may allow an amplification of the input force provided by a loader 1430 when applied to the attachment device 1405 of the lift attachment apparatus 1400 in order to provide a greater output force. It is contemplated that mechanical advantage of the lift attachment apparatus 1400 may be greater when the pair of wheels 1410 at the point to where the pair of wheels 1410 come into contact with a surface is located between the attachment device 1405 that is coupled to a tilting plane of a loader 1430 and the load which is located on the boom 1415, as shown in FIGS. 14C & 14G. Additionally, it is contemplated that a center point of the pair of wheels 1410, (e.g. the point at which the wheels may contact the axle), may also be forward of the attachment device 1405 whereby mechanical advantage of the lift attachment apparatus 1400 may be greater. Use of the lift attachment apparatus 1400 may allow transport of material while the loader is located 100 feet away or greater, which may be particularly valuable in muddy conditions or other conditions in which a surface is not solid. It is contemplated that in this arrangement, that the wheels 1410 are fixed in their alignment in their alignment, being stable, and may continually act as a functional fulcrum in moving a load. It is contemplated this attachment apparatus as described may be exemplary when configured in an arrangement as it relates from back to front parallel with the ground, the ground generally being a horizontal plane, in the following order; a forward facing loader attachment device having its center behind the center base point of attachment wheels that do not freely swivel in their placement, but may rock in a generally vertical direction against the ground as to function as a stable fulcrum being behind a loading point(s) where it is advantageous that the center base point of the said wheels not be in the space of the loading point(s) as it relates from the rear to the front of the attachment in all generally functional tipped positions; this configured arrangement having the physical properties of acting as a lever where the attachment device is moved in a vertical direction using the wheels as a fulcrum to move the loading point in a vertical direction.

Referring again to FIG. 14C, attachment device 1405, frame 1403, frame 1404, and pair of wheels 1410 may be in proximity to each other. It is contemplated, in an alternative embodiment, that pair of wheels 1410 and frames 1405 & 1403 may be shifted toward the end of the boom 1415 while the attachment device 1405 remains in the present position as shown on FIG. 7. For example, it is contemplated that such design according to an alternative embodiment may be desirable for larger loads exceeding 100,000 lbs.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

What is claimed is:

1. A lift attachment apparatus, comprising:

a frame, the frame including an attachment device, the attachment device configured to attach to a tilting plane of a loader, the loader having a forward facing loader arm;

a first wheel on a first side on the frame;

a second wheel on a second side of the frame; and a forklift assembly connected to the frame, the forklift assembly including at least one hydraulic cylinder to control raising and lowering of at least two forks of the forklift assembly, wherein the first wheel and the second wheel are located behind the at least two forks of the forklift assembly and the first wheel and the second wheel are configured to remain parallel to the at least two forks of the forklift assembly.

2. The lift attachment apparatus as claimed in claim 1, wherein the first side of the frame is generally perpendicular to the attachment device of the frame.

3. The lift attachment apparatus as claimed in claim 2, wherein the second side of the frame is generally perpendicular to the attachment device of the frame.

4. The lift attachment apparatus as claimed in claim 1, wherein said forklift assembly is configured to be tipped up via reverse action of a hydraulic cylinder of the forward facing loader arm of the loader.

5. The lift attachment apparatus as claimed in claim 1, wherein the least one hydraulic cylinder to control raising and lowering of the at least two forks of the forklift assembly is coupled to at least one auxiliary hydraulic controller of the loader to control operation of the at least one hydraulic cylinder.

6. The lift attachment apparatus as claimed in claim 1, wherein the frame includes an articulating hinge pin.

7. The lift attachment apparatus as claimed in claim 6, wherein the articulating hinge pin connects a first side of the frame with a second side of the frame.

8. The lift attachment apparatus as claimed in claim 7, wherein at least one additional hydraulic cylinder is connected to the first side of the frame and the second side of the frame.

9. The lift attachment apparatus as claimed in claim 8, wherein the at least one additional hydraulic cylinder is configured to steer the lift attachment apparatus.

10. The lift attachment apparatus as claimed in claim 9, wherein the at least one additional hydraulic cylinder is coupled to at least one auxiliary hydraulic controller of the loader to control steering of the lift attachment apparatus.

* * * * *